(12) United States Patent
Waesche

(10) Patent No.: US 12,291,063 B2
(45) Date of Patent: May 6, 2025

(54) AUXILIARY HITCH SYSTEM, COMPONENT CARRIER, DRAW BAR, BUMPER SYSTEM, HITCH EXTENDER, AND/OR DEVICE FOR VEHICLES AND TRUCKS

(71) Applicant: Luke Waesche, Hagerstown, MD (US)

(72) Inventor: Luke Waesche, Hagerstown, MD (US)

( * ) Notice: Subject to any disclaimer, the term of this patent is extended or adjusted under 35 U.S.C. 154(b) by 0 days.

(21) Appl. No.: 18/634,250

(22) Filed: Apr. 12, 2024

(65) Prior Publication Data

US 2024/0343197 A1   Oct. 17, 2024

Related U.S. Application Data

(60) Provisional application No. 63/458,861, filed on Apr. 12, 2023.

(51) Int. Cl.
| | |
|---|---|
| *B60D 1/56* | (2006.01) |
| *B60D 1/24* | (2006.01) |
| *B60D 1/48* | (2006.01) |
| *B60D 1/52* | (2006.01) |
| *B60R 3/00* | (2006.01) |
| *B60R 9/06* | (2006.01) |
| *B60R 9/10* | (2006.01) |
| *B60R 19/48* | (2006.01) |

(52) U.S. Cl.
CPC ............... *B60D 1/56* (2013.01); *B60D 1/24* (2013.01); *B60D 1/48* (2013.01); *B60D 1/52* (2013.01); *B60R 3/007* (2013.01); *B60R 9/06* (2013.01); *B60R 9/10* (2013.01); *B60R 19/48* (2013.01)

(58) Field of Classification Search
CPC ... B62M 6/45; B62M 6/70; B62M 6/65; B62J 1/08; B62J 11/05; B62K 11/02; B62K 11/14; B62K 15/00; B62K 21/12
See application file for complete search history.

(56) References Cited

U.S. PATENT DOCUMENTS

| | | | | |
|---|---|---|---|---|
| 4,159,833 A | * | 7/1979 | Meiners ................ | B60D 1/50 280/491.4 |
| 5,547,210 A | * | 8/1996 | Dugger ................. | B60D 1/36 280/479.2 |
| 5,580,088 A | * | 12/1996 | Griffith ................ | B60D 1/40 280/479.2 |
| 5,725,231 A | * | 3/1998 | Buie ..................... | B60D 1/247 280/484 |
| 6,173,984 B1 | * | 1/2001 | Kay ...................... | B60D 1/145 280/495 |
| 7,134,679 B2 | * | 11/2006 | Krstovic ............... | B60D 1/36 280/479.2 |

(Continued)

*Primary Examiner* — Anne Marie M Boehler
*Assistant Examiner* — Marlon A Arce
(74) *Attorney, Agent, or Firm* — GARCIA-ZAMOR INTELLECTUAL PROPERTY LAW, LLC; Ruy Garcia-Zamor

(57) ABSTRACT

A hitch system for vehicles and trucks designed to be easy to install and that can accommodate the attachment of various vehicle and truck accessories. A hitch extender that is configured to be used with standard vehicle and truck hitches. A hitch system and a hitch extender which may be entirely manually powered, manually powered and free of all motors and electrical components, may be operated by a powered device, may include a motor, or may be operated manually with a powered assist.

12 Claims, 44 Drawing Sheets

(56) References Cited

U.S. PATENT DOCUMENTS

| | | | | |
|---|---|---|---|---|
| 7,669,876 B2* | 3/2010 | Kerpash, Sr. | ............ | B60D 1/54 |
| | | | | 280/479.2 |
| 8,256,790 B2* | 9/2012 | Fortner | ................... | B60D 1/06 |
| | | | | 280/490.1 |
| 8,302,987 B2* | 11/2012 | Williams, Jr. | ........... | B60D 1/46 |
| | | | | 280/479.3 |
| 11,858,403 B1* | 1/2024 | Farmer | ................... | B60P 1/435 |
| 2011/0101647 A1* | 5/2011 | Williams, Jr. | ........... | B60D 1/44 |
| | | | | 280/504 |

* cited by examiner

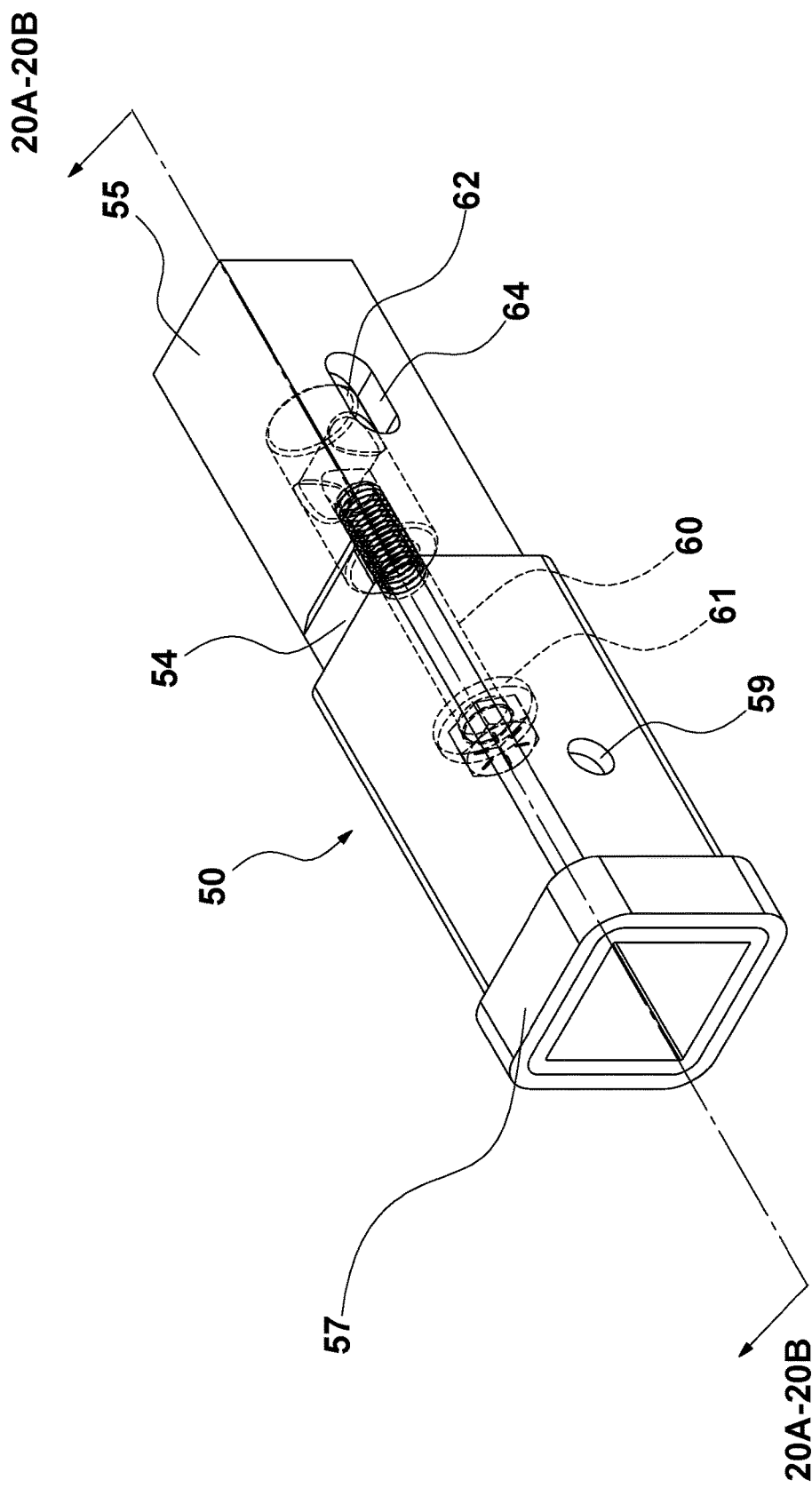

AUXILIARY HITCH SYSTEM, COMPONENT CARRIER, DRAW BAR, BUMPER SYSTEM, HITCH EXTENDER, AND/OR DEVICE FOR VEHICLES AND TRUCKS

CROSS REFERENCE TO RELATED APPLICATIONS

This application claims priority to and benefit of U.S. Provisional Patent No. 63/458,861, filed Apr. 12, 2023, which is hereby incorporated by reference in its entirety as if fully set forth herein.

BACKGROUND

The preferred embodiments of the present invention relate generally to vehicle accessories. More specifically, the preferred embodiment of the present invention relates to a retrofit auxiliary hitch for vehicles and trucks. More specifically still, one preferred embodiment of the present invention relates to a retrofit hitch system for a truck allowing full tailgate functionality, attachment of additional accessories, and a hitch extender.

Typically, vehicle and truck accessories have only been produced as attachments for standard hitch mounts. These vehicle and truck accessories exert radial loads on the standard vehicle and truck hitches. However, standard vehicle and truck hitches were originally designed for supporting linear towing capabilities. Therefore, it is an object of the present invention to overcome these drawbacks.

It may be advantageous to provide a hitch system and/or a hitch extender which may preferably, but not necessarily, include at least one of: an aesthetically pleasing design; an interlocking hitch mechanism; a strengthened hitch extender; a hitch system designed to accommodate the attachment of various accessories to a vehicle; a hitch system designed to accommodate the attachment of an accessory having a lift assist such that loading a bed of a truck is easier and requires less work by the user; be visually appealing; a low profile; not obstruct the taillights and/or license plate of a truck or other vehicle; be suitable for use by construction companies, utility companies, or any other companies requiring higher utility trucks; be sturdy enough for commercial use; be efficient for manufacture; allow for the transportation of various truck attachments; be useful for use by people with limited strength or of advanced age; and/or be easy to use.

SUMMARY

Briefly speaking, one embodiment of the present invention is directed to a hitch system which may be configured to engage accessories to a truck. The truck may have a hitch receiver and a truck bed. The truck bed may be defined in part by a tailgate and first and second bedrails. The hitch system may comprise a hitch body. The hitch body may be configured to detachably connect to the hitch receiver and to the first and second bedrails to provide at least three connections to the truck. The hitch body may also have a connector mechanism thereon which may be configured to allow a truck accessory to be secured thereto. The hitch body may further be configured such that when attached to the truck without the truck accessory attached thereto, the tailgate can move between a first, closed position and a second, fully open position without being blocked by the hitch body.

In a separate aspect, the present invention is related to a hitch system. The hitch system may comprise a hitch body. The hitch body may have a connector mechanism thereon which may be configured to allow a truck accessory to be secured thereto. The hitch body, when connected to the truck, may also not obstruct the taillights and the license plate of the truck.

In a separate aspect, the present invention is related to a hitch system. The hitch system may comprise a hitch body. The hitch body may have a connector mechanism thereon which may be configured to allow a truck accessory to be secured thereto. The connector mechanism may further comprise a plurality of upper slots each containing a fixed pin and a plurality of lower slots each configured to receive a removable pin. To connect a truck accessory to the hitch system, the truck accessory may have a plurality of upper hooks which may be configured to engage the fixed pins of the plurality of upper slots and a plurality of lower holes which may be configured to be engaged concurrently with the plurality of lower slots by the removable pins.

In a separate aspect, the present invention is related to a hitch system. The hitch system may comprise a hitch body. The hitch body may comprise a lateral support bar extending along the bumper of the truck. The hitch body may also comprise a first arm extending from a first end of the lateral support bar. The first arm may be configured to connect to the first bedrail of the truck bed. The hitch body may additionally comprise a second arm extending from a second end of the lateral support bar. The second arm may be configured to connect to the second bedrail of the truck bed. The hitch body may further comprise a hitch extender extending from a midpoint of the lateral support bar configured to engage the hitch receiver.

In a separate aspect, the present invention is related to a hitch system. The hitch system may comprise a hitch body. The hitch body may comprise a lateral support bar extending along the bumper of the truck. The lateral support bar may comprise a grooved step portion. The grooved step portion may be configured to allow a user to stand on the lateral support bar with increased grip and reduced slippage.

In a separate aspect, the present invention is related to a hitch system. The hitch system may comprise a hitch body. The hitch body may comprise a lateral support bar extending along the bumper of the truck. The hitch body may also comprise a first arm extending from a first end of the lateral support bar. The hitch body may additionally comprise a second arm extending from a second end of the lateral support bar. The first arm may comprise a first attachment plate. The second arm may comprise a second attachment plate. The first attachment plate may be configured to be detachably affixed to a first truck stake pocket located on the first bedrail. The second attachment plate may be configured to be detachably affixed to a second truck stake pocket located on the second bedrail.

In a separate aspect, the present invention is related to a hitch system. The hitch system may comprise a hitch body. The hitch body may have a connector mechanism thereon which may be configured to allow a truck accessory to be secured thereto. The hitch system may also comprise a liftgate accessory. The liftgate accessory may be attached to the hitch system via the connector mechanism. The liftgate accessory may be configured to assist a user in moving a load from a ground level to a bed level.

In a separate aspect, the present invention is related to a hitch system. The hitch system may comprise a hitch body. The hitch body may have a connector mechanism thereon which may be configured to allow a truck accessory to be secured thereto. The hitch system may further comprise an attachment accessory. The attachment accessory may be attached to the hitch system via the connector mechanism. The attachment accessory may be configured to engage with and protect a top edge of the tailgate.

In a separate aspect, the present invention is related to a hitch system. The hitch system may comprise an attachment accessory. The attachment accessory may be attached to the hitch system via the connector mechanism. The attachment accessory may be configured to engage with and protect a top edge of the tailgate. The attachment accessory may also be configured for at least one ramp to be attached. The at least one ramp may bridge a distance between a ground level and a bed level.

In a separate aspect, the present invention is related to a hitch system. The hitch system may comprise a hitch extender. The hitch extender may be configured to connect to the hitch receiver of the truck. The hitch extender may comprise an extender body having a wider end and a tapered end. The tapered end may be configured for insertion into the hitch receiver. The wider end may be configured for receiving standard hitch accessories. The hitch extender may also comprise an adjustable tensioning mechanism 16 for securing the extender body to the hitch receiver. The adjustable tensioning mechanism 16 may comprise a tension bolt extending axially through the extender body. The tension bolt may have a threaded end. The adjustable tensioning mechanism 16 may also comprise a tension nut configured to engage with the threaded end of the tension bolt. The tensioning mechanism 16 may preferably, but not necessarily, also comprise a flared portion extending outwardly from a portion of the tapered end of the extender body. When the tension bolt may be engaged with the tension nut, the tapered end may be pulled into the hitch receiver and the flared portion may provide a pressure fit against an inside of the hitch receiver.

In a separate aspect, an alternative preferred embodiment of the present invention is directed to a retrofit device for a truck having a truck bed and a hitch. The truck bed may have a first bedrail and a second bedrail. The retrofit device may comprise a first arm configured to detachably engage the first bedrail of the truck and a second arm configured to detachably engage the second bedrail of the truck. The retrofit device may also comprise a lateral support bar connecting the first arm to the second arm. The retrofit device may further comprise a hitch connecting member extending perpendicular to the lateral support bar. The hitch connecting member may be configured to detachably engage with the hitch of the truck. The first arm and the second arm may comprise a plurality of connecting pins. The plurality of connecting pins may be capable of engagement with a plurality of connecting members of a plurality of truck accessories.

In a separate aspect, the present invention is related to a retrofit device for a truck. The retrofit device may comprise a first arm configured to detachably engage the first bedrail of the truck and a second arm configured to detachably engage the second bedrail of the truck. The first arm may comprise a first arm extension with a first attachment plate. The second arm may comprise a second arm extension with a second attachment plate. The first attachment plate and the second attachment plate may be configured to engage with, and detachably connect to, a truck stake pocket on each of the first and second bedrails of the truck, respectively.

In a separate aspect, the present invention is related to a retrofit device for a truck. The retrofit device may comprise a lateral support bar connecting the first arm to the second arm. The lateral support bar may comprise a grooved step portion. The grooved step portion may be configured to allow a user to stand on the lateral support bar with increased grip and reduced slippage.

In a separate aspect, the present invention is related to a hitch system configured to engage accessories to a vehicle. The hitch system comprising a hitch body, which is not a bumper or a standalone vehicle hitch. The hitch body is configured to detachably connect to a vehicle. The detachable connection being formed by at least two connections between the hitch body and the vehicle. The hitch body having a connector mechanism thereon which is configured to allow a vehicle accessory to be secured thereto. The connector mechanism is configured to detachably engage the vehicle accessory in a non flexible manner such that the vehicle accessory is supportable off the ground during normal driving of the vehicle In a separate aspect, the present invention is directed to a hitch system configured to engage accessories to a vehicle. The hitch system may include a hitch body, which is not a bumper or a standalone hitch. The hitch body can be configured to detachably connect to a vehicle. The detachable connection being formed by at least two connections between the hitch body and the vehicle. The hitch body having a connector mechanism thereon which is configured to allow any one of a plurality of vehicle accessories to be secured thereto in a non flexible manner such that the vehicle accessory is supportable off the ground during normal driving of the vehicle.

In a separate aspect, the present invention is directed to a hitch system configured to engage accessories to a vehicle. The hitch system may include a hitch body, which is not a vehicle bumper and not a standalone hitch and which is not a winch. The hitch body is configured to detachably connect to a vehicle. The detachable connection being formed by at least two connections between the hitch body and the vehicle. The hitch body being configured to allow a vehicle accessory to be detachably secured thereto in a non flexible manner such that the vehicle accessory is supportable off the ground during normal driving of the vehicle.

In a separate aspect, the present invention is related to a retrofit device for a truck. The retrofit device may comprise a first arm and a second arm. The first arm may comprise a first attachment plate and the second arm may comprise a second attachment plate. The first attachment plate may be configured to be detachably affixed to a first truck stake pocket located on the first bedrail. The second attachment plate may be configured to be detachably affixed to a second truck stake pocket located on the second bedrail.

In a separate aspect, the present invention is related to a retrofit device for a truck. The retrofit device may comprise a first arm and a second arm. The first arm and the second arm may comprise a plurality of connecting pins. The retrofit device may also comprise a liftgate accessory. The liftgate accessory may be attached to the retrofit device via the connecting pins of the first and second arms. The liftgate accessory may be configured to assist a user in moving a load from a ground level to a bed level.

In a separate aspect, the present invention is related to a retrofit device for a truck. The retrofit device may comprise a first arm and a second arm. The first arm and the second arm may comprise a plurality of connecting pins. The retrofit device may also comprise an attachment accessory. The attachment accessory may be attached to the retrofit device via the connecting pins of the first and second arms. The attachment accessory may be configured to engage with and protect a top edge of the tailgate. The attachment accessory may also be configured for at least one ramp to be attached. The at least one ramp may bridge a distance between a ground level and a bed level.

In a separate aspect, an alternative preferred embodiment of the present invention is directed to a retrofit hitch system for a truck having a truck bed and a hitch. The retrofit hitch system may be able to accommodate a plurality of truck accessories. The retrofit hitch system may comprise a hitch mechanism having a male hitch end and a female hitch end. The male hitch end may be configured for engagement with the hitch. The female hitch end may comprise a standard truck hitch. The retrofit hitch system may also comprise a reinforcement bar connected to the hitch mechanism. The reinforcement bar may extend laterally across a width of the truck bed. The retrofit hitch system may additionally comprise at least one support arm extending upwardly from an end of the reinforcement bar. The at least one support arm may be configured to detachably engage with the bed of the truck.

In a separate aspect, the present invention is related to a retrofit hitch system for a truck. The retrofit hitch system may additionally comprise at least one support arm extending upwardly from an end of the reinforcement bar. The at least one support arm may comprise an attachment plate. The attachment plate may be configured to be detachably affixed to a truck stake pocket on a bedrail of the truck.

In a separate aspect, the present invention is related to a retrofit hitch system for a truck. The retrofit hitch system may additionally comprise at least one support arm extending upwardly. The at least one support arm may comprise a connector mechanism. The connector mechanism may comprise an upper connecting slot containing a fixed pin and a lower connecting slot configured to receive a removable pin. Any of a variety of truck accessories may have an upper hook configured to engage the fixed pin of the upper connecting slot. The truck accessory may also have a lower hole configured to be engaged concurrently with the lower connecting slot by the removable pin.

In a separate aspect, the present invention is related to a retrofit hitch system for a truck. The retrofit hitch system may additionally comprise at least one support arm extending upwardly. The at least one support arm may comprise a connector mechanism. The retrofit hitch system may also comprise an attachment accessory. The attachment accessory may be attached to the retrofit hitch system via the connector mechanism. The attachment accessory may be configured to engage with and protect a top edge of a tailgate of the truck when the tailgate may be coplanar with the truck bed.

In a separate aspect, the present invention is related to a hitch system. The hitch system may be connected to a vehicle. The hitch system may connect to an existing vehicle hitch and/or other parts of the vehicle. The hitch system may allow for other vehicle accessories to be more easily connected to the vehicle. The hitch system may leave the exterior lights and license plates of a vehicle unobstructed. The hitch system may allow the bed of the vehicle to be effectively extended. The hitch system may allow the existing vehicle hitch to be effectively extended.

In a separate aspect, an alternative preferred embodiment of the present invention is directed to a hitch extender assembly. The hitch extender assembly may be configured for engaging a receiver having a central receiver axis. The hitch extender assembly may comprise a hitch extender body having a first axial end and a second axial end. The first axial end may be configured for insertion into the receiver such that the hitch extender body may be detachably securable in an engaged position. The hitch extender assembly may also comprise a tension mechanism located within the hitch extender body. The tension mechanism may be configured to maintain a predetermined force between the hitch extender body and the receiver along the central receiver axis to increase stability of the hitch extender body during use.

In a separate aspect, an alternative preferred embodiment of the present invention is directed to a hitch extender assembly. The hitch extender assembly may be configured for engaging a receiver having a central receiver axis. The hitch extender assembly may comprise a hitch extender body having a first axial end and a second axial end. The first axial end may be configured for insertion into the receiver such that the hitch extender body may be detachably securable in an engaged position. The hitch extender assembly may also comprise a tension mechanism located within the hitch extender body. The tension mechanism may be configured to maintain a force between the hitch extender body and the receiver along the central receiver axis to increase stability of the hitch extender body during use.

In a separate aspect, an alternative preferred embodiment of the present invention is directed to a hitch extender assembly. The hitch extender assembly may be configured for engaging a receiver having a central receiver axis. The hitch extender assembly may comprise a hitch extender body having a first axial end and a second axial end. The first axial end may be configured for insertion into the receiver such that the hitch extender body may be detachably securable in an engaged position. The hitch extender assembly may also comprise a tension mechanism located within the hitch extender body. The tension mechanism may be configured to maintain a proper position for the hitch extender body relative to the receiver along the central receiver axis to increase stability of the hitch extender body during use.

In a separate aspect, the present invention is related to a hitch extender assembly. The hitch extender assembly may comprise a hitch extender body having a first axial end and a second axial end. The hitch extender body may comprise a first elongated section having the first axial end and a second elongated section having the second axial end. The first elongated section may be aligned end-to-end with the second elongated section. At least a portion of the second elongated section of the hitch extender body may be outside of the receiver when the hitch extender body may be detachably secured to the receiver. The second elongated section may be configured to receive a standard hitch accessory.

In a separate aspect, the present invention is related to a hitch extender assembly. The hitch extender assembly may also comprise a tension mechanism located within the hitch extender body. The tension mechanism may comprise a pin nut which, when not axially secured to the receiver, may be slidably positioned within a bore in the second elongated section of the hitch extender body. The tension mechanism may also comprise a fastener located in a second bore in the second elongated section of the hitch extender body. When the pin nut may be axially secured to the receiver, the fastener may be adjustable to provide a compressive force between the receiver and the hitch extender body.

In a separate aspect, the present invention is related to a hitch extender assembly. The hitch extender assembly may also comprise a tension mechanism located within the hitch extender body. The tension mechanism may comprise a pin nut and a fastener. The fastener may have a threaded portion. The pin nut may have threading. The pin nut may be configured to engage the fastener by screwing the threaded portion of the fastener into the threading of the pin nut.

In a separate aspect, the present invention is related to a hitch extender assembly. The hitch extender assembly may also comprise a tension mechanism located within the hitch extender body. The tension mechanism may comprise a pin nut and a fastener. The pin nut may comprise a tensioner pin hole. The tensioner pin hole may be configured to receive a tensioner pin. When the pin nut may be inserted into the first elongated section of the hitch extender body, the tensioner pin hole may be aligned with an axial hole in the first elongated section of the hitch extender assembly. The tensioner pin may then be inserted through the tensioner pin hole, the axial hole, and a receiver hole of the receiver simultaneously.

In a separate aspect, the present invention is related to a hitch extender assembly. The hitch extender assembly may comprise a hitch extender body. The hitch extender body may comprise a first elongated section having the first axial end and a second elongated section having the second axial end. The first elongated section may have a flared portion on an outer surface. The flared portion may be sloped such that when the first elongated section may be tensioned into the receiver, the flared portion may provide a friction fit against an inside surface of the receiver.

In a separate aspect, the present invention is related to a hitch extender assembly. The hitch extender assembly may comprise a hitch extender body. The hitch extender body may comprise a first elongated section having the first axial end and a second elongated section having the second axial end. The second elongated section may be configured to receive a standard hitch accessory. The standard hitch accessory may be any of the following, including, but not limited to: a bike rack, a trailer, a leaf blower, a ball mount, a tow hook, a spreader, and a toolbox.

In a separate aspect, the present invention is related to a hitch extender assembly. The hitch extender assembly may also comprise a tension mechanism located within the hitch extender body. The tension mechanism may also comprise a washer. The washer may be secured between the fastener and an interior axial wall located within the second elongated section of the hitch extender body. The washer may be configured to increase the compressive force of the tension mechanism and to reduce wear from the fastener on the interior axial wall.

In a separate aspect, an alternative preferred embodiment of the present invention is directed to a hitch extending device. The hitch extending device may be configured to engage a standard vehicle hitch. The hitch extending device may comprise a body having a male end, a female end, and an axially extending hole therethrough. The male end may be engageable with the standard vehicle hitch. The male end may also have two lateral holes opposite one another. The female end may comprise another standard vehicle hitch. The hitch extending device may also comprise a tensioning device configured to secure the body to the standard vehicle hitch. The tensioning device may comprise a tension bolt and a tension nut. The tension bolt may extend through the axially extending hole in the body from the female side to the male side. The tension bolt may be configured to engage with the tension nut and securely fasten the body of the hitch extending device to the standard vehicle hitch.

In a separate aspect, the present invention is related to a hitch extending device. The hitch extending device may comprise a body having a male end, a female end, and an axially extending hole therethrough. A flared portion may extend outwardly from a portion of the male end of the body. When the tension bolt may be engaged with the tension nut, the tapered end may be pulled into the truck hitch and the flared portion may provide a pressure fit against an inside of the truck hitch.

In a separate aspect, the present invention is related to a hitch extending device. The hitch extending device may comprise a tensioning device configured to secure the body to the standard vehicle hitch. The tension bolt may have a threaded portion. The tension nut may have threading. The tension nut may be configured to engage the tension bolt by screwing the threaded portion of the tension bolt into the threading of the tension nut.

In a separate aspect, the present invention is related to a hitch extending device. The hitch extending device may comprise a tensioning device configured to secure the body to the standard vehicle hitch. The tension nut may comprise a tensioner pin hole. The tensioner pin hole may be configured to receive a tensioner pin. When the tension nut may be inserted into the male portion of the body, the tensioner pin hole may be aligned with the two lateral holes of the male end. The tensioner pin may then be inserted through the tensioner pin hole, the two lateral holes, and a vehicle hitch hole of the standard vehicle hitch simultaneously. The hitch extending device may preferably, but not necessarily, extend the length of a standard vehicle width.

In a separate aspect, the present invention is related to a hitch extending device. The hitch extending device may comprise a tensioning device configured to secure the body to the standard vehicle hitch. The tensioning device may comprise a washer. The washer may be secured between the tension bolt and an interior axial wall located within the female end of the body. The washer may be configured to increase the compressive force of the tensioning device and to reduce wear from the tension bolt on the interior axial wall.

In a separate aspect, the present invention is related to a hitch extending device. The hitch extending device may comprise a tensioning device configured to secure the body to the standard vehicle hitch. The tensioning device may comprise a tension bolt and a tension nut. The engagement of the tension bolt with the tension nut may be adjustable to a desired tension.

In a separate aspect, an alternative preferred embodiment of the present invention is directed to a retrofit hitch extender for a truck hitch. The retrofit hitch extender may comprise a body having a wider end and a tapered end. The tapered end may be configured for insertion into the truck hitch. The wider end may be configured for receiving standard hitch accessories. The retrofit hitch extender may also comprise a tensioning mechanism 16 for securing the body to the truck hitch. The tensioning mechanism 16 may comprise a tension rod extending axially through the body and may have a threaded end. The tensioning mechanism 16 may also comprise a tension rod receiving nut configured to engage with the threaded end of the tension rod. The tension mechanism may also comprise a flared portion extending outwardly from a portion of the tapered end of the body. When the tension rod may be engaged with the tension rod receiving nut, the tapered end may be pulled into the truck hitch and the flared portion may provide a friction fit against an inside face of the truck hitch.

In a separate aspect, the present invention is related to a retrofit hitch extender for a truck hitch. The retrofit hitch extender may comprise a tensioning mechanism 16 for securing the body to the truck hitch. The tensioning mechanism 16 may comprise a tension rod and a tension rod receiving nut. The tension rod may have a threaded portion and the tension rod receiving nut may have threading. The tension rod receiving nut may be configured to engage the tension rod by screwing the threaded portion of the tension rod into the threading of the tension rod receiving nut.

In a separate aspect, the present invention is related to a retrofit hitch extender for a truck hitch. The retrofit hitch extender may comprise a tensioning mechanism for securing the body to the truck hitch. The tensioning mechanism may comprise a tension rod and a tension rod receiving nut. The tension rod receiving nut may comprise a tension pin hole. The tension pin hole may be configured to receive a tension pin. When the tension rod receiving nut may be inserted into the tapered portion of the body, the tension pin hole may be aligned with two lateral holes of the tapered end. The tension pin may then be inserted through the tension pin hole, the two lateral holes, and a truck hitch hole of the truck hitch simultaneously.

In a separate aspect, the present invention is related to a retrofit hitch extender for a truck hitch. The retrofit hitch extender may comprise a tensioning mechanism for securing the body to the truck hitch. The tensioning mechanism may comprise a washer. The washer may be secured between the tension rod and an interior axial wall located within the wider end. The washer may be configured to increase the compressive force of the adjustable tensioning mechanism and to reduce wear from the tension rod on the interior axial wall.

In a separate aspect, the present invention is related to a retrofit hitch extender for a truck hitch. The retrofit hitch extender may comprise a body having a wider end and a tapered end. The wider end may configured to receive standard hitch accessories including, but not limited to: a bike rack, a trailer, a leaf blower, a ball mount, a tow hook, a spreader, and a toolbox.

In a separate aspect, the present invention is related to a retrofit hitch extender for a truck hitch. The retrofit hitch extender may comprise a tensioning mechanism for securing the body to the truck hitch. The tensioning mechanism may comprise a tension rod and a tension rod receiving nut. The engagement of the tension rod with the tension rod receiving nut may be adjustable to a desired tension.

In a separate aspect, the present invention may be directed to a hitch system configured to engage accessories to a vehicle. The hitch system preferably includes a hitch body configured to detachably connect to a vehicle. The detachable connection may be formed by at least two connections between the hitch body and a vehicle. The hitch body may have a connector mechanism thereon (perhaps built in) which is configured to allow a vehicle accessory to be secured thereto. In a separate aspect, the present invention may be directed to a hitch system configured to engage accessories to a vehicle. The hitch system may include a hitch body configured to detachably connect to a vehicle. The detachable connection may be formed by at least two connections between the hitch body and the vehicle. The hitch body can have a connector mechanism thereon which may be configured to allow any one of a plurality of vehicle accessories to be secured thereto.

In a separate aspect, the present invention may be directed to a hitch system configured to engage accessories to a vehicle. The hitch system may include a hitch body configured to detachably connect to a vehicle. The detachable connection can be formed by at least two connections between the hitch body and the vehicle. The hitch body may be configured to allow a vehicle accessory to be detachably secured thereto.

In a separate aspect, the present invention may be directed to a hitch system configured to engage accessories to a vehicle. The hitch system may include a hitch body configured to detachably connect to a vehicle. The vehicle can be any one of a car, truck, ambulance, all-terrain vehicle, boat, or the like.

In a separate aspect, the present invention may be directed to a hitch system configured to engage accessories to a vehicle. The hitch system is configured to allow the quick detachable connection of any one of a plurality of vehicle accessories to the hitch system.

In a separate aspect, the present invention may be directed to a hitch system configured to engage accessories to a fixed structure (such as a loading dock, concrete divider, retaining wall, floor joists, plane, or the like). The hitch system may include a hitch body configured to detachably connect to a fixed structure. The detachable connection can be formed by at least two connections between the hitch body and the fixed structure. The hitch body may be configured to allow an accessory (such as a lift gate, server cages, conveyor, or the like) to be detachably secured to the fixed structure. In a separate aspect, the present invention may be directed to a bumper system configured to engage accessories to a vehicle. The bumper system may comprise a bumper body configured to connect to a vehicle. The bumper body may be configured to allow a vehicle accessory to be detachably secured thereto. The bumper body may comprise a hitch receiver. In a separate aspect, the present invention may be directed to a bumper system configured to engage accessories to a vehicle. The bumper system may be configured to replace the vehicle's existing bumper.

In a separate aspect, the present invention may be directed to a bumper system configured to engage accessories to a vehicle. The bumper system may comprise a bumper body configured to connect to a vehicle. The bumper body may be configured with at least two engagement points for detachably engaging a vehicle accessory.

In a separate aspect, the present invention may be directed to a bumper system configured to engage accessories to a vehicle. The bumper system may comprise a bumper body configured to connect to a vehicle. The bumper body may be configured with at least three engagement points for detachably engaging a vehicle accessory. One of the engagement points may be the hitch receiver.

In a separate aspect, the present invention may be directed to a bumper system configured to engage accessories to a vehicle. The bumper system may comprise a bumper body configured to connect to a vehicle. The bumper body may be reinforced to reduce impact from collisions.

In a separate aspect, the present invention may be directed to a bumper system configured to engage accessories to a vehicle. The bumper system may comprise a bumper body configured to connect to a vehicle. The bumper body may also include a hitch extender assembly configured to increase the amount of support which can be provided to an accessory by the bumper system by having the bumper body engage a hitch in the vehicle. The hitch extender assembly may comprise a hitch extender body having a first axial end and a second axial end. The first axial end may be configured for insertion into the receiver such that the hitch extender body is detachably securable in an engaged position. The hitch extender assembly may also comprise a tension mechanism located within the hitch extender body. The tension mechanism may be configured to maintain a predetermined force between the hitch extender body and the receiver along the central receiver axis to increase stability of the hitch extender body during use.

In a separate aspect, the present invention may be directed to a bumper system configured to engage accessories to a vehicle. The bumper system may comprise a bumper body configured to connect to a vehicle. The bumper body may also include a hitch extender assembly configured to increase the amount of support which can be provided to an accessory by the bumper system by having the bumper body engage a hitch in the vehicle. The hitch extender assembly may comprise a hitch extender body having a first axial end and a second axial end. The hitch extender body may further comprise a first elongated section having the first axial end and a second elongated section having the second axial end. The first elongated section may be aligned end-to-end with the second elongated section. At least a portion of the second elongated section of the hitch extender body may be outside of the receiver when the hitch extender body may be detachably secured to the receiver. The second elongated section may be configured to receive a standard hitch accessory.

In a separate aspect, the present invention may be directed to a bumper system configured to engage accessories to a vehicle. The bumper system may comprise a bumper body configured to connect to a vehicle. The bumper body may also include a hitch extender assembly configured to increase the amount of support which can be provided to an accessory by the bumper system by having the bumper body engage a hitch in the vehicle. The hitch extender assembly may comprise a tension mechanism located within the hitch extender body. The tension mechanism may comprise a pin nut which, when not axially secured to the receiver, may be slidably positioned within a bore in the second elongated section. The tension mechanism may also comprise a fastener located in a second bore in the second elongated section. When the pin nut may be axially secured to the receiver, the fastener may be adjustable to provide a compressive force between the receiver and the hitch extender body.

In a separate aspect, the present invention may be directed to a bumper system configured to engage accessories to a vehicle. The bumper system may comprise a bumper body configured to connect to a vehicle. The bumper body may also include a hitch extender assembly configured to increase the amount of support which can be provided to an accessory by the bumper system by having the bumper body engage a hitch in the vehicle. The hitch extender assembly may comprise a tension mechanism located within the hitch extender body. The tension mechanism may also comprise a fastener located in a second bore in the second elongated section. The fastener may have a threaded portion and the pin nut may have threading. The pin nut may be configured to engage the fastener by screwing the threaded portion of the fastener into the threading of the pin nut.

In a separate aspect, the present invention may be directed to a bumper system configured to engage accessories to a vehicle. The bumper system may comprise a bumper body configured to connect to a vehicle. The bumper body may also include a hitch extender assembly configured to increase the amount of support which can be provided to an accessory by the bumper system by having the bumper body engage a hitch in the vehicle. The hitch extender assembly may comprise a tension mechanism located within the hitch extender body. The tension mechanism may also comprise a fastener located in a second bore in the second elongated section. The tension mechanism may further comprise a washer. The washer may be secured between the fastener and an interior axial wall located within the second elongated section. The washer may be configured to increase the compressive force of the tension mechanism and to reduce wear from the fastener on the interior axial wall.

In a separate aspect, the present invention may be directed to a bumper system configured to engage accessories to a vehicle. The bumper system may comprise a bumper body configured to connect to a vehicle. The bumper body may include a hitch connector configured to increase the amount of support which can be provided to an accessory by the bumper body by having the bumper body engage a hitch in the vehicle.

In a separate aspect, the present invention may be directed to a tensioned draw bar configured to engage a truck hitch. The tensioned draw bar may include a tensioned draw bar body having a first end configured for insertion into the truck hitch and having a second end configured to have a component thereon. A tensioning mechanism can be positioned within the tensioned draw bar body for securing the tensioned draw bar body to the truck hitch.

In a separate aspect, the present invention may be directed to a draw bar configured to engage a truck hitch. The tensioned draw bar may include a draw bar body having a first end configured for insertion into the truck hitch and having a second end configured to have a component thereon. A tensioning mechanism can be positioned within the draw bar body for securing the draw bar body to the truck hitch.

In a separate aspect, the present invention may be directed to a draw bar configured to engage a truck hitch. The tensioned draw bar may include a draw bar body having a first end configured for insertion into the truck hitch and having a second end configured to have a component thereon. A tensioning mechanism can be positioned within the draw bar body for securing the draw bar body to the truck hitch. The component can be any desired attachment. For example only, some components could be a hitch ball, a multiple hitch ball device, a platform, a bicycle rack, a cargo carrier, a leaf blower, a salt spreader, traffic safety lights, etc.

In a separate aspect, the present invention may be directed to a bumper system configured to engage accessories to a vehicle. The bumper system may be configured to engage accessories to a vehicle. The bumper system may comprise a bumper body configured to connect to the vehicle. The bumper body may have a connector mechanism thereon which may be configured to allow a vehicle accessory to be secured thereto.

In a separate aspect, the present invention may be directed to a bumper system configured to engage accessories to a vehicle. The bumper system may comprise a bumper body configured to connect to a vehicle. The bumper body may further comprise a plurality of engagement points located on one of on the bumper body and in the bumper body. The vehicle accessory may be configured be detachably secured to the plurality of engagement points of the bumper body.

In a separate aspect, the present invention may be directed to a bumper system configured to engage accessories to a vehicle. The bumper system may comprise a bumper body configured to connect to a vehicle. The bumper body may comprise a hitch receiver. The bumper body may be configured with at least three engagement points for detachable engaging a vehicle accessory. One of the engagement points may be the hitch receiver.

In another preferred embodiment, the present invention may comprise a bumper system configured to engage accessories to a vehicle. The bumper system can have a bumper body configured to connect to a vehicle. The bumper body being configured to allow a vehicle accessory to be detachably secured thereto.

In a separate aspect, the bumper body may preferably be configured to allow multiple different accessories to be each be quick attached to the bumper to facilitate the easy changing between different accessories. Examples of accessories are, but are not limited to, salt spreaders, mulchers, leaf blowers, ramps, lift platforms, liftgates, concrete mixers, conveyors, or the like.

The bumper body may comprise a hitch receiver to provide an additional engagement point for accessories. The hitch receiver can be centrally located in the bumper or be positioned at a lower or upper end of the bumper body. Additionally, the bumper body may include multiple hitch receivers without departing from the scope of the present invention.

The bumper system may be configured to replace a vehicle's existing bumper in a retrofit fashion. Alternatively, the bumper system can come as part of a finished vehicle that is manufactured and presented for original sale to a customer.

It is preferable that the bumper body may be configured with at least two engagement points for detachable engaging a vehicle accessory. An engagement point may be any slot, pin, connector or that like that allows for positive engagement and/or latching and/or interlocking between the bumper body and a vehicle accessory. In one embodiment, the bumper body may be configured with at least three engagement points for detachable engaging a vehicle accessory, one of the engagement points being the hitch receiver which is part of the bumper body.

The bumper body can be reinforced to reduce impact from collisions. This can be provided by manufacturing the bumper body with multiple layers of material or by including reinforcement members therein. Alternatively, the bumper can be formed of heavy weight steel to ensure strength and durability.

The bumper system may include a liftgate accessory. The liftgate accessory may be detachably connected to the bumper body. The liftgate accessory can be configured to assist a user in moving a load from a ground level to an elevated level.

The bumper body may include a hitch extender assembly configured to facilitate connection to a preexisting vehicle hitch receiver. The bumper body hitch extender may increase the amount of support which can be provided to an accessory by the bumper body/system by having the bumper body engage the preexisting hitch in the vehicle. Especially when the bumper system is retrofit onto a vehicle, the engagement of the bumper body hitch extender to the existing vehicle hitch receiver can greatly increase the strength and durability of the bumper body. This can facilitate the use of extremely heavy vehicle accessories that are detachably connected to the bumper body.

The hitch extender may include a hitch extender body having a first axial end and a second axial end. The first axial end can be configured for insertion into the receiver such that the hitch extender body is detachably securable in an engaged position. A tension mechanism may be located within the hitch extender body. The tension mechanism can be configured to maintain a predetermined force between the hitch extender body and the vehicle's original hitch receiver along a central receiver axis to increase stability of the hitch extender body during use.

The hitch extender body may also include a first elongated section having the first axial end and a second elongated section having the second axial end, the first elongated section being aligned end-to-end with the second elongated section. At least a portion of the second elongated section of the hitch extender body can be outside of the receiver when the hitch extender body is detachably secured to the receiver, the second elongated section may be configured to receive a standard hitch accessory.

The tension mechanism may further comprise a pin nut which, when not axially secured to the receiver, could be slidably positioned within a bore in the second elongated section. A fastener may be located in a second bore in the second elongated section. It is preferred that when the pin nut is axially secured to the receiver, the fastener is adjustable to provide a compressive force between the receiver and the hitch extender body.

The fastener may have a threaded portion and the pin nut may have threading. The pin nut can be configured to engage the fastener by screwing the threaded portion of the fastener into the threading of the pin nut.

The tension mechanism may include a washer that can be secured between the fastener and an interior axial wall located within the second elongated section. The washer may be configured to increase the compressive force of the tension mechanism and to reduce wear from the fastener on the interior axial wall.

Those of ordinary skill in the art will appreciate from this disclosure that one advantage of the bumper body having a built-in hitch extender is that it allows for the bumper to provide greater support to accessories while the hitch extender can provide a potential engagement point for accessories.

Alternatively, the bumper body may include a hitch connector for insertion into the original vehicle hitch receiver and have separate hitch receivers located on the bumper and/or built into the bumper.

In one embodiment, the bumper body also includes a hitch connector configured to increase the amount of support which can be provided to an accessory by the bumper body by having the bumper body engage a hitch in the vehicle.

In another embodiment, the present invention is directed to a bumper system configured to engage accessories to a vehicle. The bumper system preferably includes a bumper body configured to connect to a vehicle. The bumper body can be configured to allow a vehicle accessory to be detachably secured thereto in a non flexible manner such that the vehicle accessory is supportable off the ground during normal driving of the vehicle.

In another embodiment, the present invention is directed to a bumper system configured to engage accessories to a vehicle. The bumper system may include a bumper body configured to connect to the vehicle. The bumper body preferably has a connector mechanism thereon which is configured to allow a vehicle accessory to be secured thereto in a non flexible manner such that the vehicle accessory is supportable off the ground during normal driving of the vehicle.

In another embodiment, the bumper system may include a bumper body configured to be located on the vehicle. The bumper body may engage a connector mechanism which is configured to allow a vehicle accessory to be secured thereto. The vehicle accessory may be configured to detachably secure to a plurality of engagement points of the bumper body.

The bumper body may include a hitch receiver, wherein the bumper body is configured with at least three engagement points for detachable engaging a vehicle accessory, one of the engagement points being the hitch receiver.

The bumper body may also include a hitch extender assembly configured to increase the amount of support which can be provided to an accessory by the bumper body engaging a hitch receiver in the vehicle whiles also providing an engagement point for securing the connector mechanism or vehicle accessory thereto.

In a separate aspect, the present invention may be directed to a vehicle hitch extender. The vehicle hitch extender may be attached to a vehicle-particularly a vehicle hitch. The vehicle hitch extender may extend a standard vehicle hitch anywhere between one inch (1") and two feet (2') without departing from the scope of the present invention. The vehicle hitch extender may have a mechanism for tensioning and securing the vehicle hitch extender to a vehicle hitch.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

FIG. 20 is a top, front perspective view of the hitch extender 50 in the preferred embodiment. Here, the broken lines may depict how the tensioner screw 60 may be engaged with the tensioner nut 62 within the hitch extender body 52. The threads of the tensioner screw 60 may be screwed into the threaded portion 63 of the tensioner nut 62.

DETAILED DESCRIPTION OF THE PREFERRED EMBODIMENT

Figure 1:
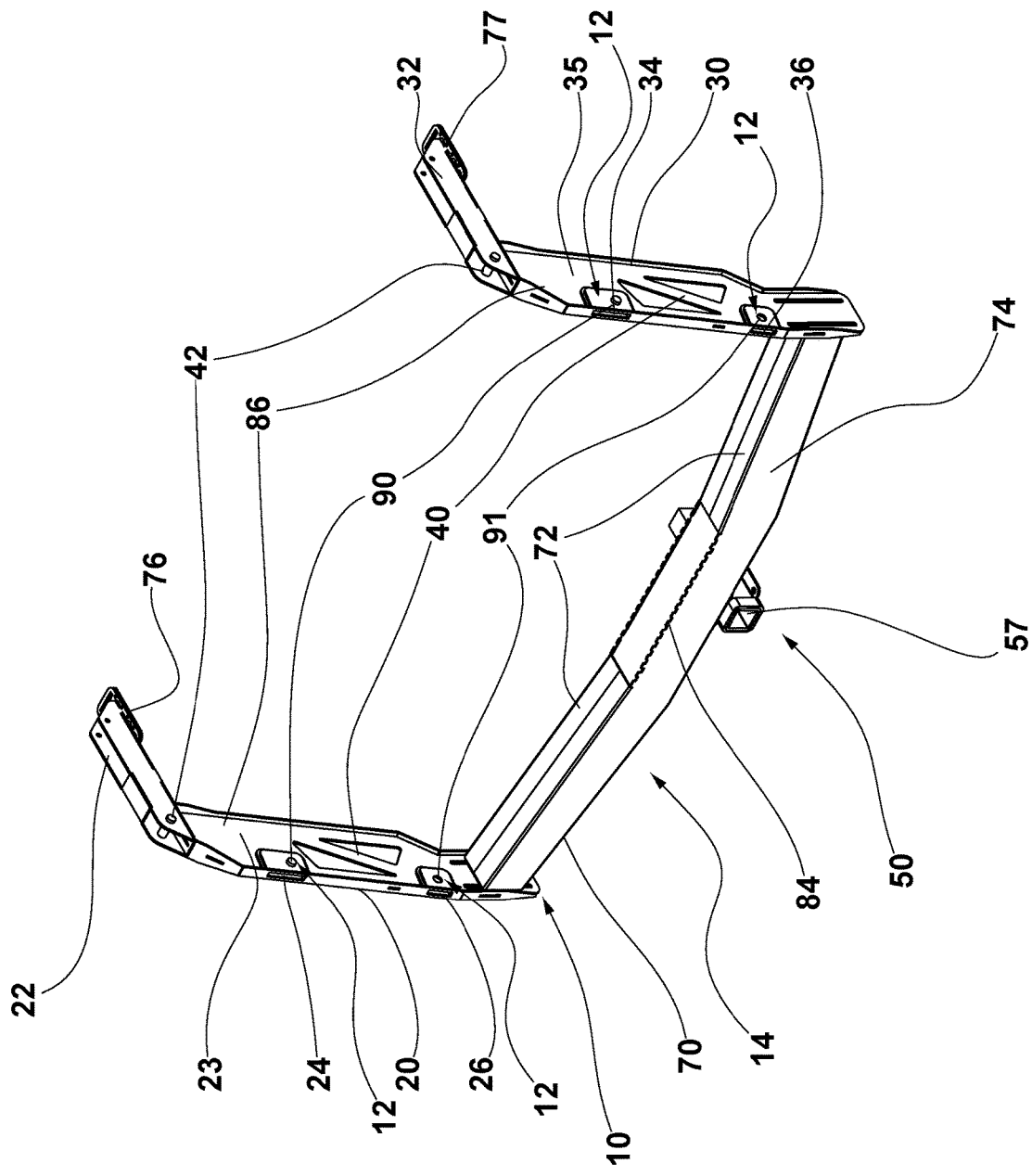
FIG. 1 is a top, front perspective view of a hitch system 10 in the preferred embodiment. Here, it may be seen that the hitch system 10 may comprise a hitch body 14. The hitch body 14 may comprise a first arm 20 and a second arm 30. The first arm 20 may have a first arm extension 22 extending laterally from the top of the first arm 20. Similarly, the second arm 30 may have a second arm extension 32 extending laterally from the top of the second arm 30. The first arm extension 22 and the second arm extension 32 may be reinforced by support pins 42. In this figure, the first arm inner surface 23 of the first arm 20 and the second arm outer surface 35 of the second arm 30 may be seen. The first arm 20 and the second arm 30 may have cutaway sections 40 located thereon. The first arm 20 and the second arm 30 may also have a first upper attachment slot 24 and a second upper attachment slot 34, respectively. Additionally, the first arm 20 and second arm 30 may have a first lower attachment slot 26 and a second lower attachment slot 36, respectively. Together, the attachment slots 24, 26, 34, 36 may comprise a connector mechanism 12. The first arm 20 may be connected to the second arm 30 by a reinforcement bar 70. The reinforcement bar 70 may extend from the first arm 20 at one distal end to the second arm 30 at the opposite distal end. The reinforcement bar 70 may have a top surface 72 and a front surface 74. The reinforcement bar 70 may also have a grooved step portion 84 to allow user to stand on the reinforcement bar 70 more easily and with more traction. The first arm extension 22 may have a first attachment plate 76, and the second arm extension 32 may have a second attachment plate 77. The first attachment plate 76 and the second attachment plate 77 may be two connection points for the hitch system 10 to connect to a vehicle. A hitch extender 50 may also be seen extending perpendicularly below the reinforcement bar 70. The hitch extender 50 may be a third connection point for the hitch system 10 to connect to the vehicle.

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the hitch system 10 and/or the hitch extender 50. The terms "downward" and "upward" refers to directions above (or away from) and below (or toward) the reinforcement bar 70 during operation, respectively, unless specified otherwise. The terms "forward" and "front" refer to a direction outwardly and away from the front surface 74 of the reinforcement bar 70 of the hitch system 10 and/or the female end 57 of the hitch extender 50, and the term "rear" and "back" refers to a direction outwardly and away from the back surface 75 of the reinforcement bar 70 of the hitch system 10 and/or the male end 55 of the hitch extender 50. The terms "axial" and "radial" refer to directions along the axis of rotation A and/or B and around the axis of rotation A and/or B, respectively. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring generally to FIGS. 1-39, wherein like numerals indicate like elements throughout, the hitch system 10 and/or the hitch extender 50 are disclosed in their preferred embodiments. One of ordinary skill in the art would appreciate from this disclosure that the present invention may be attached to any vehicles and provide mechanisms for connecting additional accessories without departing from the scope of the present invention. The present invention may be entirely manually/hand driven and be free of (and/or not use) any motors, hydraulics, electrical devices, or similar drive producing mechanisms.

Figure 2:
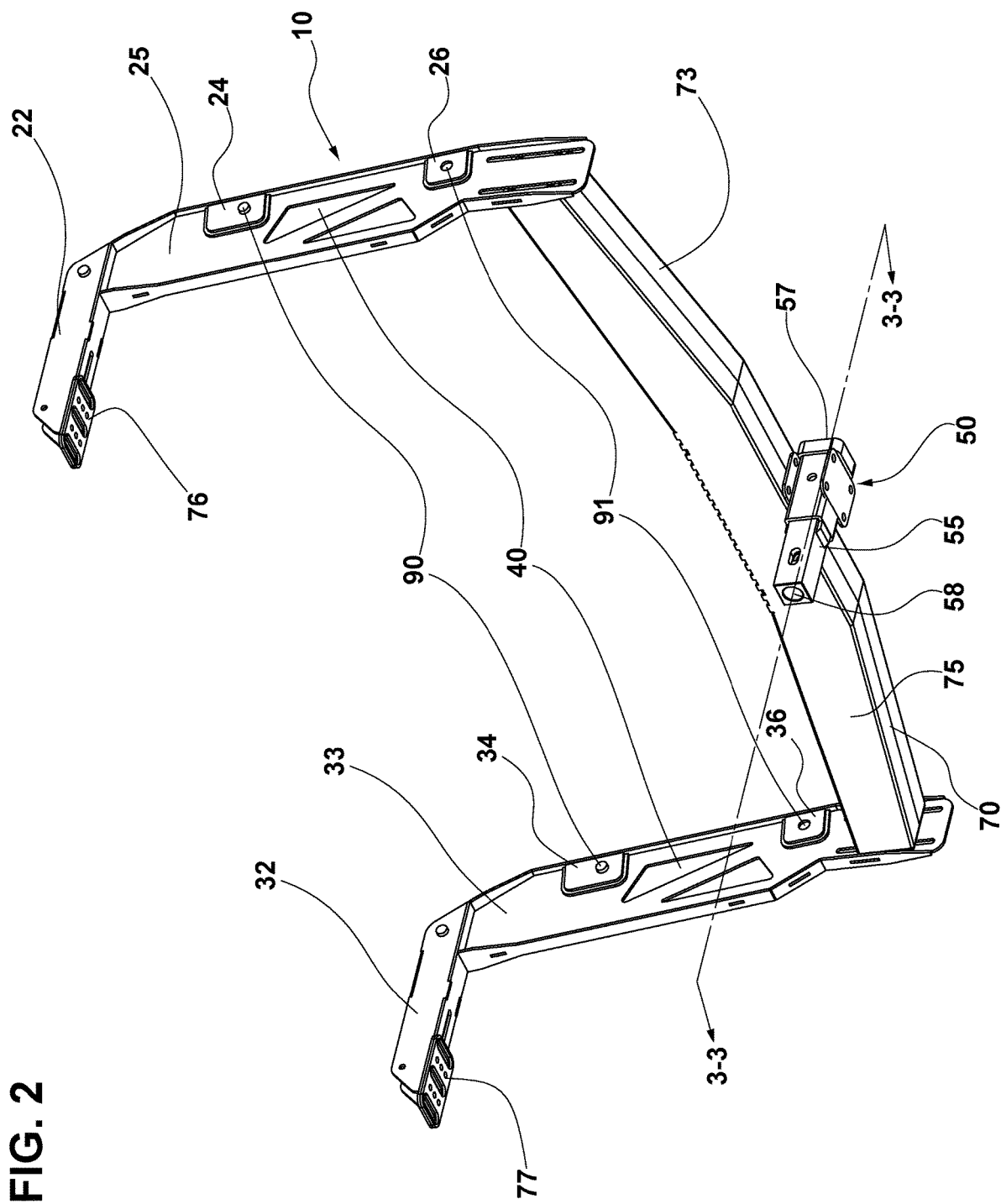
FIG. 2 is a bottom, rear perspective view of a hitch system 10 in the preferred embodiment. Here, the hitch extender 50, the first arm 20 and the second arm 30 may be seen in more detail. The hitch extender 50 may have a male end 55 and a female end 57. A hole 58 may extend through the male end 55 and the female end 57. The reinforcement bar 70 may have a rear surface 75 and a bottom surface 73. The first and second upper attachment slots 24, 34 may have a fixed pin 90 extending therethrough. The first and second lower attachment slots 26, 36 may have a pin receiving hole 91 extending therethrough. The first and second attachment plates 76, 77 may have a plurality of holes to allow the first arm 20 and the second arm 30 to be bolted or otherwise attached to a vehicle. The first outer surface 25 of the first arm 20 and the second inner surface 33 of the second arm 30 may also be seen.
Figure 3:
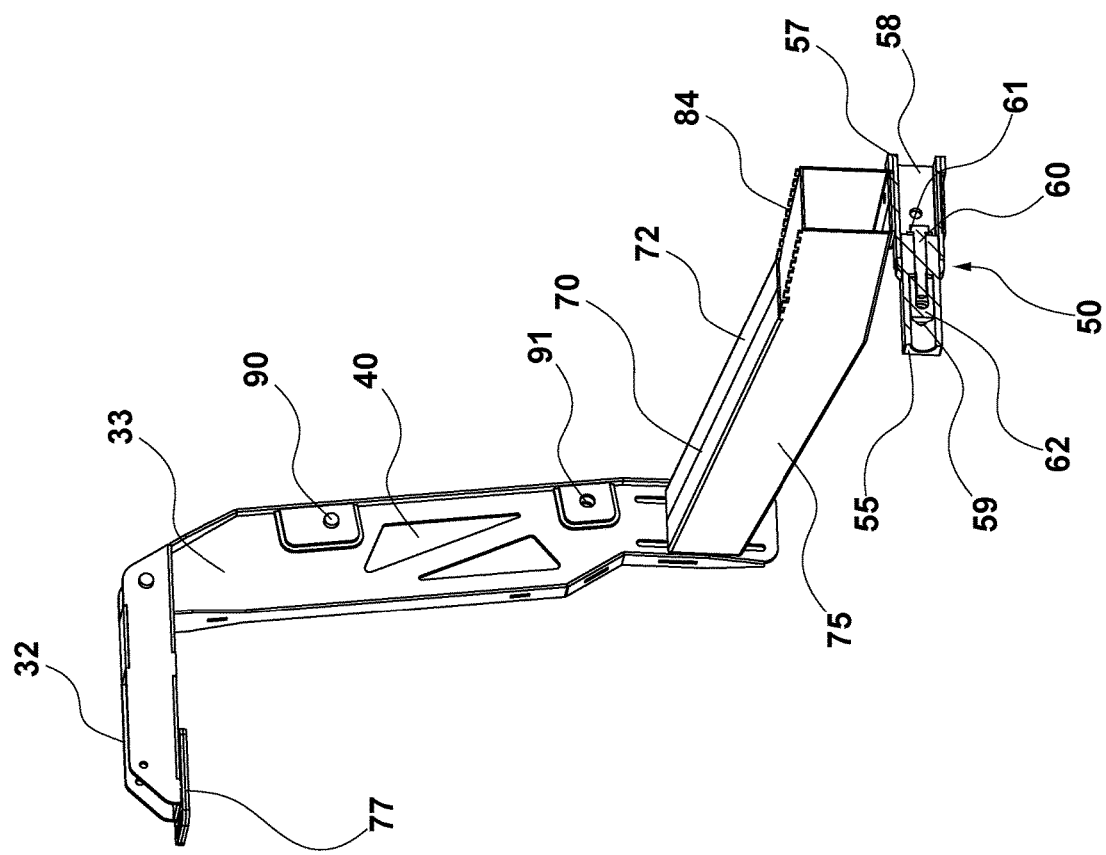
FIG. 3 is a partial-perspective, cross-sectional view of the hitch system 10 taken along the line 3-3 of FIG. 2. Here, the inside of the hitch extender 50 and the reinforcement bar 70 may be seen. The top surface 72 of the reinforcing bar 70 may be open in an area adjacent to the grooved step portion 84. The top surface 72 may be lowered in the area adjacent to the grooved step portion 84. The inside of the reinforcement bar 70 may be hollow. The hitch extender 50 may have a hitch pin hole 59 located on a lateral side of the female end 57. A tensioner screw 60 including a washer 61 may extend from the female end 57 to engage with a tensioner nut 62 located on the male end 55.

Referring generally to FIGS. 1-3, a hitch system 10 may be seen on its own and disconnected from a vehicle. The hitch system 10 may comprise a hitch body 14 comprising a first arm 20 and a second arm 30. The first arm 20 and the second arm 30 may be configured to connect to a vehicle. Those or ordinary skill in the art will appreciate from this disclosure that a vehicle may be a car, truck, SUV, boat, or the like without departing from the scope of the present invention. Preferably, the hitch system 10 has two arms. One of ordinary skill in the art will appreciate from this disclosure that the present invention may have zero, one, two, and/or three or more arms without departing from the scope of the present invention. The first arm 20 may comprise a first arm extension 22. Similarly, the second arm 30 may comprise a second arm extension 32. The first and second arm extensions 22, 32 may extend perpendicularly from the tops of the first and second arms 20, 30, respectively. The first and second arm extensions 22, 32 may be reinforced by support pins 42. The first and second arms 20, 30 may be interchangeable without departing from the scope of the present invention. The first and second arm extensions 22, 32 may also comprise first and second attachment plates 76, 77, respectively. The first and second attachment plates 76, 77 may be configured to be detachably affixed to the vehicle. The first and second attachment plates 76, 77 may comprise holes to allow bolts to be screwed therethrough. One of ordinary skill in the art would appreciate from this disclosure that the bolts may be replaced with any other sufficient fastening and/or connecting mechanism without departing from the scope of the present invention. One of ordinary skill in the art would also appreciate from this disclosure that the hitch system 10 may be configured to not connect to the bumper 109 of a vehicle without departing from the scope of the present invention. One of ordinary skill in the art would also appreciate from this disclosure that the hitch system 10 may be configured to not connect to the bumper 109 of a vehicle, not including any portions of the hitch system 10 which abut the bumper, without departing from the scope of the present invention.

It is preferred that the hitch body is not a bumper. It is also preferred that the hitch body is also not a standalone or aftermarket hitch receiver or the like. It is also further preferred that the hitch body is not nor are any of the connector mechanisms 12 formed by a winch.

It is preferred, but not necessary, that the connector mechanism comprises a plurality of connectors each spaced at least a predetermined distance from each other. The predetermined distance being preferably greater than two and a half inches. The predetermined distance being more preferably greater than three inches. The predetermined distance being preferably equal to or between three (3) inches and one hundred twenty (120) inches. The predetermined distance being preferably equal to or between three (3) inches and eighty (80) inches. The predetermined distance being more preferably equal to or between three (3) inches and sixty (60) inches. The predetermined distance being more preferably still equal to or between 10 inches and 40 inches.

Still referring to FIGS. 1-3, the first arm 20 and the second arm 30 may have a first arm inner surface 23 and a second arm inner surface 33, respectively, facing inwardly. The first arm 20 and the second arm 30 may also have first and second outer surfaces 25, 35 facing outwardly, respectively. Preferably, but optionally, the first and second arms 20, 30 may include cutaway sections 40. The cutaway sections 40 may help to reduce material cost, weight, and/or reduce drag without departing from the scope of the present invention. The hitch body 14 may include a connector mechanism 12 for detachably engaging a plurality of different vehicle attachments/accessories. It is preferred that the connector mechanism 12 is configured to detachably engage the vehicle accessory in a non flexible manner such that the vehicle accessory is supportable off the ground during normal driving of the vehicle. The engagement of a vehicle accessory "in a non flexible manner" preferably means that the connection is not via a cable, rope, or chains such that the accessory is biased against moving or shifting in position relative to the hitch body once the vehicle accessory is secured thereto. It is preferred that the vehicle accessory can be supported off of the ground during normal driving of the vehicle. The first and second arms 20, 30 may also comprise a plurality of attachment slots 24, 26, 34, 36. The plurality of attachment slots 24, 26, 34, 36 may comprise a first coupling mechanism. The first upper attachment slot 24 of the first arm 20 and the second upper attachment slot 34 of the second arm 30 may each have a fixed pin 90. The fixed pin 90 may be designed to engage with a hook or other similarly suitable attachment device. The first lower attachment slot 26 of the first arm 20 and the second lower attachment slot 36 of the second arm 30 may comprise a pin receiving hole 91. Once a corresponding attachment device of a vehicle accessory may be inserted into the first and second lower attachment slots 26, 36, an attachment pin may be inserted through the pin receiving hole 91. One of ordinary skill in the art would appreciate from this disclosure that the fixed pin 90 and the pin receiving hole 91 in conjunction with an attachment pin may be substituted for any other suitable attachment mechanism as desired without departing from the scope of the present invention.

Still referring to FIGS. 1-3, the hitch system 10 may comprise a reinforcement bar 70 connecting the first and second arms 20, 30. The reinforcement bar 70 may have a top surface 72, a bottom surface 73, a front surface 74, and a back surface 75. The first arm 20 may be connected to one distal end of the reinforcement bar 70. The second arm 30 may be connected to another distal end of the reinforcement bar 70. The reinforcement bar 70 may include a grooved step portion 84 located along the top surface 72. The grooved step portion 84 may allow a user of the hitch system 10 to stand on the reinforcement bar 70 with increased traction and grip. The reinforcement bar 70 may be hollow. The grooved step portion 84 may extend partially or fully along the top surface 72 without departing from the scope of the present invention.

The reinforcement bar 70 preferably has a curve such that a medial portion thereof is located downwardly from its axial ends. This provides an upwardly facing curve to facilitate a tailgate laying there over so that any curvature to the tailgate is accommodated. While a particular curvature and structure of the first and second arms 20, 30 is shown, those of ordinary skill in the art will appreciate from this disclosure that the construction of the arms, the use of cutouts, reinforcement pins, and the particular shape disclosed can be varied without departing from the present invention.

Referring still to FIGS. 1-3, the hitch system 10 may comprise a hitch extender 50 (embodiments of which are also referred to as a tensioned draw bar, a tensioned bar, or as a draw bar below). The hitch extender 50 may have a male end 55 and a female end 57. The male end 55 may be configured to be inserted into and engage with a standard vehicle hitch. The female end 57 may be configured to allow standard hitch attachments, such as another hitch extender 50, a bike rack, a trailer, a leaf blower, a ball mount, a tow hook, a spreader, and a toolbox, to be connected thereto.

Referring specifically to FIG. 3, the hitch extender 50 may be seen in a little more detail. A hole 58 may extend through the female end 57 to the male end 55. The hitch extender 50 may also have a tensioning mechanism 16, or device. The tensioning mechanism 16 may include a tensioner screw 60 and a tensioner nut 62 configured for engagement with one another. The tensioning mechanism 16 may allow the hitch extender 50 to be more securely attached to a vehicle hitch. The hitch extender 50 may be described later in further detail in relation to FIGS. 17-21. As can also be seen in FIG. 3, the reinforcement bar 70 may be hollow. However, one of ordinary skill in the art would appreciate from this disclosure that the reinforcement bar 70 may be solid without departing from the scope of the present invention. One of ordinary skill in the art will appreciate from this disclosure that the reinforcement bar 70 may be round, triangular, flat, X-shaped, or any other desired polyhedral shape with departing from the scope of the present invention.

Referring now generally to FIGS. 4-8, the hitch system 10 may be seen connected to a truck bed 101. This configuration of the hitch system 10 may be shown without any further attachments or accessories connected thereto. The hitch system 10 may be configured to have at least three connections to the truck, or vehicle, with at least one of those connections being to the hitch receiver 120 of the truck, or vehicle. One of ordinary skill in the art would appreciate from this disclosure that the hitch system may have exactly three connections with the truck, or vehicle, not including touching other portions of the truck, or vehicle, without departing from the scope of the present invention. The truck bed 101 may have a first bed rail 102 and a second bed rail 104. The first attachment plate 76 of the first arm 20 may be configured to be detachably affixed to a first truck stake pocket 103 on the first bed rail 102. Similarly, the second attachment plate 77 of the second arm 30 may be configured to be detachably affixed to a second truck stake pocket 105 on the second bed rail 104. The truck bed 101 may also have a truck bed bottom 106 and a tailgate 110. The tailgate 110 may have a tailgate front surface 112, tailgate top edge 114, and a tailgate back surface 116. The truck bed 101 may also include taillights 108 and a bumper 109. One of ordinary skill in the art would appreciate from this disclosure that the profile of the hitch system 10 may be designed so as to not obstruct the potential movement of the tailgate 110 nor the light produced by the taillights 108. Accordingly, it is preferred but not necessary, that the hitch assembly 10 does not overlie any portion of the taillights 108. That is, it is preferred, but not necessary, that none of the taillight is obstructed by the hitch assembly 10 which preferably is positioned on an inner side of each of the taillights 108. Alternatively, it is preferred, but not necessary, that the hitch assembly does not overlie more than 40% of the taillights 108. More preferably still, it is preferred that the hitch assembly does not overlie more than 20% of the taillights 108.

One of ordinary skill in the art will appreciate that while the hitch system 10 and hitch extender 50 are preferably used with the truck, that they can be used with a boat, golf cart, loading dock, or any other vehicle or system capable of making positive engagement therewith. Similarly, while the hitch extender and components of the hitch system 10 are shown having a generally rectilinear cross-section, those of ordinary skill in the art will appreciate from this disclosure that the hitch extender 50 and components of the hitch system 10 can have a circular or non-rectilinear cross-section without departing from the scope of the present invention.

Figure 4:
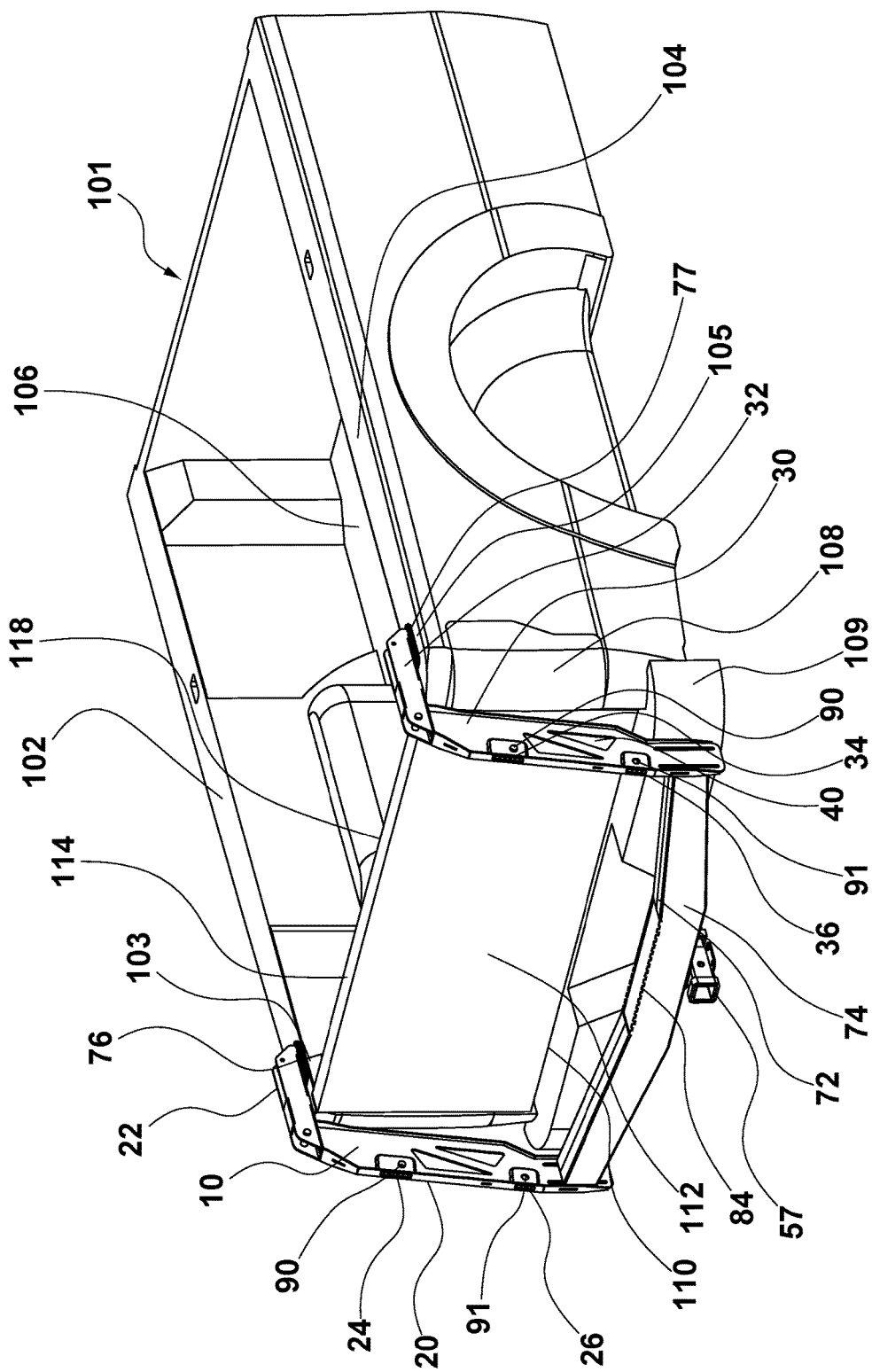
FIG. 4 is a top, front perspective view of the hitch system 10 in the preferred embodiment. Here, the hitch system 10 may be seen connected to a truck bed 101. The truck bed 101 may have a first bed rail 102 and a second bed rail 104. The first attachment plate 76 of the first arm 20 may be detachably affixed to a first truck stake pocket 103 on the first bed rail 102. The second attachment plate 77 of the second arm 30 may be detachably affixed to a second truck stake pocket 105 on the second bed rail 104. The truck bed 101 may also have a truck bed bottom 106. A taillight 108 may be located on each of the first and second bed rails 102, 104. The truck bed 101 may also have a bumper 109 extending from the truck bed bottom 106. The truck bed 101 may also have a tailgate 110. The tailgate 110 may have a tailgate front surface 112 and a tailgate top edge 114. In this figure, the tailgate 110 may be shown in a first, upright position 118.
Figure 5:
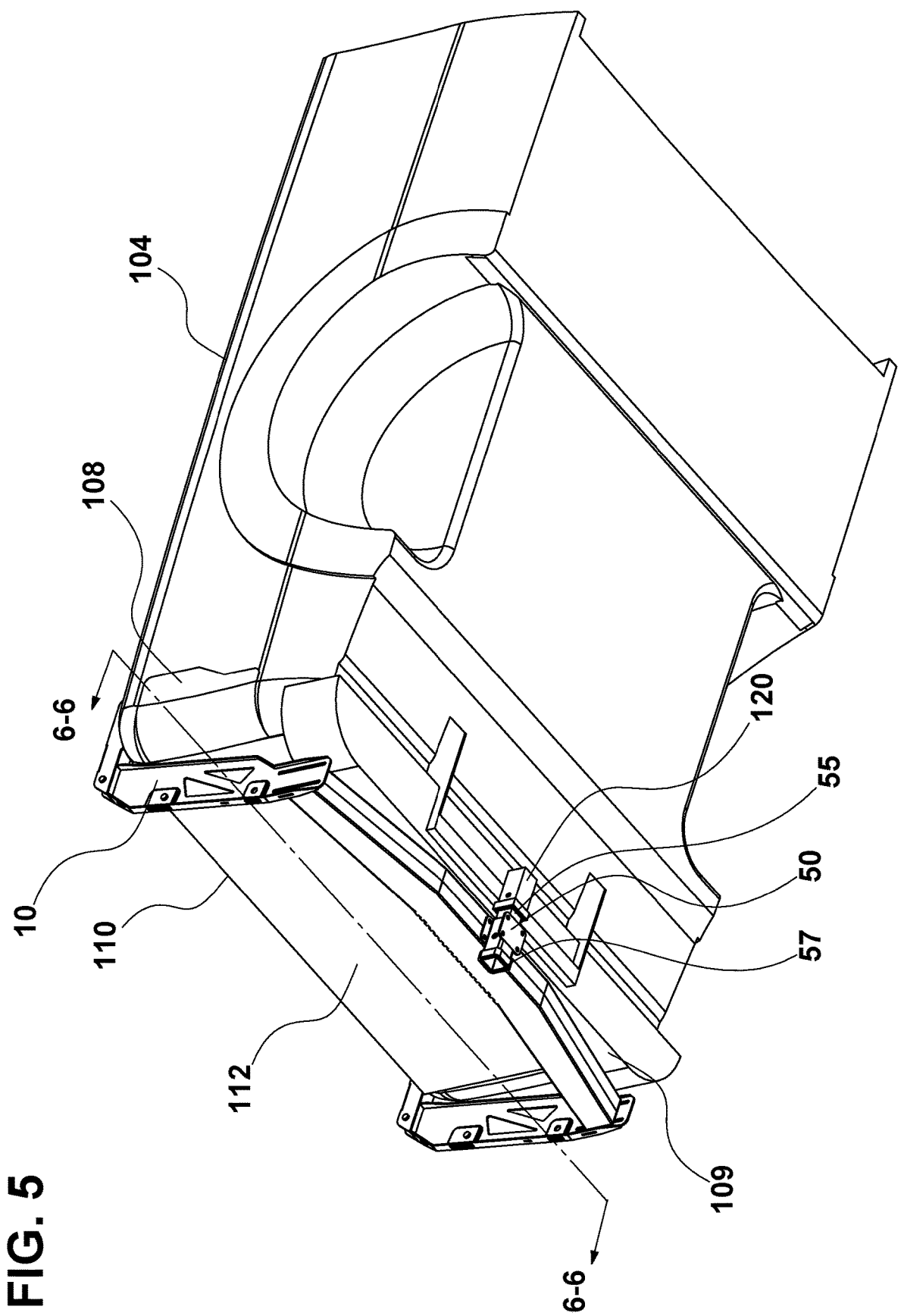
FIG. 5 is a bottom, front perspective view of the hitch system 10 connected to a truck bed 101 in the preferred embodiment. This figure illustrates how the male end 55 of the hitch extender 50 may be engaged with a truck hitch 120 forming a third connection point with the truck bed 101.
Figure 6:
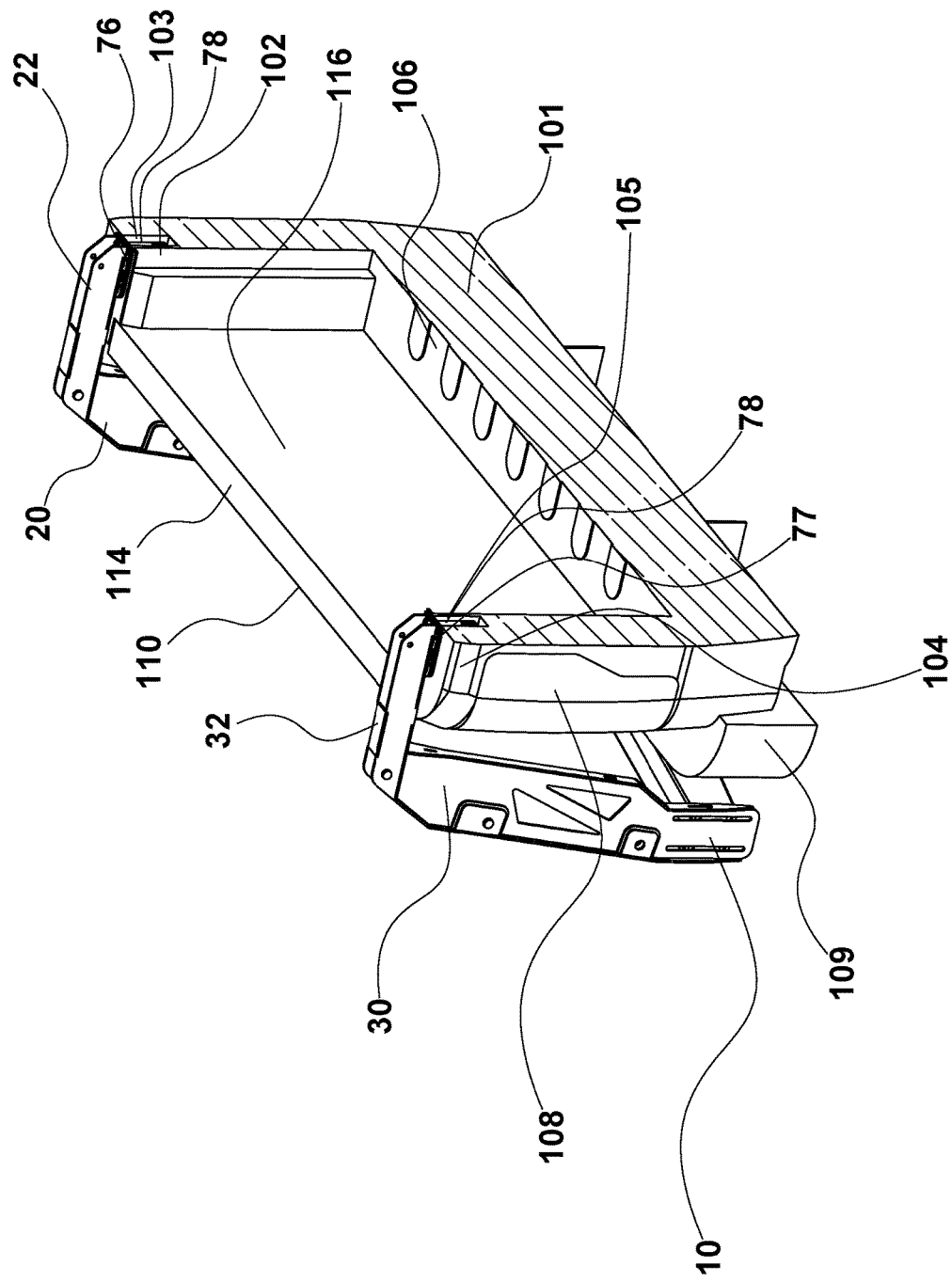
FIG. 6 is a partial-perspective, cross-sectional view of the hitch system 10 taken along the line 6-6 of FIG. 5. Here, the first truck stake pocket 103 and the second truck stake pocket 105 may be seen in more detail. A plurality of bolts 78 may be seen connecting the first truck stake pocket 103 to the first attachment plate 76 and the second truck stake pocket 105 to the second attachment plate 77. A tailgate back surface 116 of the tailgate 110 may also be seen facing the inside of the truck bed 101.

Referring specifically to FIGS. 4-6, the tailgate 110 may be seen in a first, upright position 118. When the tailgate 110 is in the first, upright position 118, the truck bed bottom 106 may be delineated at one end by the tailgate 110.

Figure 7:
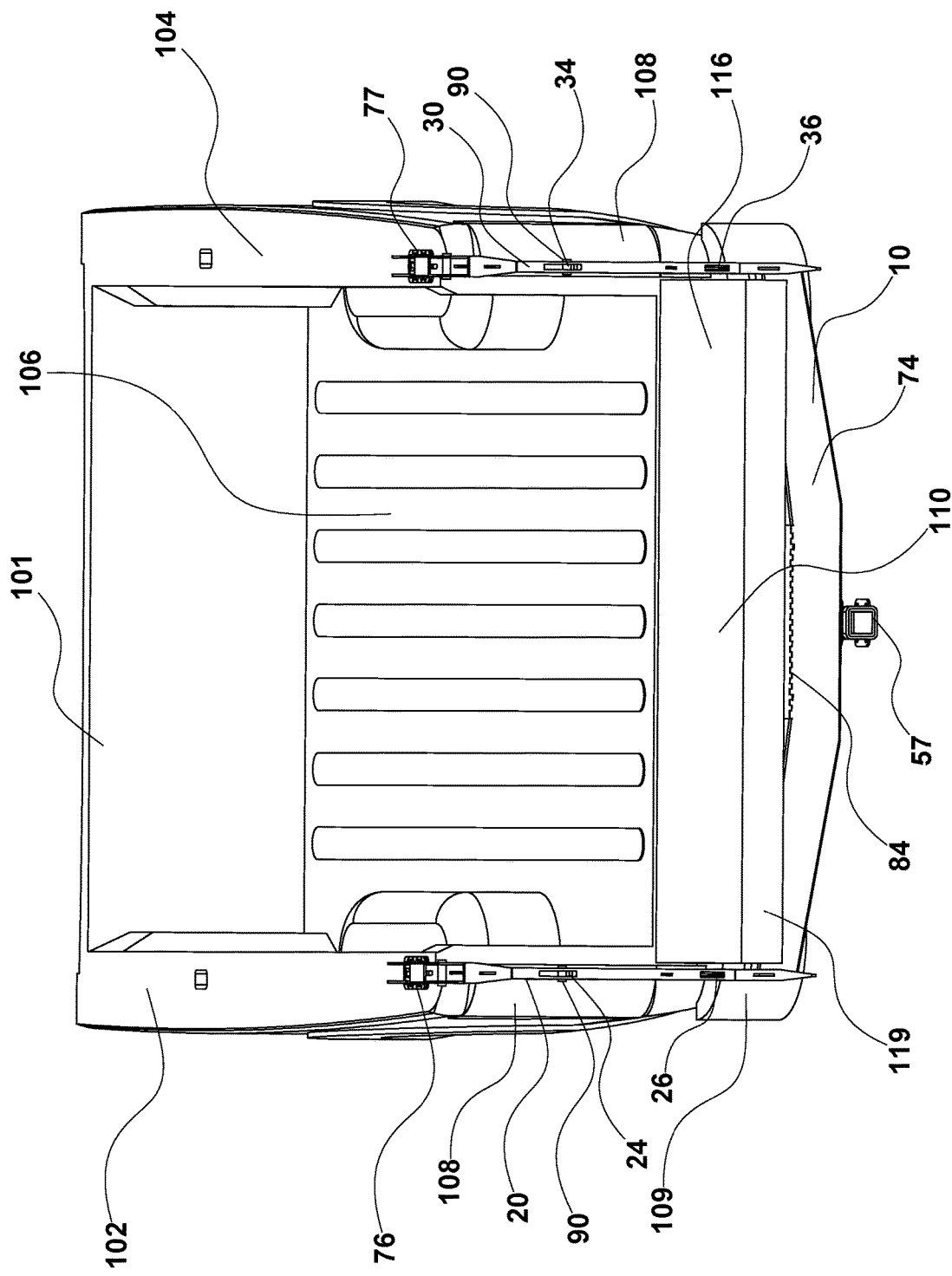
FIG. 7 is a top, front view of the. hitch system 10 connected to a truck bed 101 in the preferred embodiment. Here, the tailgate 110 can be seen in the second, lowered position 119. When the tailgate 110 may be in the second, lowered position 119, the tailgate 110 may be coplanar with the truck bed bottom 106. This figure also illustrates how the first arm 20 and the second arm 30 do not obstruct the taillights 108.
Figure 8:
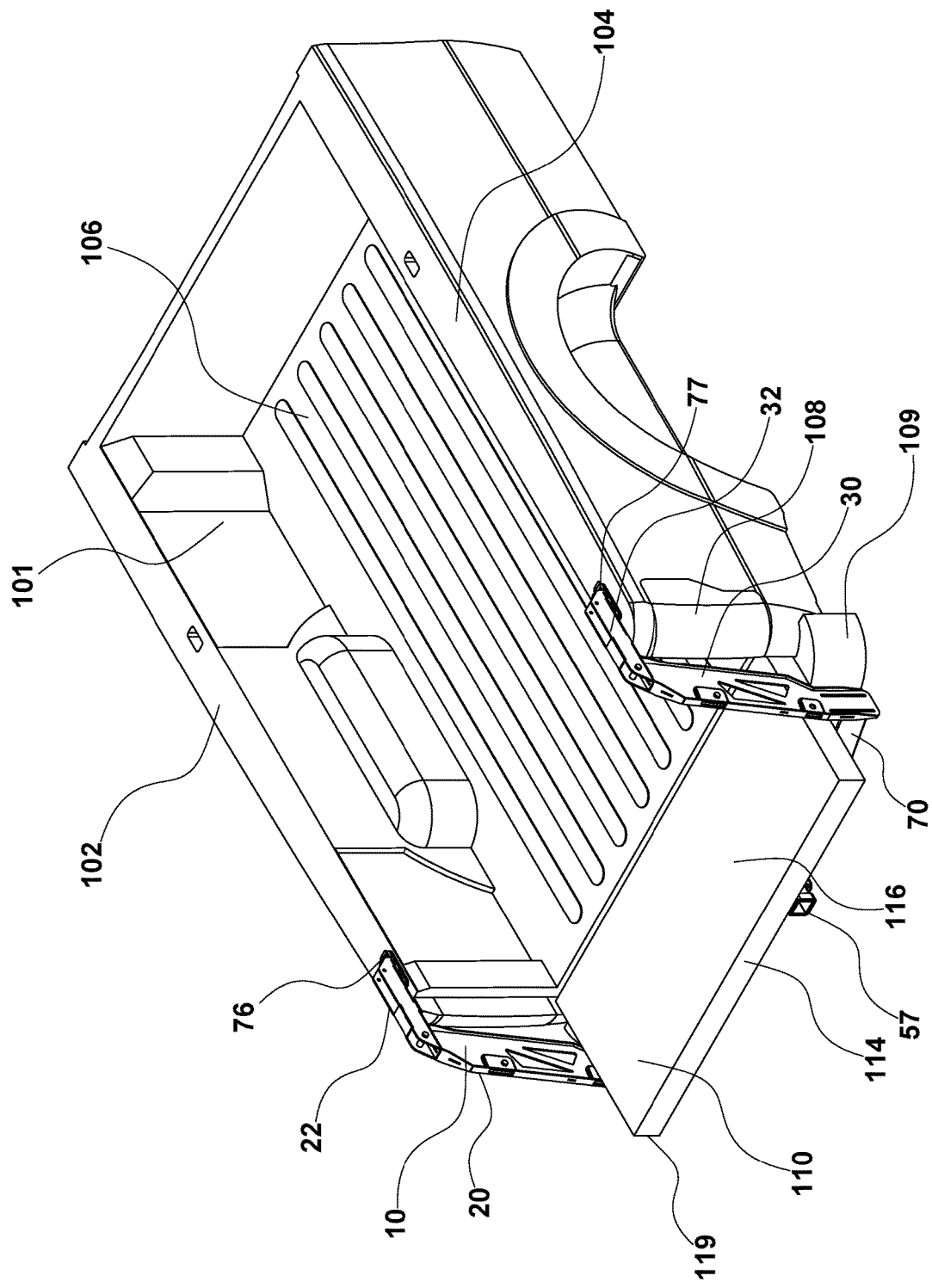
FIG. 8 is a top, front perspective view of the hitch system 10 connected to a truck bed 101 in the preferred embodiment. Here, it can be seen how when the tailgate 110 may be rotated from the first, upright position 118 to the second, lowered position 119, the hitch system 10 may not obstruct the tailgate 110 from fully lowering to be coplanar with the truck bed bottom 106.

Referring specifically to FIGS. 7 and 8, the tailgate 110 may be seen in a second, lowered position 119. When the tailgate 110 is in the second, lowered position 119, the truck bed bottom 106 may be effectively extended by the tailgate back surface 116. When the tailgate 110 may be moved between the first, upright position 118 and the second, lowered position 119, the hitch system 10 does not interfere with this relative rotation of the tailgate 110. The above mentioned upwardly opening curve in the reinforcement bar 70 facilitates the full extension of the tailgate 114 thereover without abutting the tailgate 114.

Figure 9:
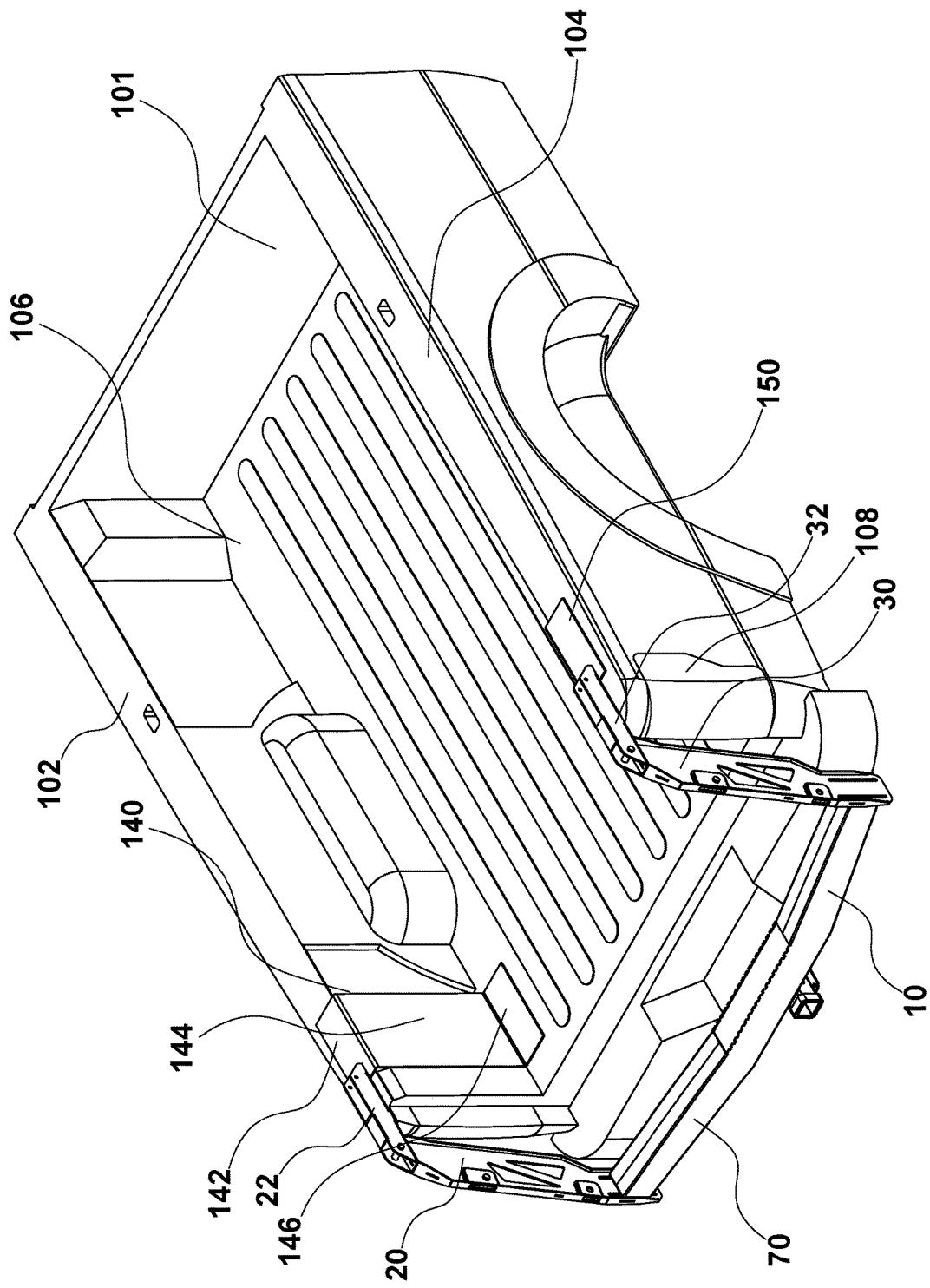
FIG. 9 is a top, front perspective view of the hitch system 10 connected to a truck bed 101 in an alternative preferred embodiment. Here, the first and second attachment plates 76, 77 may be replaced by first and second attachment braces 140, 150. The first and second attachment braces 140, 150 may be identical. The first attachment brace 140 may have a first upper brace portion 142 in contact with the top of the first bed rail 102. The first attachment brace 140 may also have a first brace lower portion 146 connected to the first upper brace portion 142 via a first brace intermediary portion 144. The first brace lower portion 146 may be connected to the truck bed bottom 106. The first and second attachment braces 140, 150 may be connected to the hitch system 10 by the first and second arm extensions 22, 32. The first and second attachment braces 140, 150 may provide further stability as opposed to the first and second attachment plates 76, 77. This figure may also illustrate how the tailgate 110 may be fully removed from the truck bed 101 without departing from the scope of the present invention.

Referring now to FIG. 9, the hitch system 10 may be seen in a first alternative preferred embodiment. The first and second attachment plates 76, 77 may substitute with first and second attachment braces 140, 150. However, one of ordinary skill in the art will appreciate that the first and second attachment plate 76, 77 may also be used in conjunction with the first and second attachment braces 140, 150 without departing from the scope of the present invention. The first and second attachment braces 140, 150 may be identical. The first attachment brace 140 may have a first upper brace portion 142 in contact with the top of the first bed rail 102. The first attachment brace 140 may also have a first brace lower portion 146 connected to the first upper brace portion 142 via a first brace intermediary portion 144. The first brace lower portion 146 may be connected to the truck bed bottom 106. The first and second attachment braces 140, 150 may be attached to the truck bed 101 by any suitable fastening and/or attachment devices without departing from the scope of the present invention. The first and second attachment braces 140, 150 are connected to the hitch system 10 by the first and second arm extensions 22, 32. The first and second attachment braces 140, 150 may provide further stability as opposed to the first and second attachment plates 76, 77 as the first and second attachment braces may be connected to the truck bed 101 at various points on the first and second bed rails 102, 104 and the truck bed bottom 106. This figure also illustrates how the tailgate 110 may be fully removed from the truck bed 101 without departing from the scope of the present invention.

Figure 10:
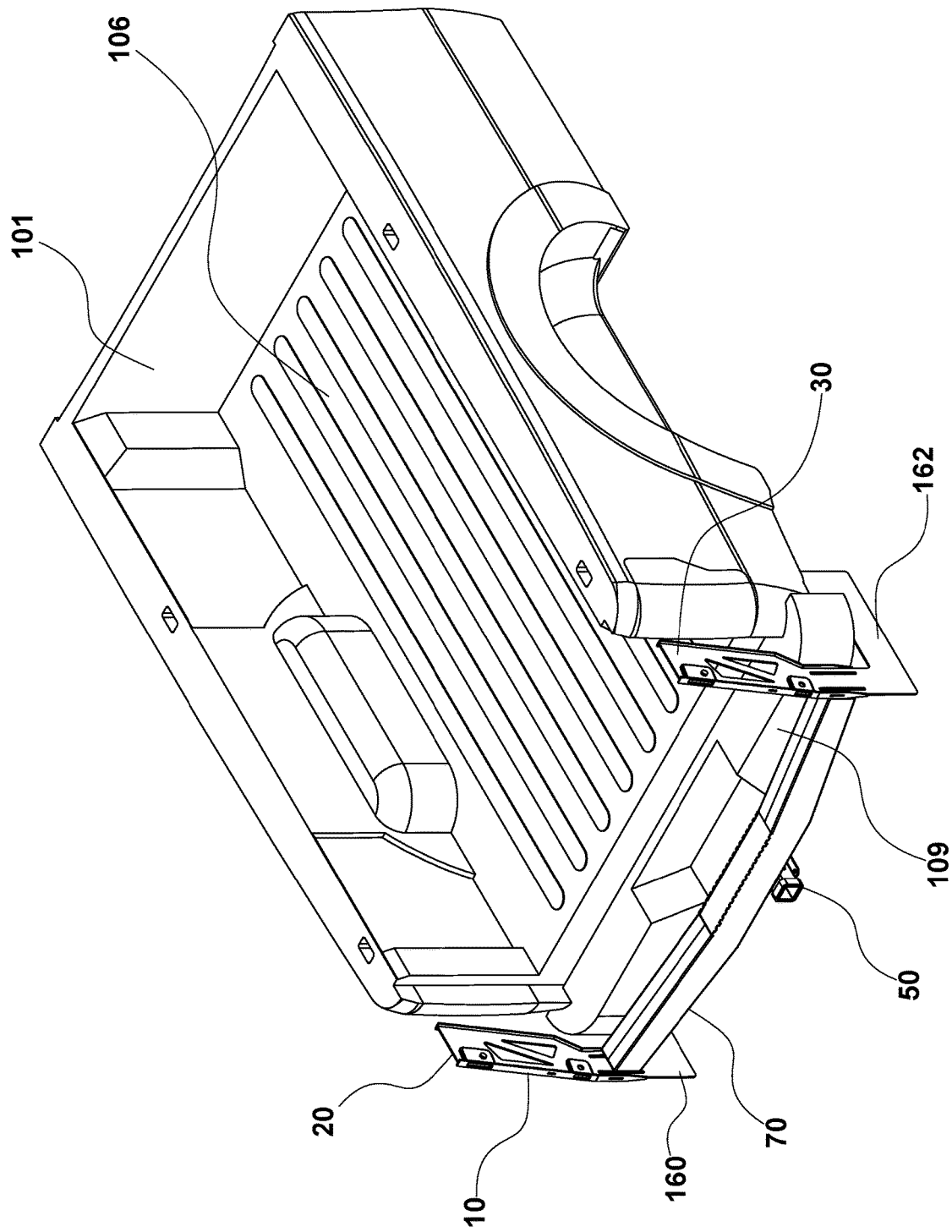
FIG. 10 is a top, front perspective view of the hitch system 10 connected to a truck bed 101 in an alternative preferred embodiment. In this embodiment, the first and second arm extensions 22, 32 may have been removed. To increase stability and further brace the hitch system 10 against the truck bed 101, a first reinforcement bracket 160 and a second reinforcement bracket 162 may extend downwardly from the first arm 20 and the second arm 30, respectively. The first and second reinforcement brackets 160, 162 may connect to an underside of the truck bed 101. In this way, three points of contact and attachment may be maintained together with the hitch extender 50.

Referring now to FIG. 10, the hitch system 10 may be seen in a second alternative preferred embodiment. In this embodiment, the first and second arm extensions 22, 32 may be removed entirely. To increase stability and further brace the hitch system 10 against the truck bed 101, a first reinforcement bracket 160 and a second reinforcement bracket 162 may extend downwardly from the first arm 20 and the second arm 30, respectively. The first and second reinforcement brackets 160, 162 may connect to an underside of the truck 100 and/or the truck bed 101. In this way, three points of attachment—the first and second reinforcement brackets 160, 162 and the hitch extender 50—may be maintained between the hitch system 10 and the truck 100. One of ordinary skill in the art will appreciate from this disclosure that the points of attachment may be referenced as points of engagement and/or connection points without departing from the scope of the present invention. One of ordinary skill in the art will appreciate disclosure of the first and second room extensions 22, 32 along with the first and second attachment plates 76, 77 may be used in combination with the first and second reinforcement brackets 160, 162 without departing from the scope of the present invention.

Figure 11:
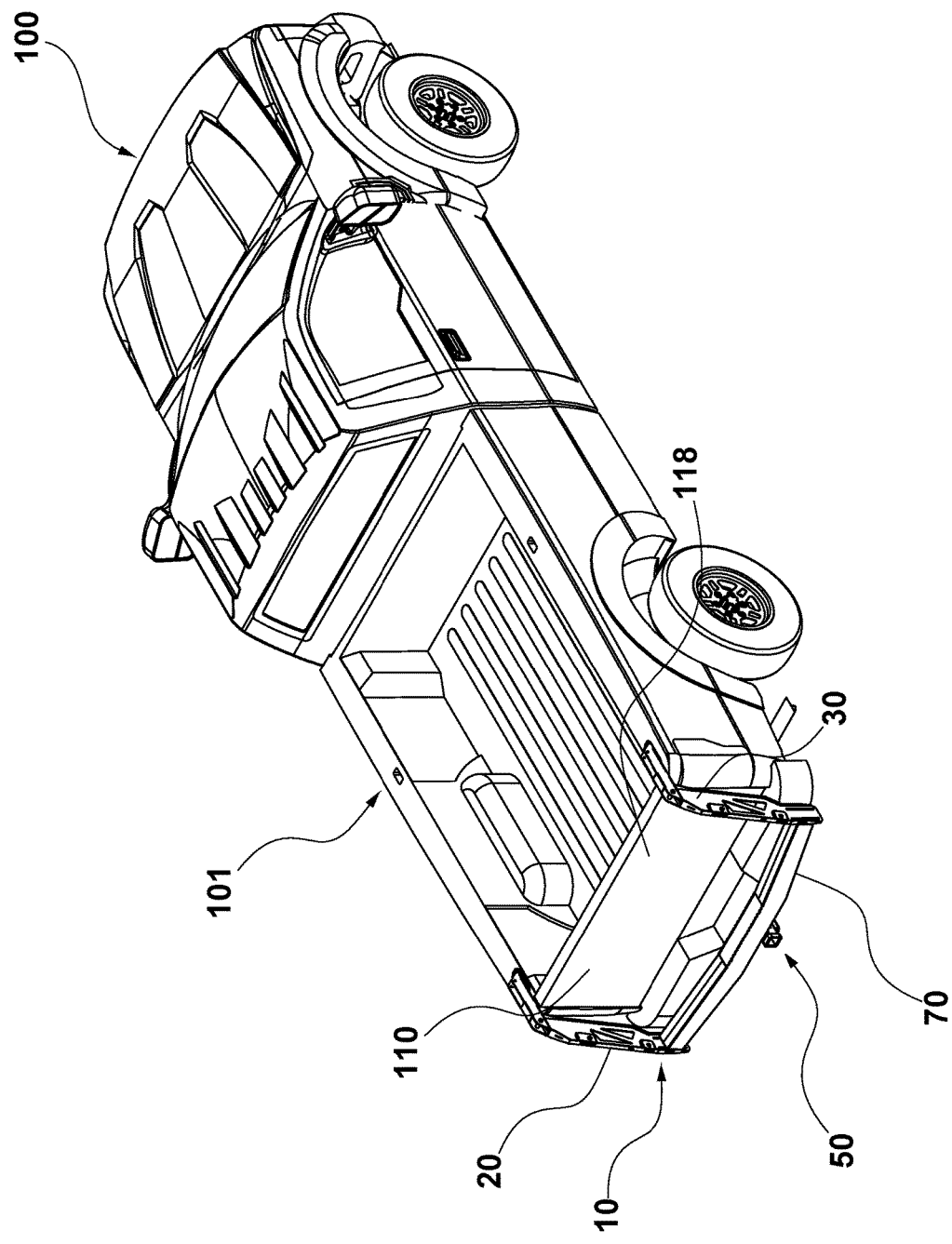
FIG. 11 is a top, front perspective view of the hitch system 10 connected to a truck bed 101 of a truck 100 in the preferred embodiment. Here, the truck bed 101 can be seen as part of a full truck 100. The tailgate 110 may also be seen in the first, upright position 118.
Figure 12:
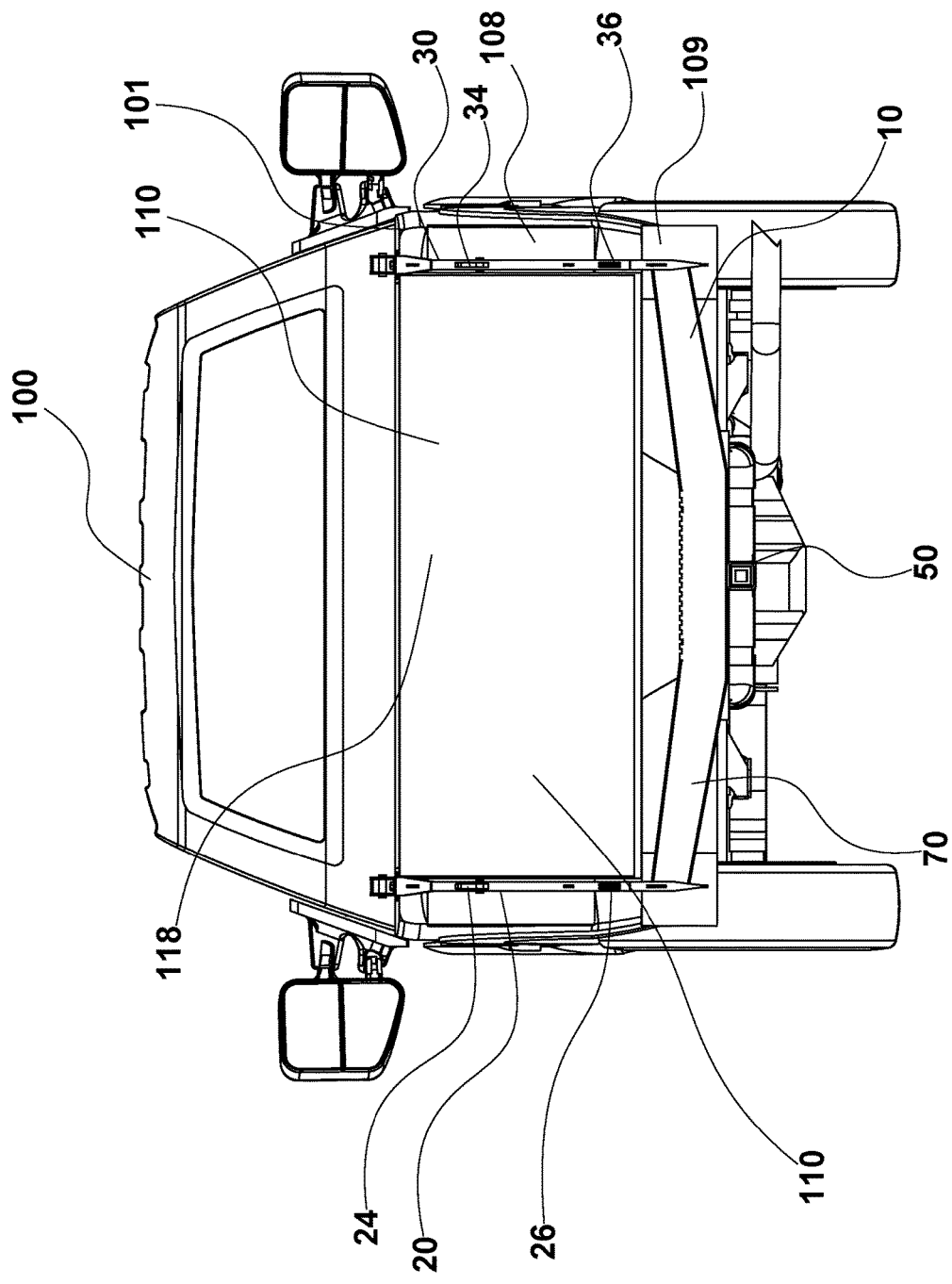
FIG. 12 is a front view of the hitch system 10 connected to a truck bed 101 of a truck 100 in the preferred embodiment. Here, the truck bed 101 can be seen as part of a full truck 100. The tailgate 110 may also be seen in the first, upright position 118. This figure may further illustrate how the hitch system 10 may not extend beyond the profile of the truck 100 in terms of width.

Referring now to FIGS. 11 and 12, the hitch system 10 may be seen in use with a truck 100 having a truck bed 101. Preferably, the hitch system 10 may not extend beyond a width of the truck 100. However, one of ordinary skill in the art would appreciate disclosure that the length of the reinforcement bar 70 may be variable to accommodate different widths of different trucks 100 without departing from the scope of the present invention. One of ordinary skill in the art would also appreciate from this disclosure at the hitch system 10 may be narrower than, the same width as, or wider than the truck 100 as desired without departing from the scope of the present invention.

Referring now generally to FIGS. 13-16, an attachment accessory 170 may be seen in conjunction with the hitch system 10. One of ordinary skill in the art will appreciate from this disclosure that the attachment accessory 170 may be one of a variety of vehicle accessories that may be connected to the hitch system 10 without departing from the scope of the present invention. The attachment accessory 170 may have a first accessory bracket 172 connected to a second accessory bracket 182 by a tailgate engagement bar 190. The first accessory bracket 172 may have a first upper attachment mechanism 174 and first lower attachment mechanism 176. The second accessory bracket 182 may have a second upper attachment mechanism 184 and the second lower attachment mechanism 186. The first and second upper attachment mechanisms 174, 184 may be configured to engage with the fixed pins 90 of the first and second upper attachment slots 24, 34, respectively. The first and second lower attachment mechanisms 176, 186 may be configured to be engaged concurrently with the pin receiving holes 91 of the first and second lower attachment slots 26, 36, respectively, by attachment pins. The tailgate engagement bar 190 may have an open side facing the tailgate top edge 114 when the tailgate 110 is in the second, lowered position 119. The attachment mechanisms 174, 176, 184, 186 may comprise a second coupling member.

Still referring generally to FIGS. 13-16, the tailgate engagement bar 190 may also have a plurality of lower accessory brackets 192. The plurality of lower accessory brackets 192 may allow additional accessories, such as ramps or gates, to be attached to the attachment accessory 170 without departing from the scope of the present invention. The attachment accessory 170 may also have a first upper accessory bracket 178 and a second upper accessory bracket 188 to allow for additional vehicle accessories to be attached thereon.

Figure 13:
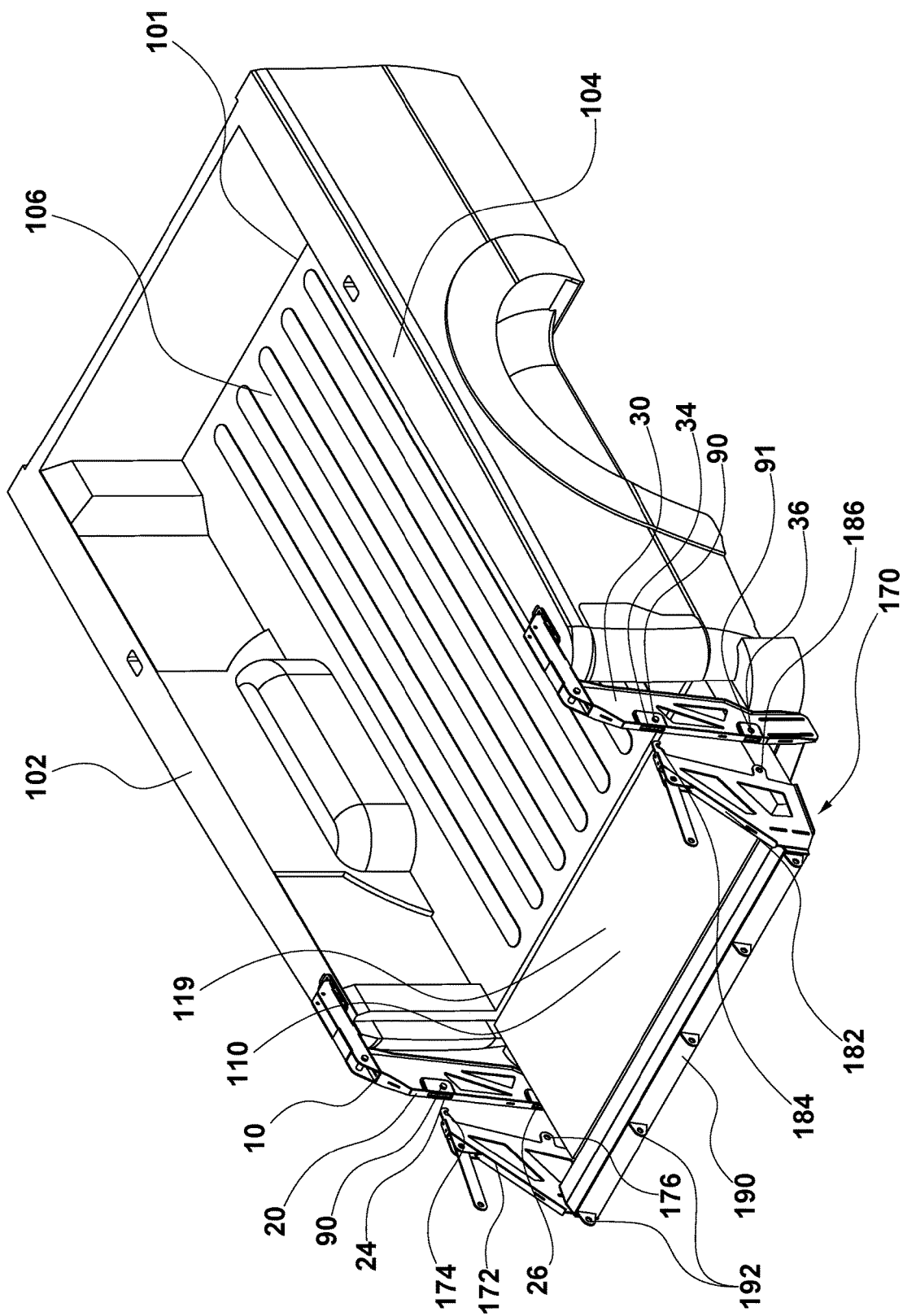
FIG. 13 is a top, front perspective view of the hitch system 10 connected to a truck bed 101 in the preferred embodiment. Here, an attachment accessory 170 may be seen before being engaged with the hitch system 10 and the tailgate 110. The attachment accessory 170 may have a first accessory bracket 172 connected to a second accessory bracket 182 by a tailgate engagement bar 190. The first accessory bracket 172 may have a first upper attachment mechanism 174 and first lower attachment mechanism 176. The second accessory bracket 182 may have a second upper attachment mechanism 184 and the second lower attachment mechanism 186. The first and second upper attachment mechanisms 174, 184 may be configured to engage with the fixed pins 90 of the first and second upper attachment slots 24, 34, respectively. The first and second lower attachment mechanisms 176, 186 may be configured to be engaged concurrently with the pin receiving holes 91 of the first and second lower attachment slots 26, 36, respectively, by attachment pins. The tailgate engagement bar 190 may have an open side facing the tailgate top edge 114 when the tailgate 110 may be in the second, lowered position 119. The tailgate engagement bar 190 may also have a plurality of lower accessory brackets 192. The plurality of lower accessory brackets 192 may allow additional accessories, such as ramps, to be attached to the attachment accessory 170.

Referring specifically to FIG. 13, the attachment accessory 170 may not yet be engaged with the hitch system 10. The attachment accessory 170 may be aligned by a user with the hitch system 10 and the tailgate 110 in the second, lowered position 119 so that the attachment accessory 170 may be detachably affixed to the hitch system 10.

Figure 14:
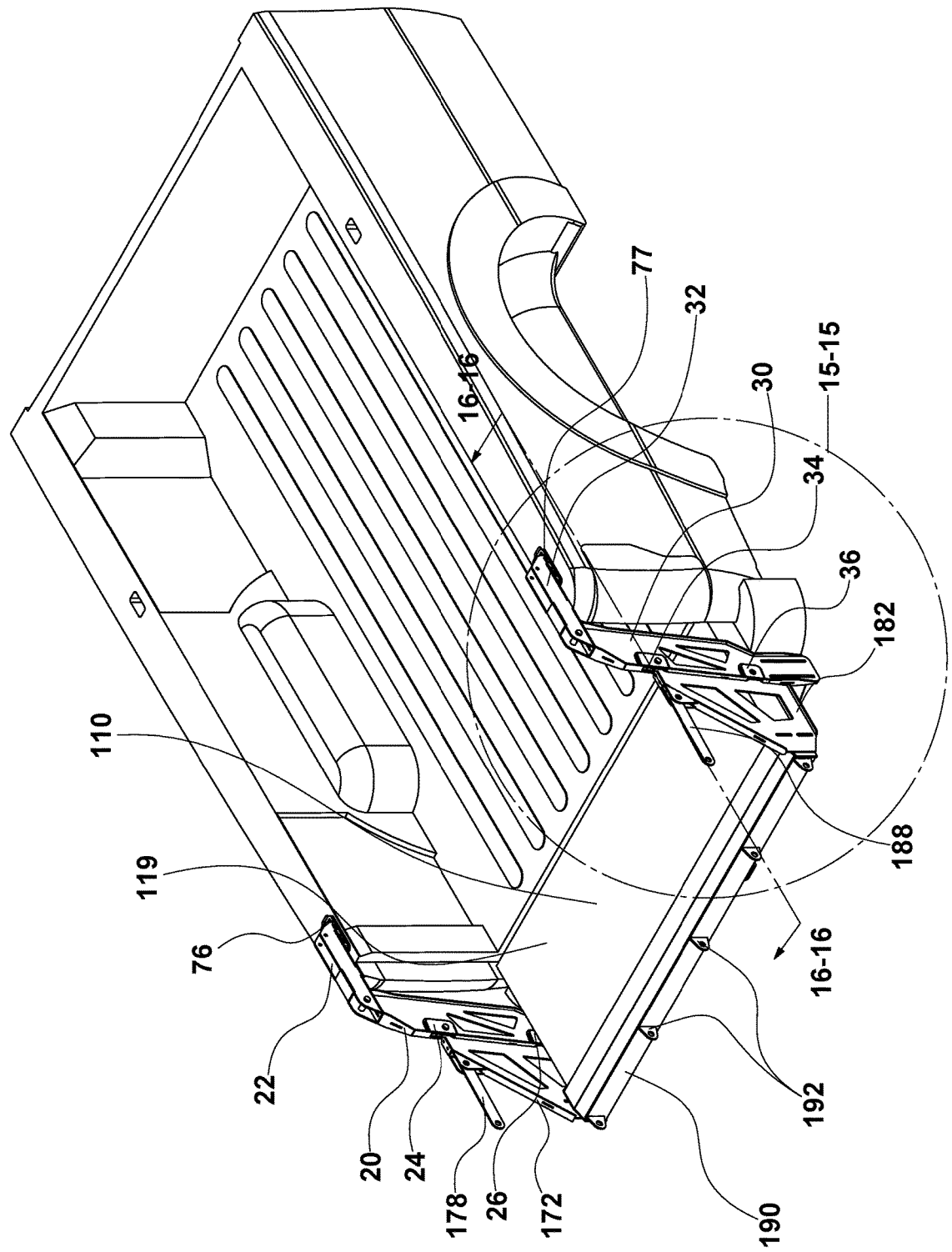
FIG. 14 is a top, front perspective view of the hitch system 10 connected to a truck bed 101 in the preferred embodiment. Here, an attachment accessory 170 may be seen engaged with the hitch system 10 and the tailgate 110. The tailgate top edge 114 may have entered the tailgate engagement bar 190 via the open side. The remaining sides of the tailgate engagement bar 190 may protect and reinforce the tailgate 110. The first and second upper attachment mechanisms 174, 184 may now be engaged with the fixed pins 90 of the first and second upper attachment slots 24, 34, respectively. The first and second lower attachment mechanisms 176, 186 may now be engaged concurrently with the pin receiving holes 91 of the first and second lower attachment slots 26, 36, respectively, by attachment pins. The attachment accessory 170 may be engaged with the hitch system 10 and the tailgate 110 may allow the tailgate 110 to be locked into the second, lowered position 119. The attachment accessory 170 may also have a first upper accessory bracket 178 and a second upper accessory bracket 188 to allow for additional accessories to be attached thereon.
Figure 15:
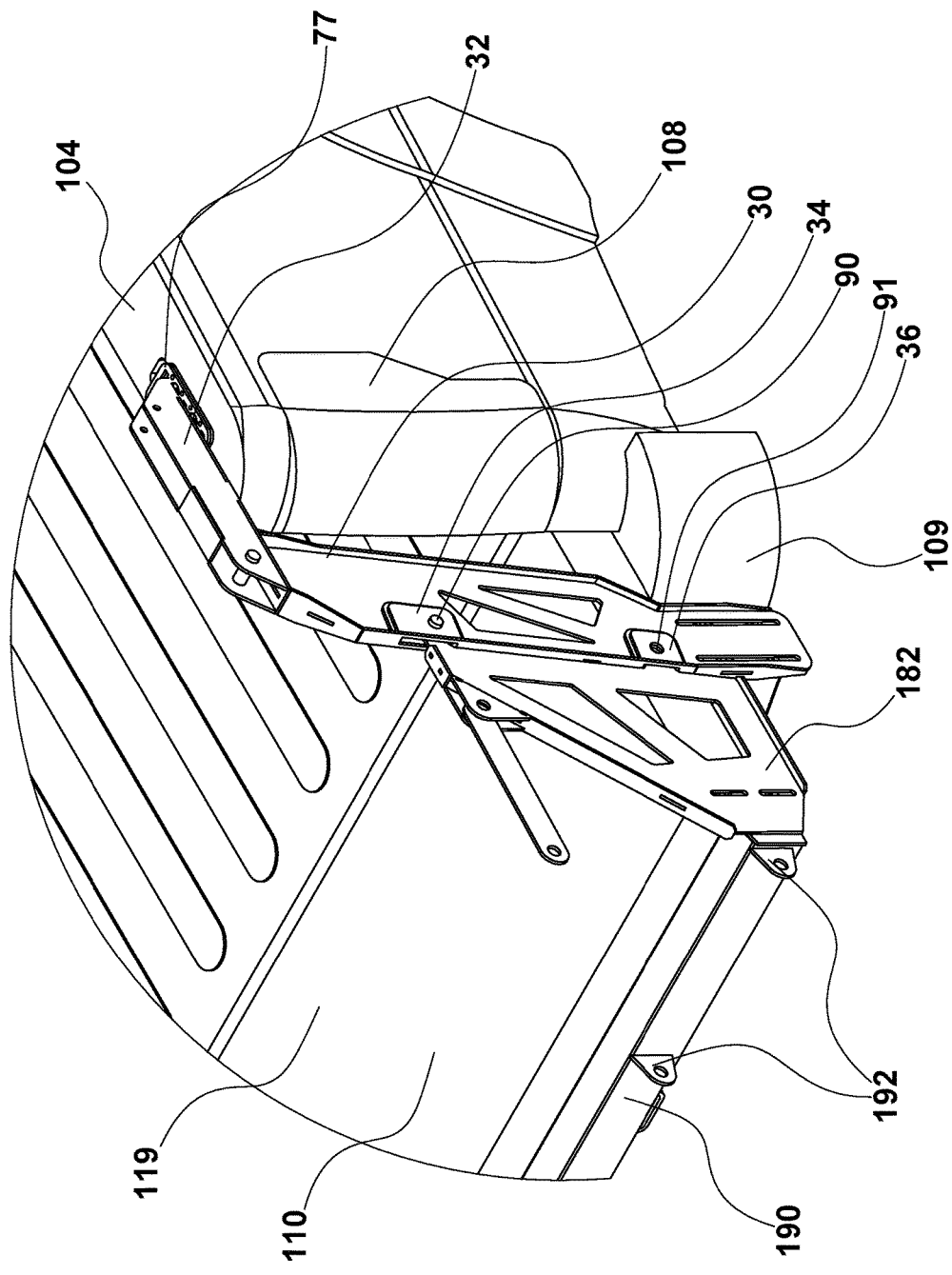
FIG. 15 is a partial, top, front perspective view of the hitch system 10 connected to a truck bed 101 in the preferred embodiment within the area 15-15 of FIG. 14. Here, the connection between the second upper attachment mechanism 184 and the second lower attachment mechanism 186 within the second upper attachment slot 34 and the second lower attachment slot 36, respectively, may be seen in more detail.
Figure 16:
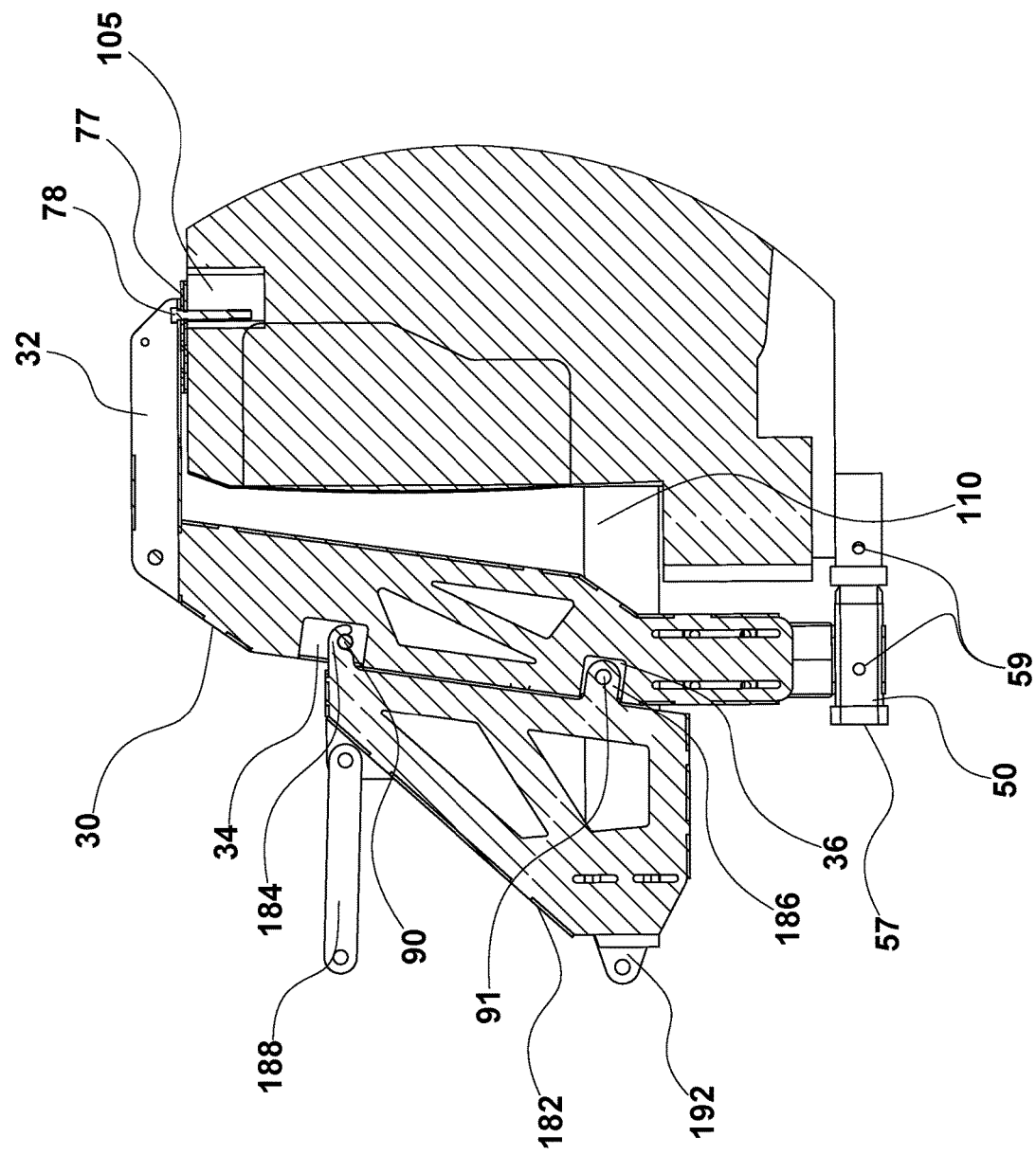
FIG. 16 is a cross-sectional view of the hitch system 10 connected to a truck bed 101 in the preferred embodiment taken along the line 16-16 of FIG. 14. Here, the connection between the second upper attachment mechanism 184 and the second lower attachment mechanism 186 within the second upper attachment slot 34 and the second lower attachment slot 36, respectively, may be seen in even more detail than in FIG. 15. The second upper attachment mechanism 184 may be a hook engaged with the fixed pin 90 of the second upper attachment slot 34. The second lower attachment mechanism 186 may be aligned with the pin receiving hole 91 of the second lower attachment slot 36 so that an attachment pin may be inserted to lock the second lower attachment mechanism 186 within the second lower attachment slot 36. This figure may also illustrate how the second attachment plate 77 may be detachably affixed to the second bedrail stake pocket 105 via a bolt 78.

Referring specifically to FIGS. 14-16, the attachment accessory 170 may be engaged with the hitch system 10 and the tailgate 110. The tailgate top edge 114 may have entered the tailgate engagement bar 190 via the open side. One of ordinary skill in the art would appreciate from this disclosure that the tailgate engagement bar 190 may partially or fully overlap or encapsulate the tailgate 110 without departing from the scope of the present invention. The remaining sides of the tailgate engagement bar 190 may protect and reinforce the tailgate 110 against potential loads thereon. The first and second upper attachment mechanisms 174, 184 may now be engaged with the fixed pins 90 of the first and second upper attachment slots 24, 34, respectively. The first and second lower attachment mechanisms 176, 186 may now be engaged concurrently with the pin receiving holes 91 of the first and second lower attachment slots 26, 36, respectively, by attachment pins. The attachment accessory 170 being engaged with the hitch system 10 and the tailgate 110 may allow the tailgate 110 to be locked into the second, lowered position 119.

Referring specifically to FIG. 16, the attachment of the second upper and lower attachment mechanisms 184, 186 within the second upper and lower attachment slots 34, 36 may be seen in greater detail. The second upper attachment mechanism 184 may be a hook engaged with the fixed pin 90 of the second upper attachment slot 34. The second lower attachment mechanism 186 may be aligned with the pin receiving hole 91 of the second lower attachment slot 36 so that an attachment pin may be inserted to lock the second lower attachment mechanism 186 within the second lower attachment slot 36. One of ordinary skill in the art will appreciate from this disclosure that any suitable mechanism or device capable of connecting the attachment accessory 170 to the hitch system 10 may be substituted for the attachment mechanisms 174, 176, 184, 186 without departing from the scope of the present invention. This figure also illustrates how the second attachment plate 77 may be detachably affixed to the second bedrail stake pocket 105 via a bolt 78.

Referring now generally to FIGS. 17-21, a hitch extender 50 in the preferred embodiment may be seen. The hitch extender 50 may have a hitch extender body 52 comprised of a male end 55 and a female end 57. The hitch extender 50 may also have a flared portion 54 located on at least one side of the male end 55. One of ordinary skill in the art may appreciate that the terms tapered end, male end, thinner end, or first end of the hitch extender 50 may be used interchangeably without departing from the scope of the present invention. The hitch extender 50 may also have a hole 58 extending therethrough. The flared portion 54 may allow a stronger friction fit between the hitch extender 50 and a truck hitch 120. However, one of ordinary skill in the art would appreciate from this disclosure that the flared portion 54 may be omitted without departing from the scope of the present invention. The hitch extender 50 may also include a tensioning mechanism 16. The tensioning mechanism 16 may be comprised of a tensioner screw 60, washer 61, and a tensioner nut 62. The tensioner screw 60 may be configured to be engaged with the tensioner nut 62 within the hitch extender body 52 along a central axis. The tensioner nut 62 may also have a threaded portion 63 configured to accommodate the threading located on the tensioner screw 60. The tensioner nut 62 and the male end 55 mage further comprise a tensioner pin hole 64 configured to receive a tensioner pin 65. The female end may have hitch pin holes 59 to accommodate a standard hitch pin from a standard hitch accessory.

Figure 17:
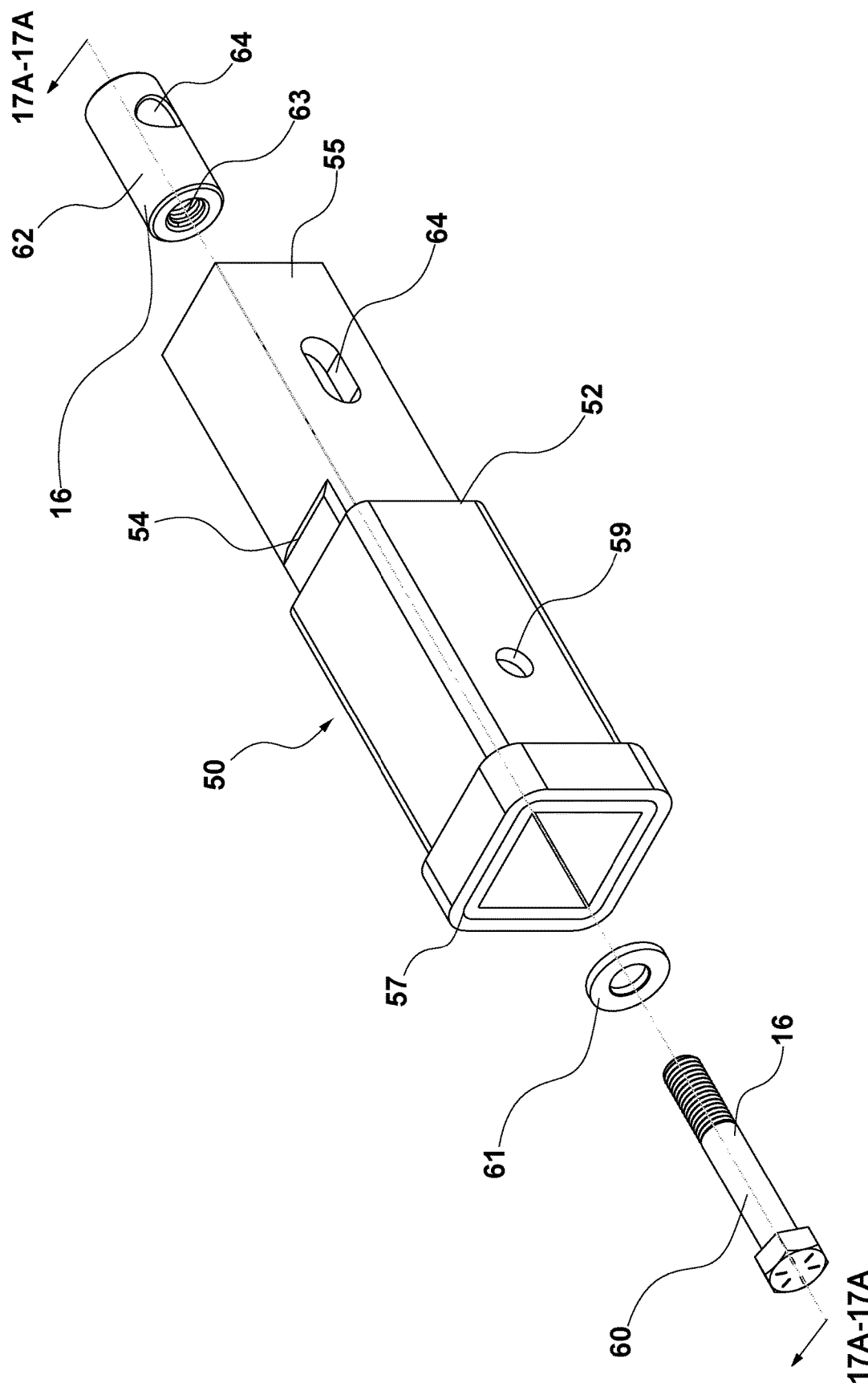
FIG. 17 is an exploded view of the hitch extender 50 in the preferred embodiment. Here, the components of the hitch extender 50 may be seen in more detail. The hitch extender 50 may have a hitch extender body 52. The hitch extender body 52 may have a male end 55 and a female end 57. The hitch extender 50 may also have a tensioning mechanism 16. The tensioning mechanism 16 may have a tensioner screw 60, a washer 61, and a tensioner nut 62 axially aligned along the central axis, or line, 17A-17A. The tensioner nut 62 may have a threaded portion 63 to engage the threads of the tensioner screw 60. The male end 55 and the tensioner nut 62 may also have tensioner pin holes 64 that may be aligned when the tensioner nut 62 may be inserted into the male end 55. The female end 57 may have hitch pin holes 59 on opposite sides to accommodate additional hitch accessories. The hitch extender body 52 may also have a flared portion 54 to increase the pressure fit between the hitch extender 50 and a truck hitch 120.
Figure 17A:
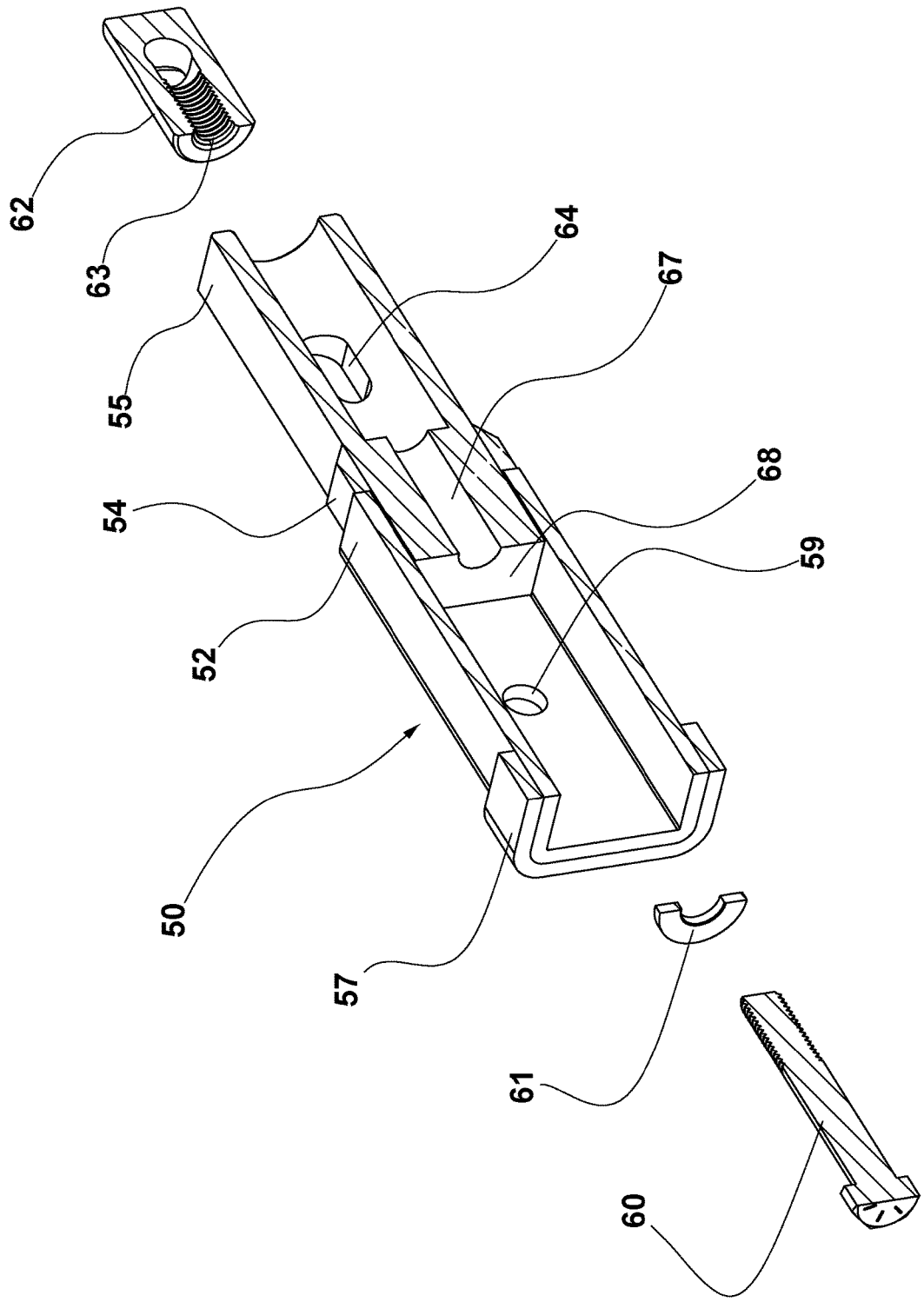
FIG. 17A is a cross-sectional, exploded view of the hitch extender 50 in the preferred embodiment taken along the line 17A-17A of FIG. 17. This figure may illustrate how the hitch extender 50 may be hollow. The hitch extender 50 may also have a tensioner screw hole 67 contained therein to accommodate the tensioner screw 60 when the tensioner screw 60 may have been inserted into the hitch extender 50. An interior axial wall 68 may also be seen. The interior axial wall 68 may allow for abutment of the washer 61.

Referring now specifically to FIG. 17A, the inside of the hitch extender 50 may be seen in greater detail. The hitch extender body 52 may form a tensioner screw hole 67 configured to accommodate the tensioner screw 60 when the tensioner screw 60 may be inserted into the hitch extender body 52. The tensioner screw hole 67 may be delineated on one end by an interior axial wall 68 of the hitch extender body 52.

Figure 18:
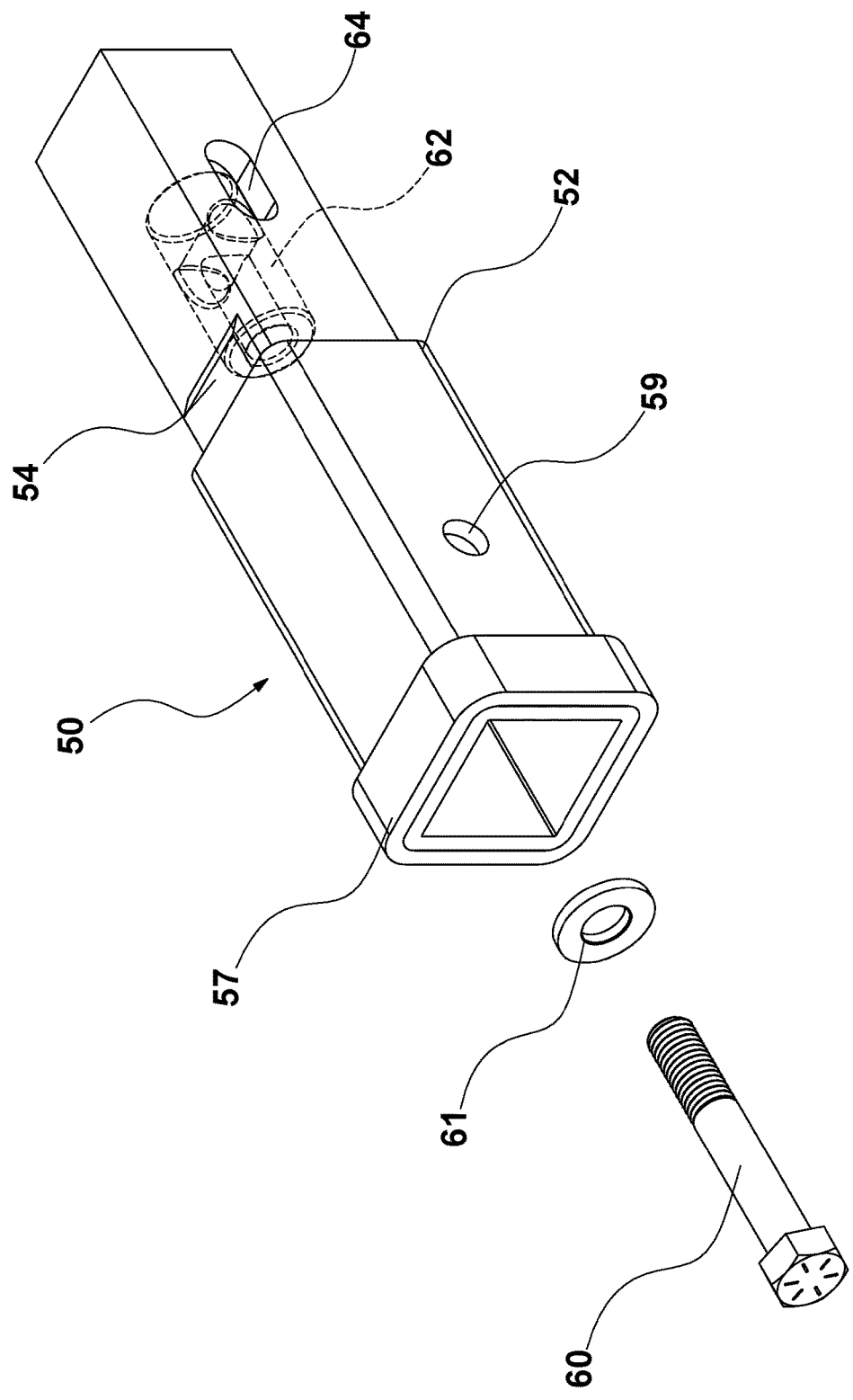
FIG. 18 is an exploded view of the hitch extender 50 in the preferred embodiment. Here, the broken lines may depict how the tensioner nut 62 may have been inserted into the male end 55. The tensioner nut 62 may remain axially aligned with the tensioner screw 60 in the washer 61.
Figure 19:
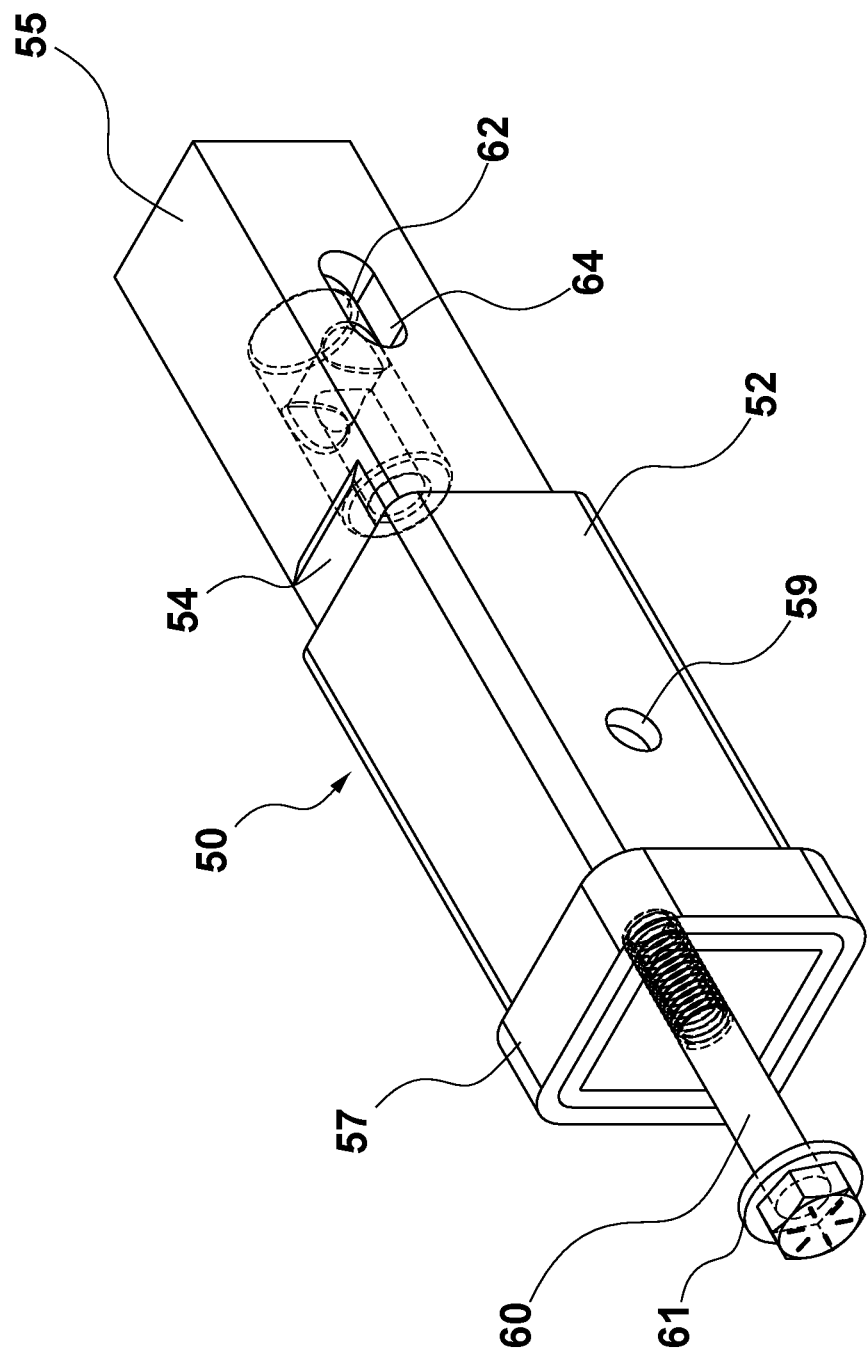
FIG. 19 is an exploded view of the hitch extender 50 in the preferred embodiment. Here, the broken lines may depict how the tensioner nut 62 may have been inserted into the male end 55. The tensioner screw 60, with the washer 61 therearound, may be partially inserted into the female end 57 in axial alignment with the tensioner nut 62.

Referring now generally to FIGS. 18-20, the tensioner nut 62 can be seen inserted into the male end 55 of the hitch extender 50. In this configuration, the tensioner pin holes 64 of the male end 55 and the tensioner nut 62 may be aligned to simultaneously receive a tensioner pin 65. The tensioner nut 62 may also be axially aligned with the tensioner screw hole 67.

Figure 20A:
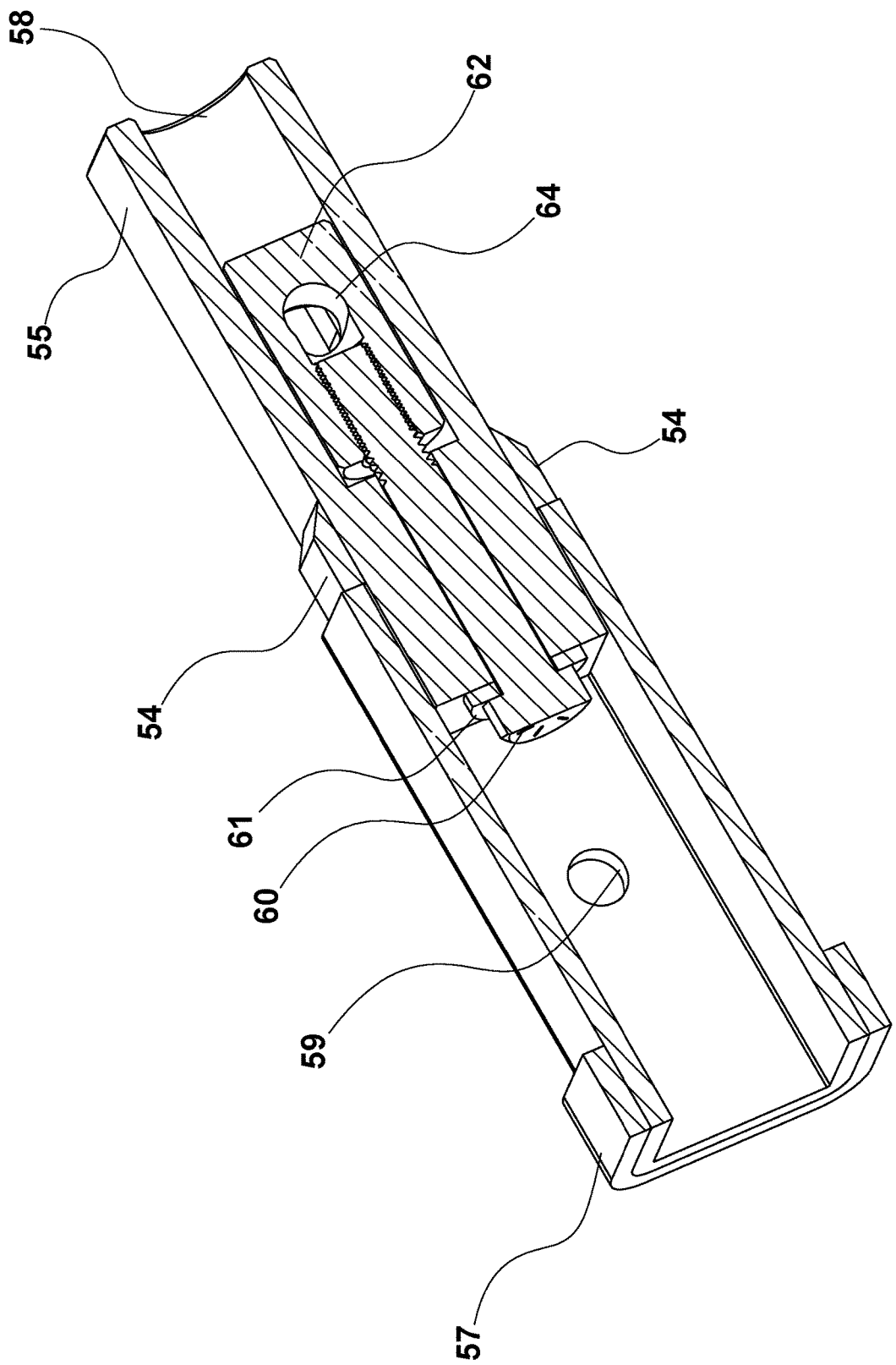
FIG. 20A is a cross-sectional view of the hitch extender 50 in the preferred embodiment taken along line 20A-20B of FIG. 20. Here, the tensioner screw 60 may be engaged with the tensioner nut 62 within the hitch extender body 52 may be seen. The threads of the tensioner screw 60 may be screwed into the threaded portion 63 of the tensioner nut 62. The tensioner screw 60 may extend through the tensioner screw hole 67 contained within the hitch extender body 52. The washer 61 may abut the interior axial wall 68 and may provide a buffer between the head of the tensioner screw 60 in the interior axial wall 68. This figure may also illustrate how the tensioner pin holes 64 of the male end 55 and the tensioner nut 62 may be aligned when the tensioner nut 62 may be inserted into the male end 55. There may also be no tensioner pin 65 extending through the tensioner pin holes 64.

Referring specifically to FIG. 20A, the tensioner screw 60 and the tensioner nut 62 may be threadably engaged with each other within the hitch extender body 52. Here, the tensioner screw 60 may be seen extending through the tensioner screw hole 67 from the female end to the male end 55. The washer 61 may abuttingly contact the interior axial wall 68 and may provide reduced wear between the head of the tensioner screw 60 and the interior axial wall 68 of the hitch extender body 52. This figure may also show how the tensioner pin holes 64 of the tensioner nut 62 and the male end 55 may be aligned.

Figure 20B:
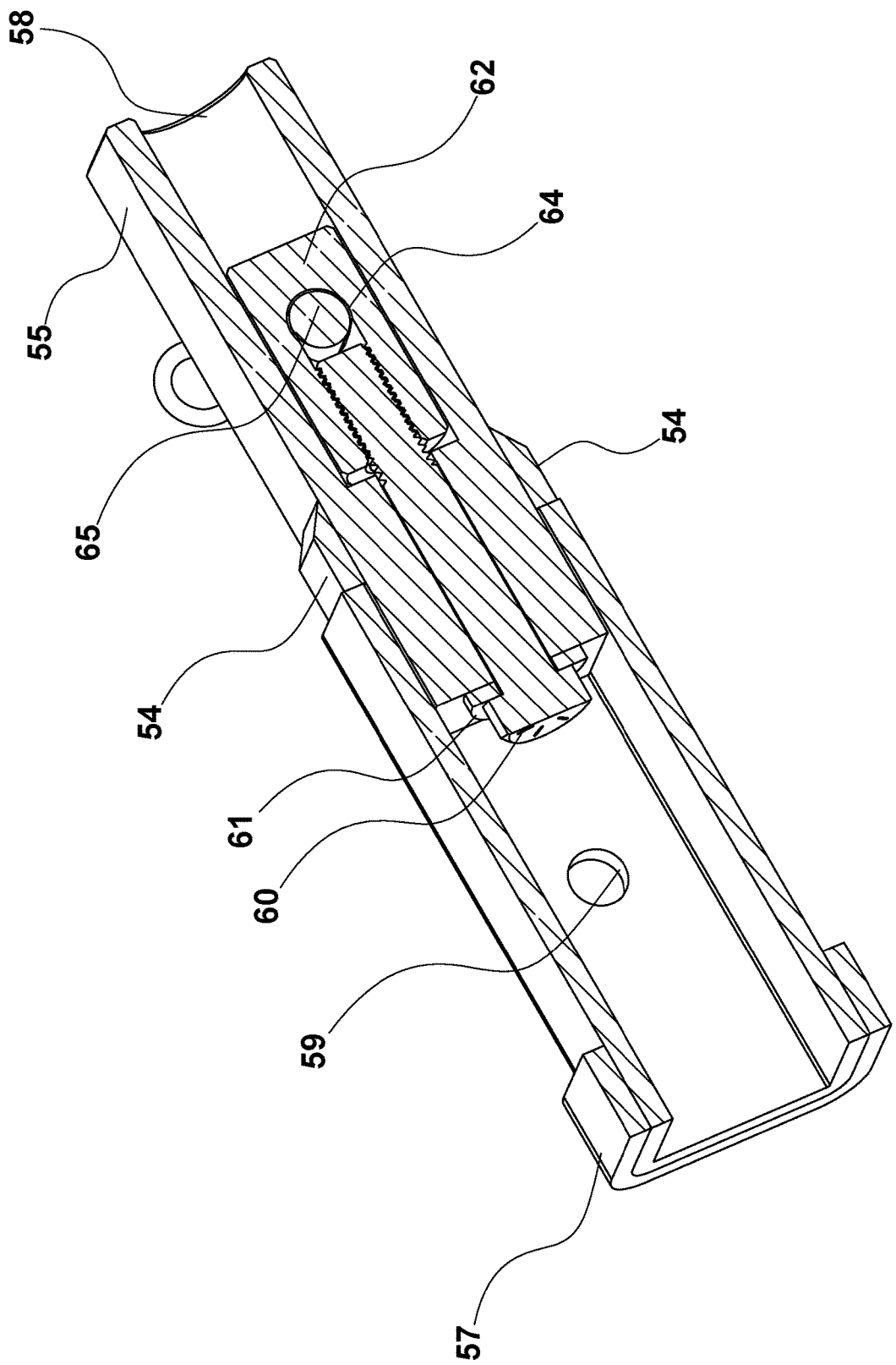
FIG. 20B is a cross-sectional view of the hitch extender 50 in the preferred embodiment taken along line 20A-20B of FIG. 20. Here, a tensioner pin 65 may be seen extending through the tensioner pin holes 64. The tensioner pin 65 may assist in tensioning the hitch extender 52 a truck hitch 120 when the tensioner screw 60 may engaged with the tensioner nut 62.

Referring specifically to FIG. 20B, a tensioner pin 65 may be inserted into the tensioner pin holes 64 of the tensioner nut 62 and the male end 55. When the tensioner screw 60 may be screwed further into the tensioner nut, the tensioner pin 65 may increase the tension between the tensioner nut 62 and the extender body 52. When the hitch extender 50 may be inserted into a truck hitch 120, the tension may further be adjustably increased between the truck hitch 120 and the hitch extender 50 via tensioning mechanism 16.

While one specific method of tensioning is shown, those of ordinary skill in the art will appreciate that any suitable tensioning mechanism 16 can be used without departing from the scope of the present invention.

One embodiment of the hitch extender invention is directed to a tensioned draw bar 92 configured to engage a truck hitch 120. The tensioned draw bar 92 preferably includes a tensioned draw bar body 52 having a first end 55 configured for insertion into the truck hitch 120 and preferably also includes a second end 57 configured to have a component located thereon. A tensioning mechanism 16 is preferably positioned within the tensioned draw bar body for securing the tensioned draw bar body 52 to the truck hitch receiver. It is preferred that by using the tensioning mechanism 16 to draw the tensioned draw bar 92 against the hitch receiver that the connection is more stable.

The tensioning mechanism 16 may include a tension rod 60 extending axially through the clamped draw body 52 and having a threaded end. A tension rod receiving nut 62 may be configured to engage with the threaded end of the tension rod 60. It is preferred that when the tension rod 60 is engaged with the tension rod receiving nut 62, the clamped draw body 52 is configured to be pulled into and/or against the truck hitch 120 to provide a more stable connection.

The component located on the second end 57 of the clamped draw body 52 can be any desired component. By way of non-limiting example, the component could be a hitch ball 93, a bicycle rack, a cargo carrier 94, a flat platform, a leaf blower, traffic safety lights, mulcher, vacuum system, a pressure washing system, or the like.

Figure 21:
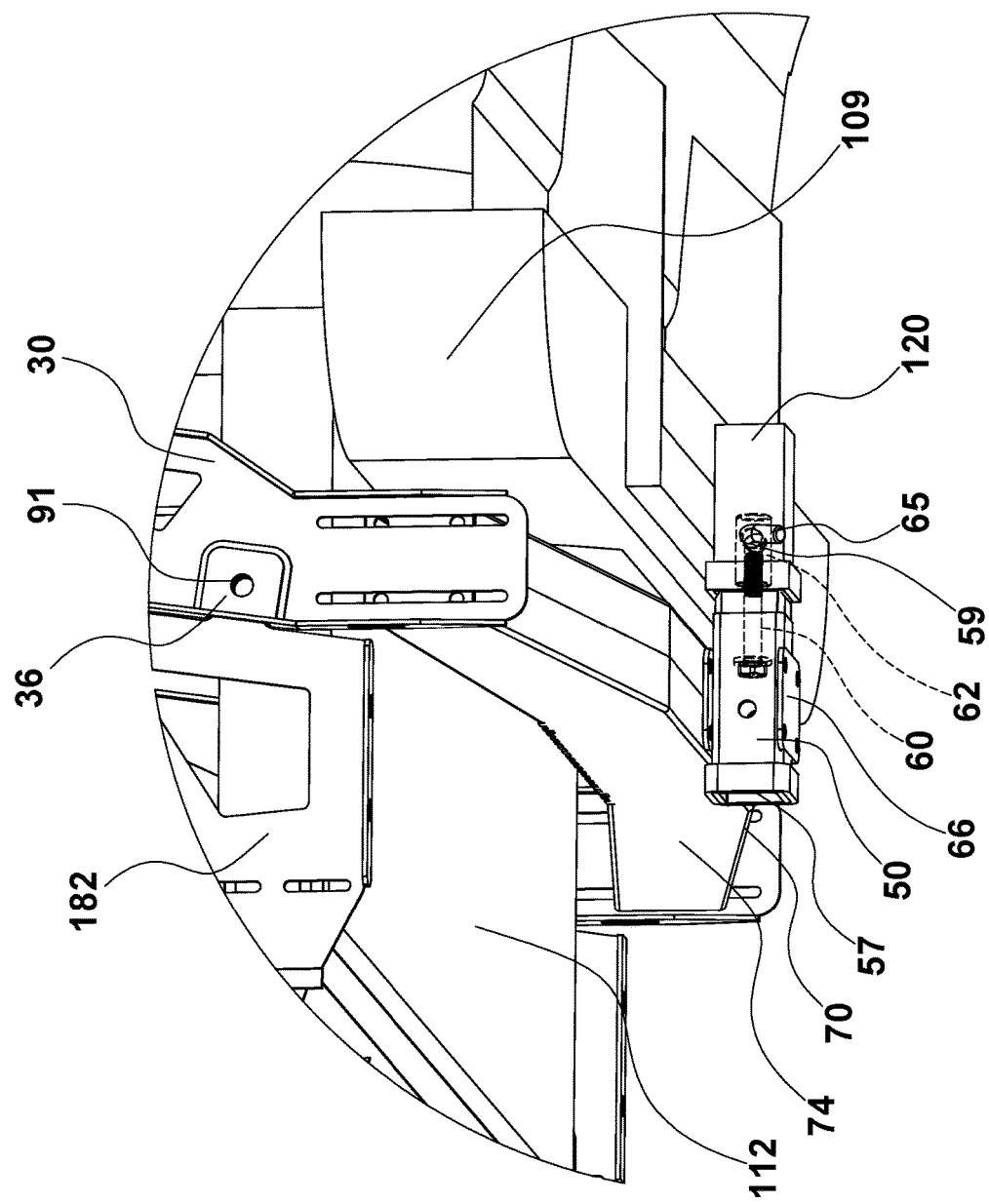
FIG. 21 is a close-up, partial perspective view of the hitch extender 50 as part of the hitch system 10 in the preferred embodiment. Here, the hitch extender 50 may be seen engaged with a truck hitch 120 in more detail. The male end 55 of the hitch extender 50 may be inserted into the truck hitch 120. The tensioner pin 65 may be inserted through the tensioner pin holes 64 and the side hole of the truck hitch 120 to lock the hitch extender 50 to the truck hitch 120. The tension created by the engagement of the tensioner screw 60 with the tensioner nut 62 may pull the hitch extender 50 into the truck hitch 120. The flared portion 54 may also form a pressure fit between the hitch extender 50 and an interior of the truck hitch 120. This figure may also illustrate how the hitch extender 50 may be connected to the bottom surface 73 of the reinforcement bar 70 via a hitch attachment plate 66.

Referring specifically to FIG. 21, a hitch extender 50 in the preferred embodiment may be seen as a component of a hitch system 10 connected to a truck hitch 120. The hitch extender 50 may be connected to the reinforcement bar 70 of the hitch system 70 via a hitch attachment plate 66. The male end 55 of the hitch extender 50 may then be inserted into the truck hitch 120. When the tensioner pin 65 may be inserted through the tensioner pin holes 64 and the hitch pin hole 59 of the truck hitch 120, the tension between the hitch extender 50 and the truck hitch 120 may be increased by screwing the tensioner screw 60 into the tensioner nut 62. The tension may also be decreased by unscrewing the tensioner screw 60 into the tensioner nut 62. An increased tension may increase the rigidity and strength between the hitch extender 50 and the truck hitch 120. The rigidity and strength between the hitch extender 50 and the truck hitch 120 may be further increased by the flared portion 54. As the tension may pull the male end 55 further into the truck hitch 120, the flared portion 54 may be provide an additional friction fit between the outside of the hitch extender body 52 and the inside of the truck hitch 120. One of ordinary skill in the art would appreciate from this disclosure that the truck hitch 120 may be substituted for any other standard vehicle hitch, such as a car hitch, a van hitch, a UTV hitch, an ATV, a bus hitch, or the like without parting from the scope of the present invention.

Figure 22:
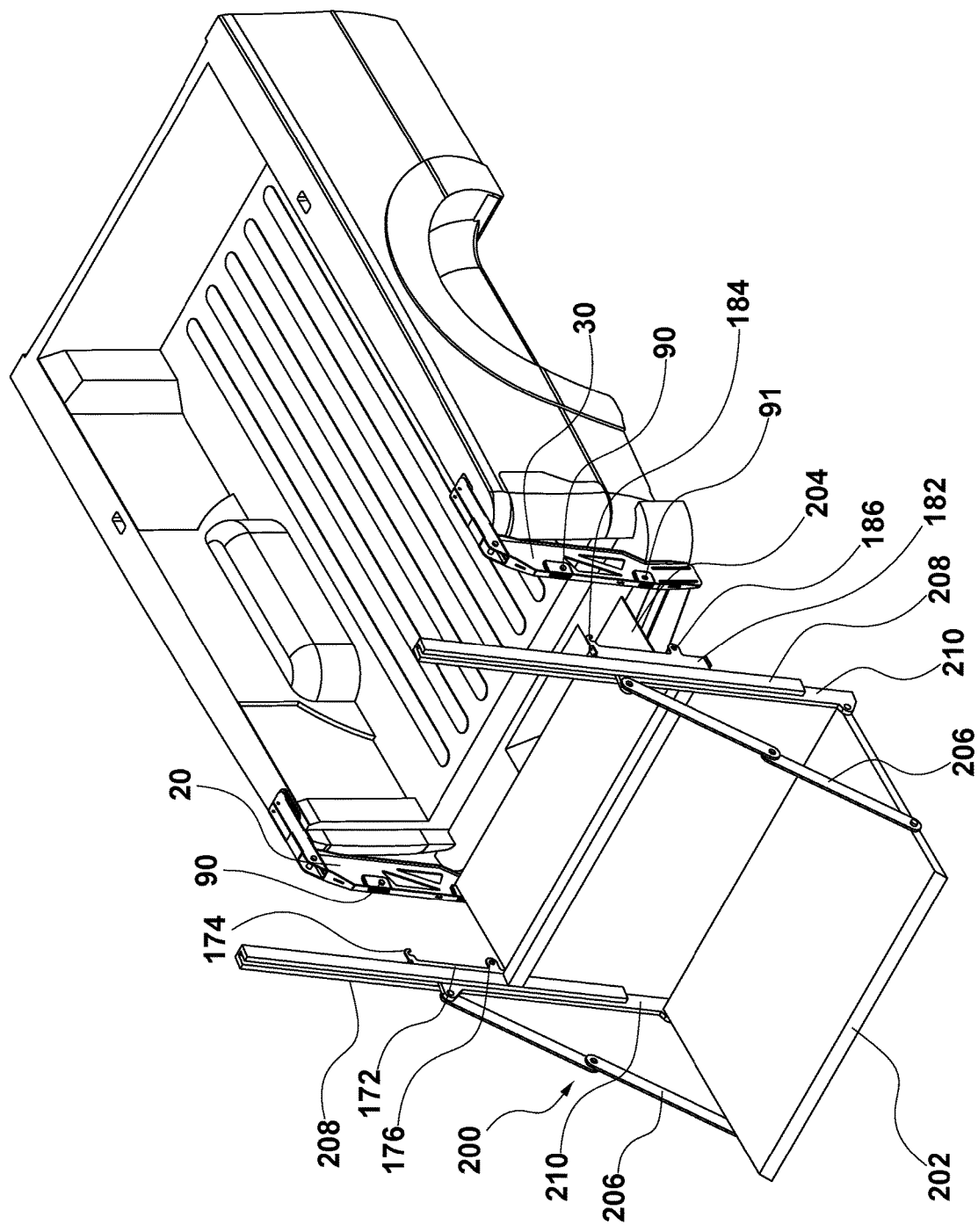
FIG. 22 is a top, front perspective view of the hitch system 10 connected to a truck bed 101 in an alternative preferred embodiment. Here, a liftgate accessory 200 may be seen before being engaged with the hitch system 10 and the truck bed 101. In this embodiment, the tailgate 110 may be removed from the truck bed 101. The liftgate accessory 200 may have a liftgate 202 connected to a lift framework 208 by folding brackets 206 and a lifting portion 210. The liftgate accessory 200 may have a first upper attachment mechanism 174, a first lower attachment mechanism 176, a second upper attachment mechanism 184, and a second lower attachment mechanism 186 connected to the lift framework 208. The first and second upper attachment mechanisms 174, 184 may be configured to engage with the fixed pins 90 of the first and second upper attachment slots 24, 34, respectively. The first and second lower attachment mechanisms 176, 186 may be configured to be engaged concurrently with the pin receiving holes 91 of the first and second lower attachment slots 26, 36, respectively, by attachment pins. The liftgate accessory 200 may also have a bed extension 204 that may effectively replace the tailgate 110 in this embodiment.
Figure 23:
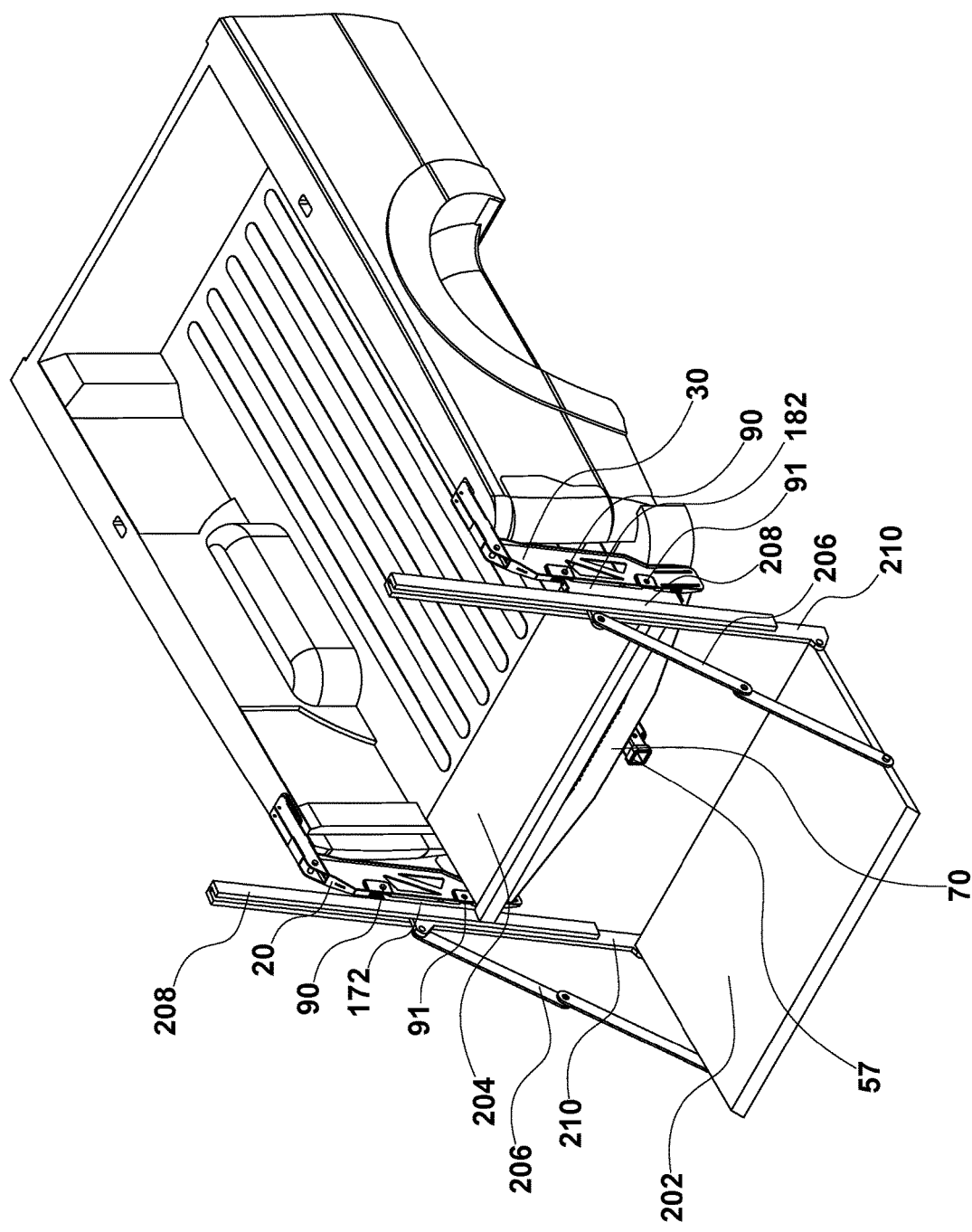
FIG. 23 is a top, front perspective view of the hitch system 10 connected to a truck bed 101 in an alternative preferred embodiment. Here, a liftgate accessory 200 may be seen engaged with the hitch system 10 and the truck bed 101. The bed extension 204 of the liftgate accessory 200 may be coplanar with and abut the truck bed bottom 106. The first and second upper attachment mechanisms 174, 184 may now be engaged with the fixed pins 90 of the first and second upper attachment slots 24, 34, respectively. The first and second lower attachment mechanisms 176, 186 may now be engaged concurrently with the pin receiving holes 91 of the first and second lower attachment slots 26, 36, respectively, by attachment pins. This figure may also illustrate how the liftgate 202 may be at a ground level so that a user may place objects upon the liftgate 202 to be automatically lifted to a bed level.
Figure 24:
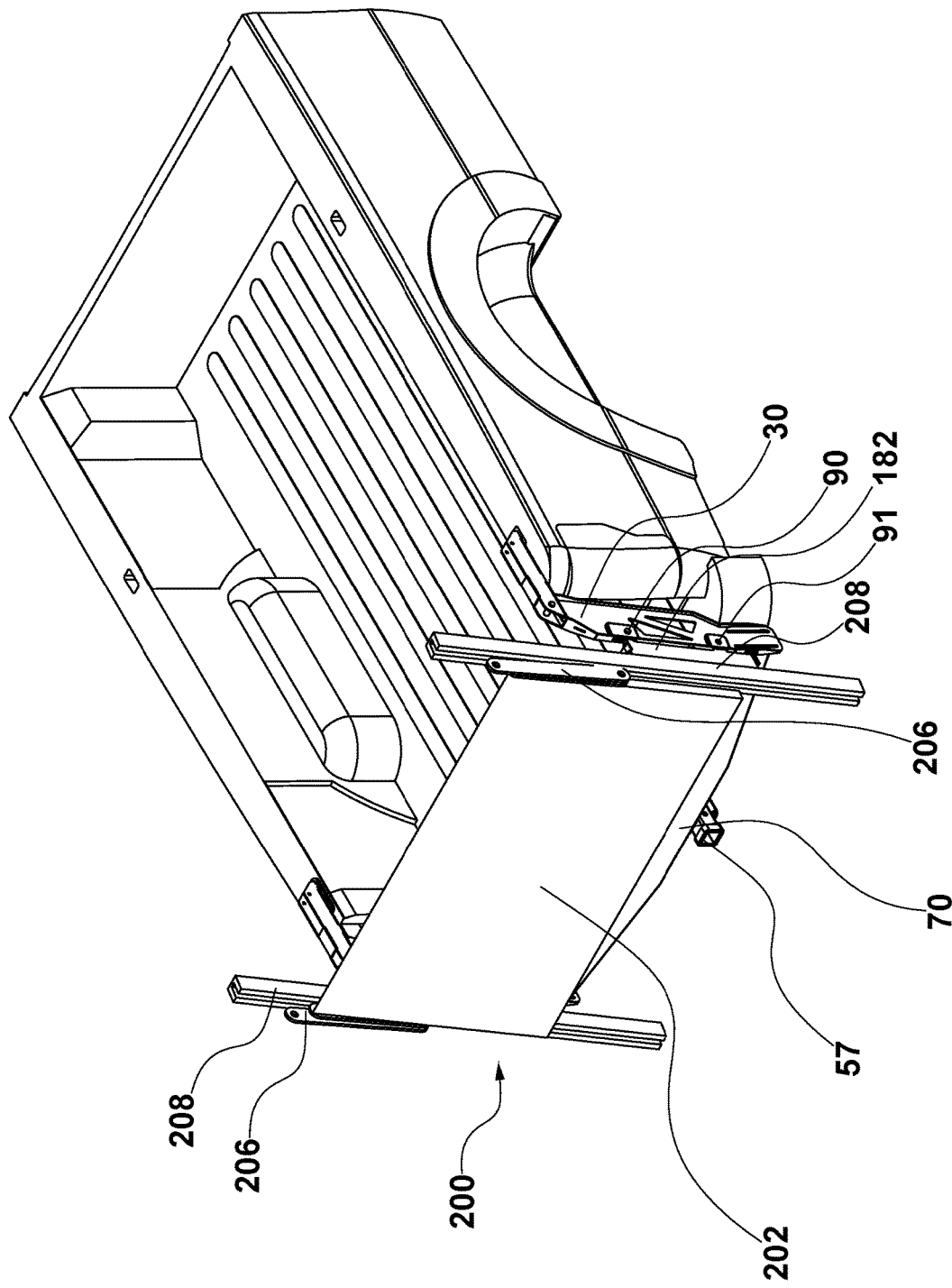
FIG. 24 is a top, front perspective view of the hitch system 10 connected to a truck bed 101 in an alternative preferred embodiment. Here, a liftgate accessory 200 may be seen engaged with the hitch system 10 and the truck bed 101. The liftgate accessory 200 may be in a folded position when a user desires to effectively form a tailgate 110 with the liftgate 202. This may have the effect of creating an extended truck bed 101 that still has four walls. It may also be advantageous for the liftgate accessory 200 to be in the folded position when a user may desire to drive the truck 100 without an increased profile length, or simply when the liftgate 200 may not be in use.

Referring now to FIGS. 22-24, an alternative preferred embodiment of the hitch system 10 may be seen. The hitch system 10 may comprise a liftgate accessory 200. Similar to the attachment accessory 170 of FIGS. 13-16, the liftgate accessory 200 may have a plurality of attachment mechanisms 174, 176, 184, 186 to engage with the plurality of attachment slots 24, 26, 34, 36 of the hitch system 10. The liftgate accessory 200 may comprise a lift framework 208 that the plurality of attachment mechanisms 174, 176, 184, 186 may be attached thereto. The liftgate framework 208 may be H-shaped. A bed extension 204 may extend inwardly from the liftgate framework 208. In this alternative preferred embodiment, the tailgate 110 of the truck bed 101 may be removed. The liftgate framework 208 may also comprise a lifting portion 210. The lifting portion 210 may connect to a liftgate 202 directly and/or via folding brackets 206. The lifting portion 210 may use hydraulics, a motor, manual power, or other components to lift a load that may be placed by a user on the liftgate 202 from a ground level to a bed level and vice versa.

Referring specifically to FIG. 22, the liftgate accessory 200 may be seen disconnected from the hitch system 10. Preferably, a tailgate 110 of the truck bed 101 may be removed before engaging the liftgate accessory 200 with the hitch system 10.

Referring specifically to FIG. 23, the liftgate accessory 200 may be connected to the hitch system 10. Here, the bed extension 204 may act effectively as a tailgate 110 in the second, lowered position 119 thereby extending the truck bed bottom 106 by an area equal to the size of the bed extension. The liftgate 202 may assist a user in loading an object in the truck bed 101 by automatically lifting the object from the ground level to the bed level.

Referring specifically to FIG. 24, the liftgate accessory 200 may be seen in a folded position. The folding brackets 206 may fold to allow the liftgate 202 to extend upwardly into a folded position. It may be desirous to have to have the liftgate 202 in the folded position to effectively for a tailgate 110, stow the liftgate 202 while the truck 100 may be traveling, or reduce the overall length of the truck with the liftgate accessory attached.

Referring now to FIGS. 25-28A, an alternative preferred embodiment of the hitch system 10 may be seen. The hitch system 10 may comprise a bumper system 46. The bumper system 46 may comprise a bumper body. The bumper body may be configured to be attached to an existing bumper 109, partially surround an existing bumper 109, and/or entirely replace and existing bumper 109 without departing from the scope of the present invention. The bumper system 46 may effectively extend the length of a truck bed 106.

Figure 25:
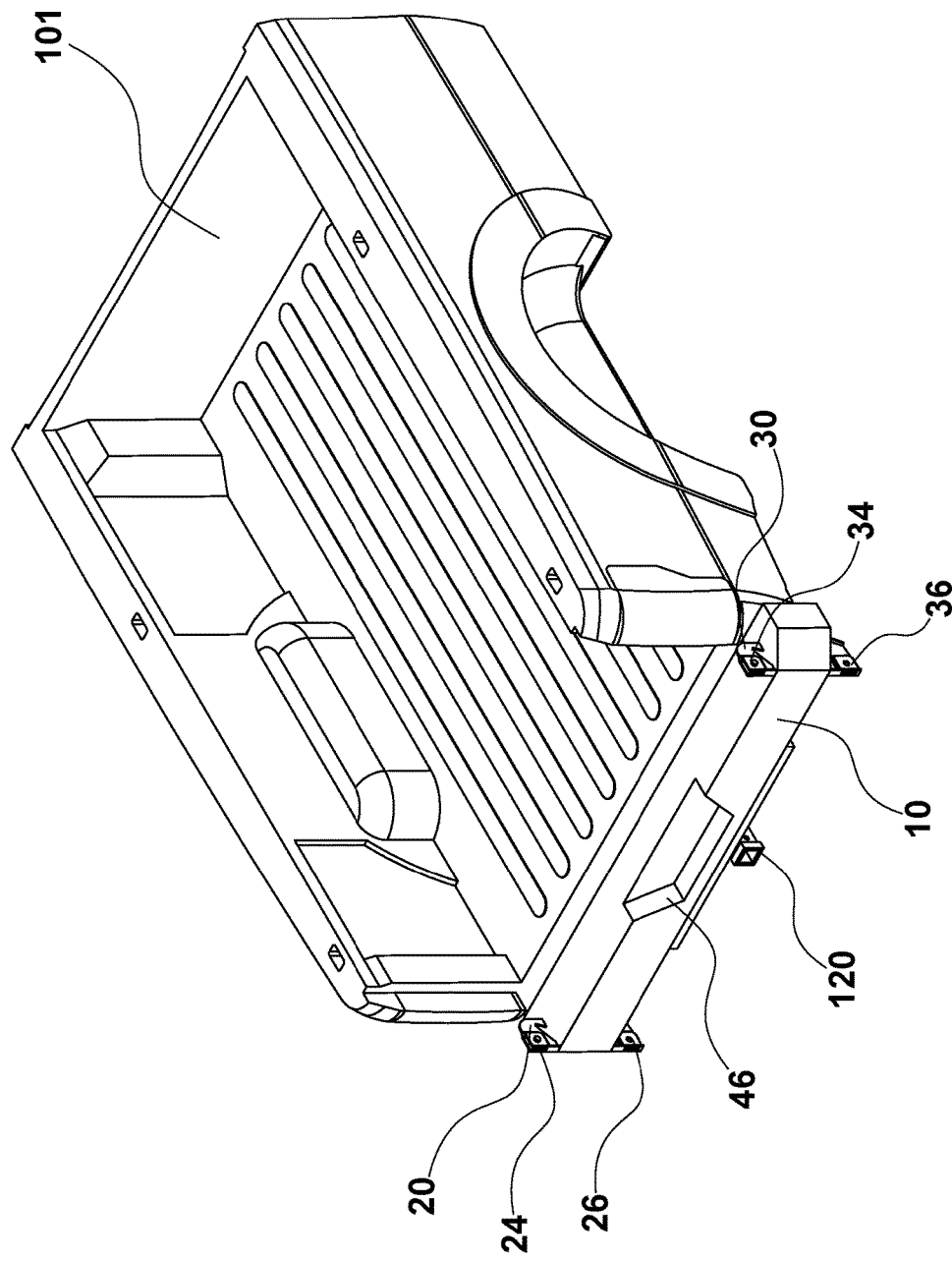
FIG. 25 is a top, front perspective view of the hitch system 10 in an alternative preferred embodiment. Here, the hitch system 10 may comprise a bumper system 46. The bumper system 46 may be added to, replace, attach to, or otherwise be substituted for an existing vehicle's bumper without departing from the scope of the present invention. The bumper system 46 may be connected at the rear of a truck bed 101. The bumper system 46 may not interfere with an existing truck hitch 120. The bumper system 46 may comprise first and second arms 20, 30 extending upwardly and downwardly from opposite ends of the bumper system 46. The first and second arms 20, 30 may comprise first and second upper attachment slots 24, 34, protruding upwardly, respectively. The first and second arms 20, 30 may also comprise first and second lower attachment slots 26, 36, protruding downwardly, respectively.
Figure 26:
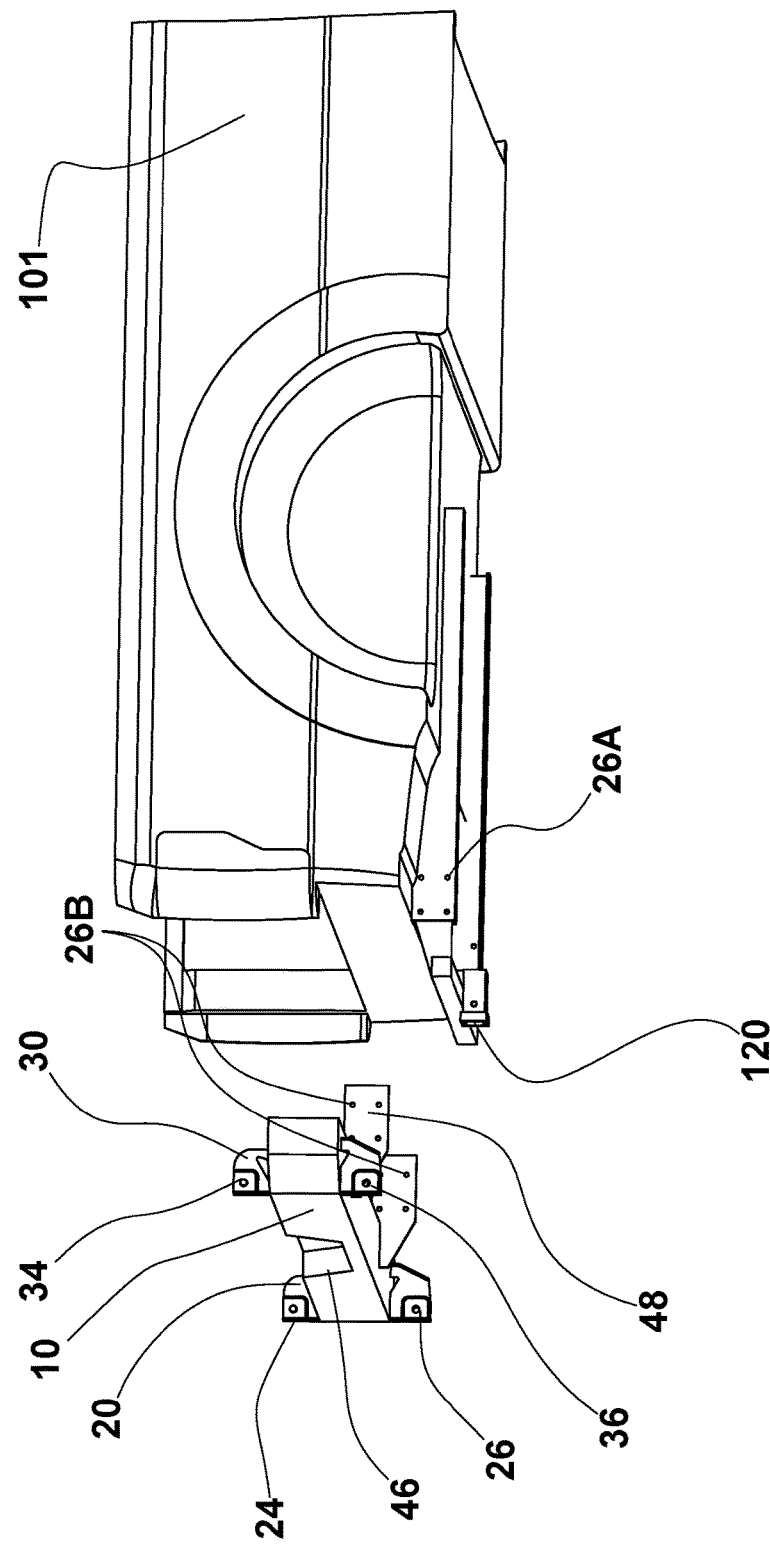
FIG. 26 is a side, perspective view of the hitch system 10 in an alternative preferred embodiment. Here, the hitch system 10 may comprise a bumper system 46. This figure may show the bumper system 46 before being engage with the truck 100 or other vehicle. The bumper system 46 may comprise mounting brackets 48. The mounting brackets 48 may include bumper mounting holes 26B which may correspond to truck frame mounting holes 26A on the frame of a truck 100. A plurality of bolts or other fastening mechanisms may be used to secure the mounting brackets 48 to the truck frame when the bumper mounting holes 26B and the truck frame mounting holes 26A may be aligned.

Referring specifically to FIGS. 25 and 26, the bumper system 46 may comprise a connection mechanism 12 for allowing additional accessories to be engaged thereto. The connector mechanism 12 may comprise a plurality of attachment slots 24, 26, 34, 36 configured to engage a plurality of attachment mechanisms 174, 176, 184, 186 of a vehicle accessory.

In another embodiment, the present invention is directed to a bumper system 46 configured to engage accessories to a vehicle. The bumper system 46 preferably includes a bumper body configured to connect to a vehicle. The bumper body can be configured to allow a vehicle accessory to be detachably secured thereto in a non flexible manner such that the vehicle accessory is supportable off the ground during normal driving of the vehicle.

In another embodiment, the present invention is directed to a bumper system 46 configured to engage accessories to a vehicle. The bumper system 46 may include a bumper body configured to connect to the vehicle. The bumper body preferably has a connector mechanism thereon which is configured to allow a vehicle accessory to be secured thereto in a non flexible manner such that the vehicle accessory is supportable off the ground during normal driving of the vehicle.

It is preferred that the connector mechanism 12 is configured to detachably engage the vehicle accessory in a non flexible manner such that the vehicle accessory is supportable off the ground during normal driving of the vehicle. The engagement of a vehicle accessory "in a non flexible manner" preferably means that the connection is not via a cable, rope, or chains such that the accessory is biased against moving or shifting in position relative to the hitch body once the vehicle accessory is secured thereto. It is preferred that the vehicle accessory can be supported off of the ground during normal driving of the vehicle.

One of ordinary skill in the art would appreciate from this disclosure that the number of engagement points between the bumper system 46 and any of a variety of vehicle accessories may be one, two, three, four, or more engagement points without departing from the scope of the present invention.

Referring specifically to FIG. 26, the connection between the bumper system 46 at the truck bed 101 can be seen in more detail. The bumper system 46 may comprise mounting brackets 48 connected thereon. The mounting brackets 48 may include bumper mounting holes 26B. The bumper mounting holes 26B may correspond to a plurality of truck frame mounting holes 26A in the frame of a truck 100 located below the truck bed 101. The mounting brackets 48 may then be connected to the frame of the truck 100 by securing bolts through the bumper mounting holes 26B and the truck frame mounting holes 26A.

Figure 27:
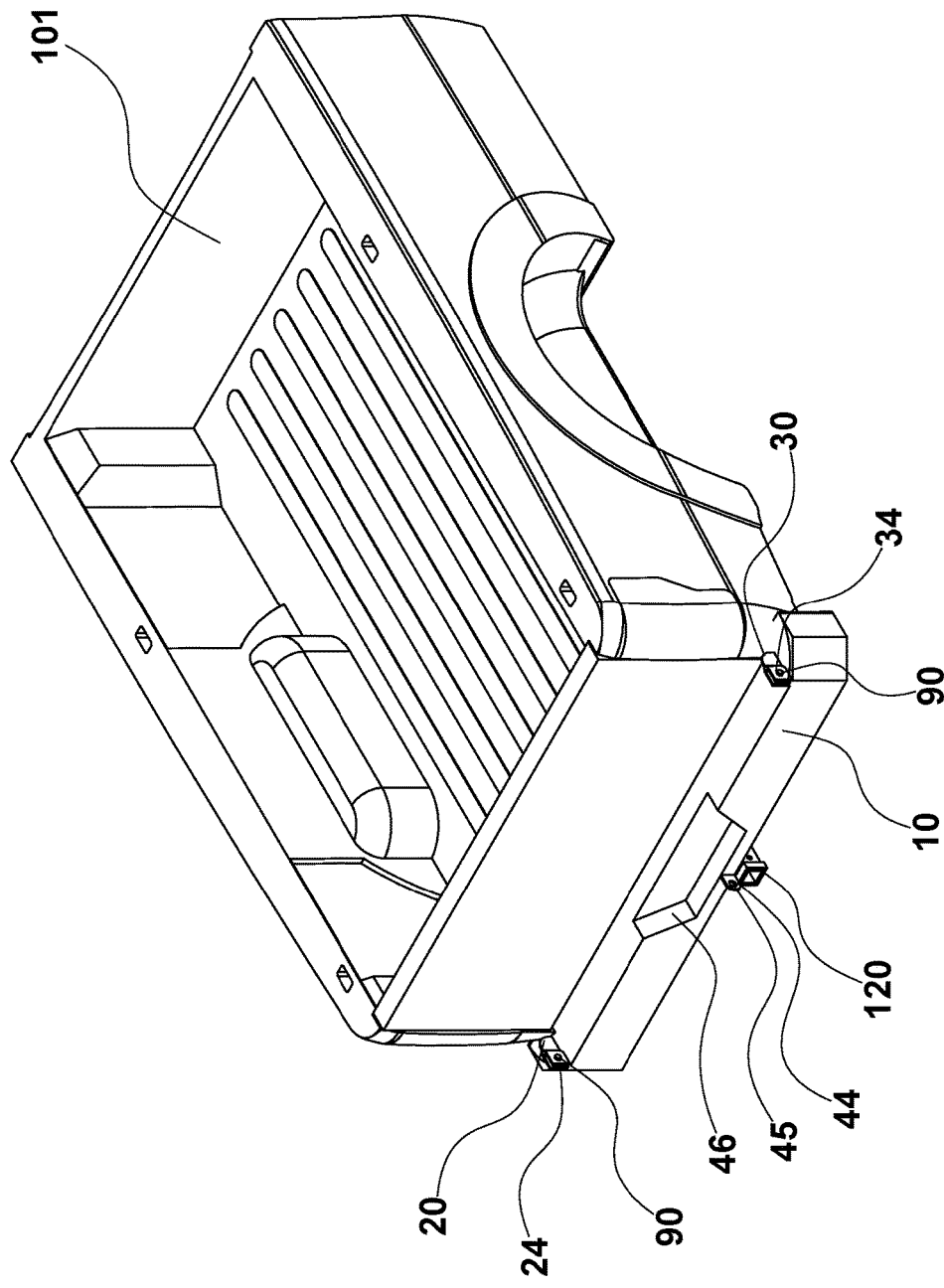
FIG. 27 is a top, front perspective view of the hitch system 10 in an alternative preferred embodiment. Here, the hitch system 10 may comprise a bumper system 46. In this embodiment, the bumper system 46 may omit the first and second lower attachment slots 26, 36 in favor of a center hitching point 44 located at a midpoint along the bumper system 46. The center hitching point 44 may comprise a center pin hole 45 configured to receive a pin for mounting an accessory thereto. This embodiment may illustrate how an accessory or attachment to the bumper system 46 may be made with three points of engagement instead of four points of engagement.

Referring specifically to FIG. 27, The bumper system 46 may be seen in an alternative preferred embodiment. The bumper system 46 may omit the first and second lower attachment slots 26, 24 in favor of a center hitching point 44 located along the midpoint of the bumper system 46. The center hitching point 44 may include a center pin hole 45 configured to receive a pin connecting the center hitching point 44 to a connecting bracket on a vehicle accessory. In this way, three points of engagement may be maintained between the bumper system 46 and a vehicle accessory.

Figure 28:
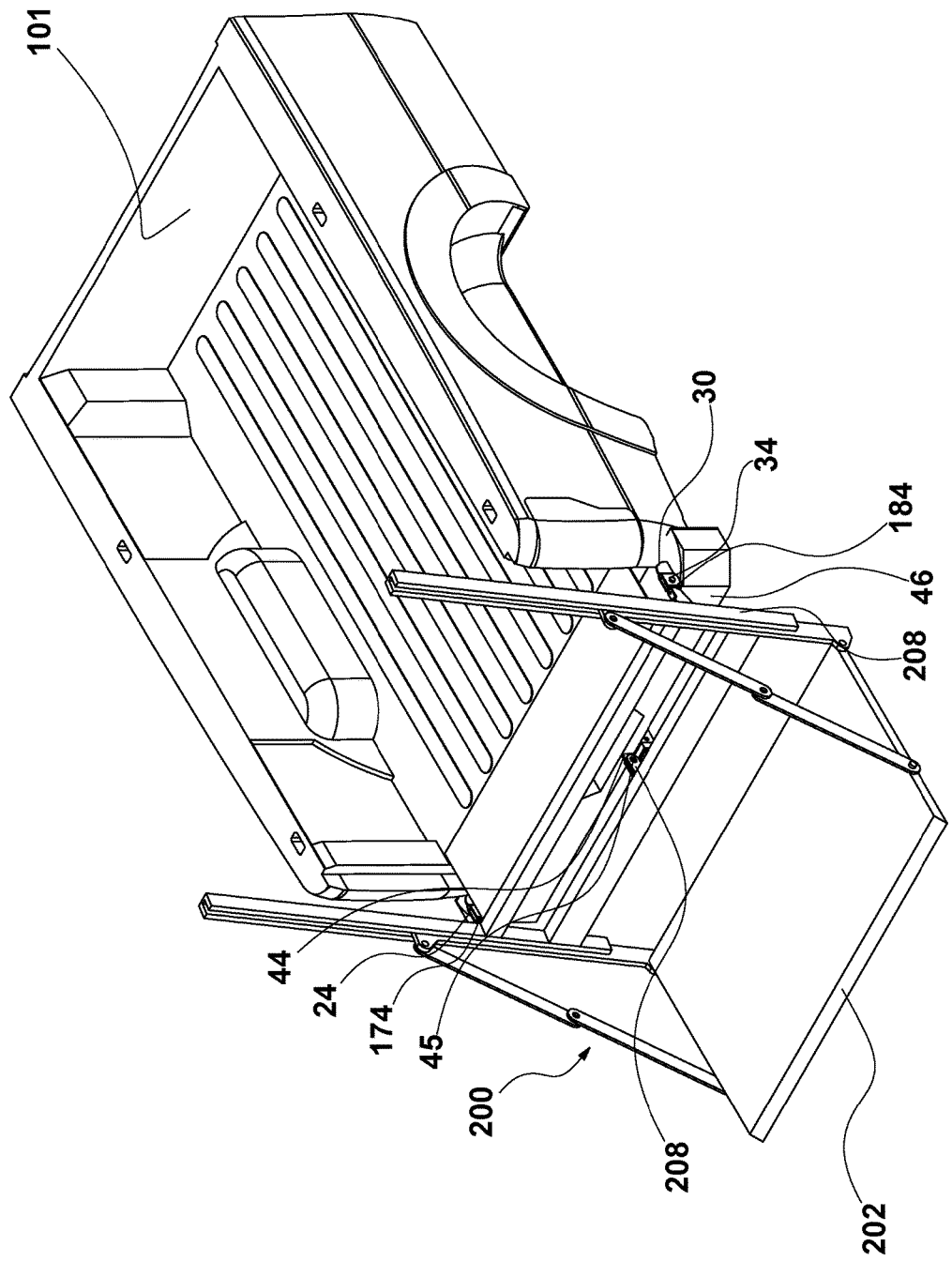
FIG. 28 is a top, front perspective view of the hitch system 10 in an alternative preferred embodiment. Here, the hitch system 10 may comprise a bumper system 46. This figure may also illustrate how an accessory, namely a liftgate accessory 200, may be connected to the bumper system 46. The liftgate accessory 200 may be connected to the first and second upper attachment slots 24, 34 via first and second upper attachment mechanisms 174, 184. The liftgate mechanism 200 may also be connected to the bumper system 46 via the center hitching point 44 thereby forming a third point of engagement with the bumper system 46.
Figure 28A:
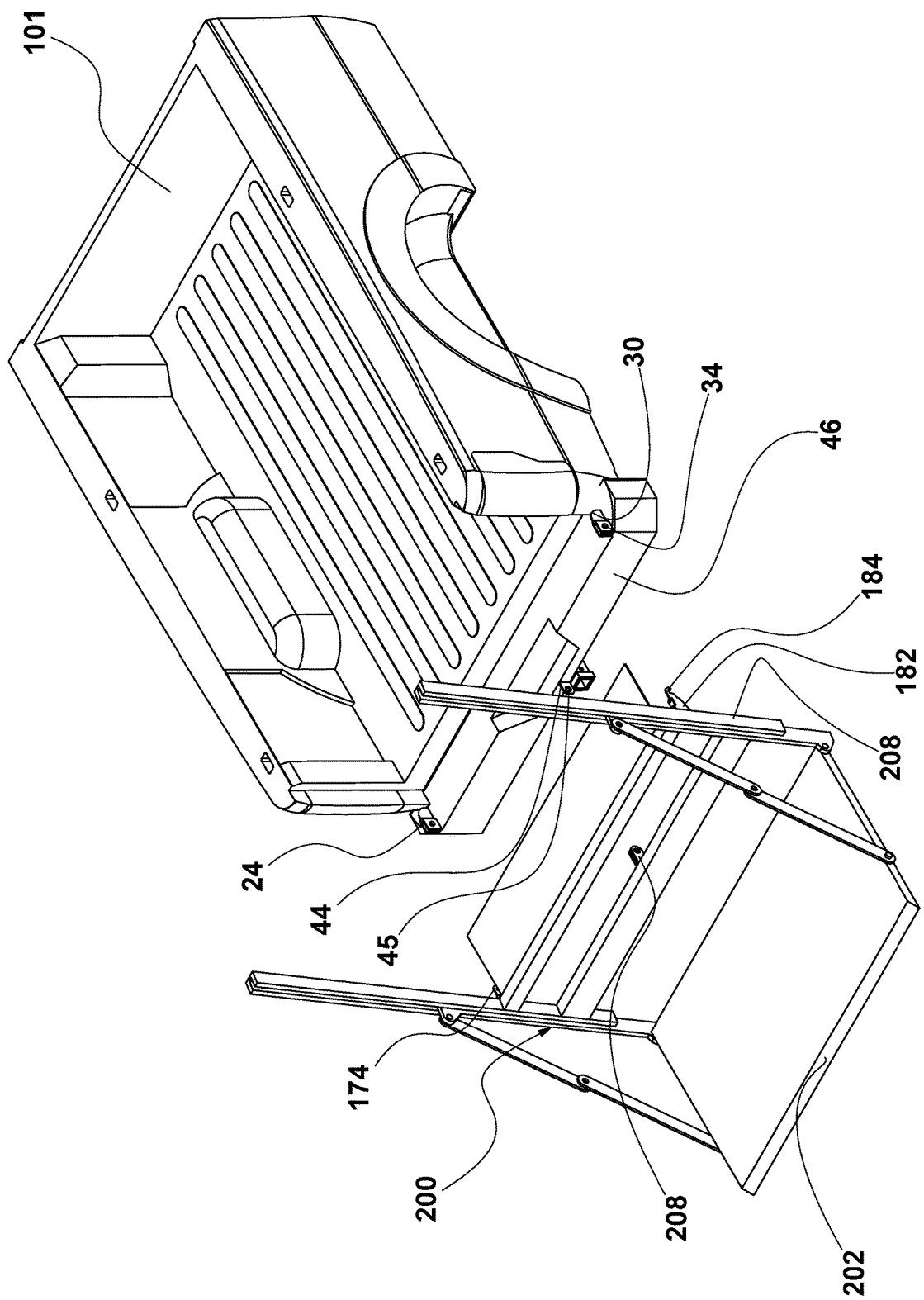
FIG. 28A is a top, front perspective view of the hitch system 10 in an alternative preferred embodiment. Here, a liftgate accessory 200 may be seen in more detail before being engaged with the bumper system 46. The liftgate accessory 200 may be connected to the first and second upper attachment slots 24, 34 via first and second upper attachment mechanisms 174, 184. The liftgate 200 may also have a central connector 212 extending from the lift framework 208 configured to be engaged with the center hitching point 44 of the bumper system 46.

Referring specifically to FIGS. 28 and 28A, the bumper system 46 may be seen with a vehicle accessory attached thereto. The vehicle accessory may be a liftgate 200. The liftgate 200 may be connected by first and second upper attachment mechanisms 174, 184 to the first and second upper attachment slots 24, 34 of the bumper system 46. A third point of engagement may be created between the liftgate 200 and the bumper system 46 by engaging the center hitching point 44 with a central connector 212 located on the lift framework 208.

Referring now generally to FIGS. 29-33, an alternative preferred embodiment of the hitch system 10 may be seen. This embodiment of the hitch system 10 may include first and second arms 20, 30 having a plurality of attachment slots 24, 26, 34, 36 similar to those described above in connection with previously discussed embodiments. However, instead of being attached to truck bed rails 102, 104, this embodiment of the hitch system 10 may be connected directly to the frame of the truck 100. The first and second arms 20, 30 may be connected by a crossbar 49 spanning thereacross. The hitch system 10 may comprise mounting brackets 48 connected to the first and second arms 20, 30 via an intermediary portion which may extend under the bumper 109. The mounting brackets 48 may be connected to the frame of the truck 100 by a plurality of bolts engaging bumper mounting holes 26B of the mounting brackets 48 to the truck frame mounting holes 26A of the truck frame.

Figure 29:
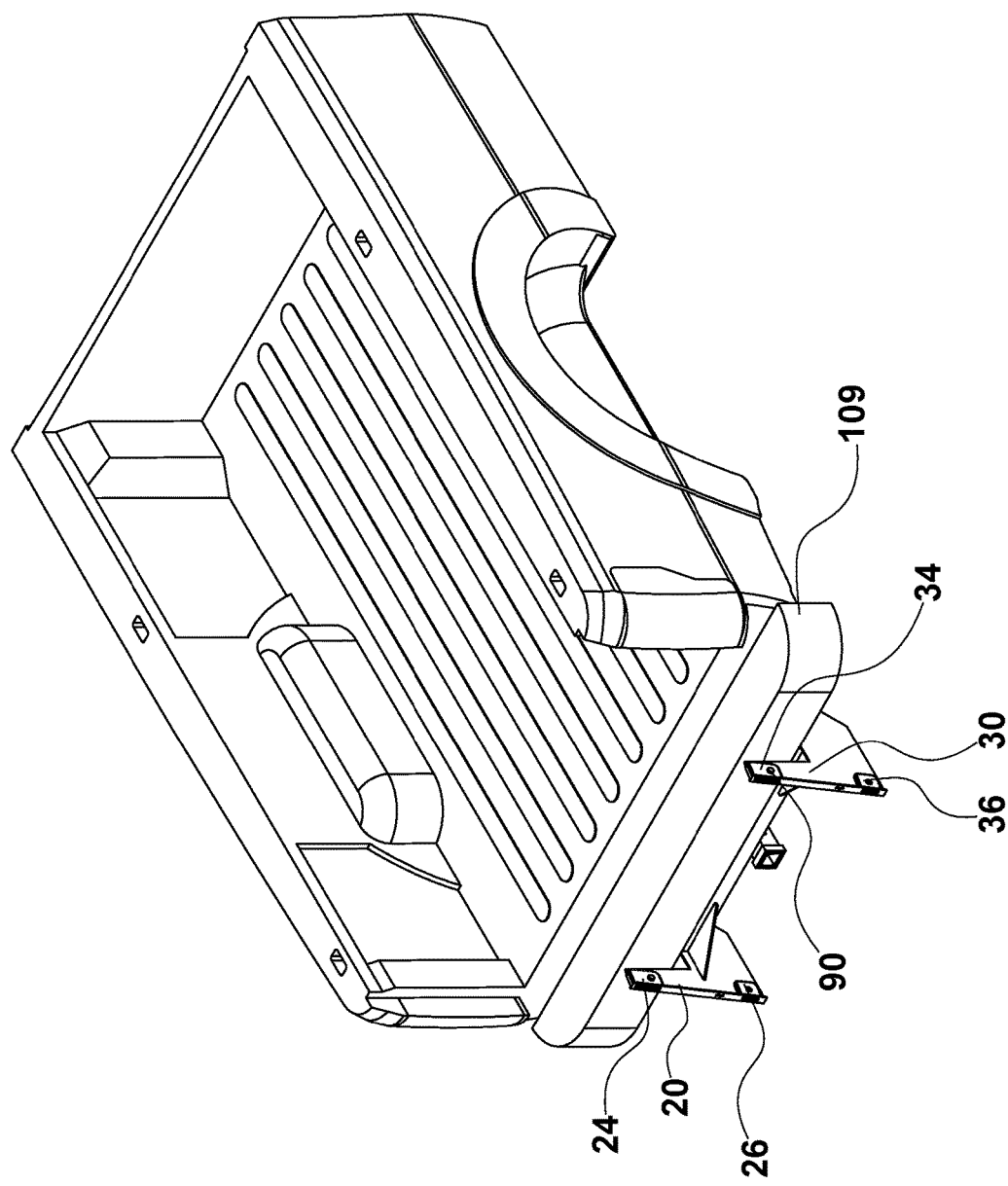
FIG. 29 is a top, front perspective view of the hitch system 10 in an alternative preferred embodiment. Here, the hitch system 10 may be configured for attachment directly to the frame of the truck or vehicle. In the this embodiment, a portion of the hitch system 10 may be under the bumper 109. The hitch system 10 may comprise first and second arms 20, 30 extending upwardly from opposite ends of the hitch system 10. The first and second arms 20, 30 may comprise first and second upper attachment slots 24, 34, protruding upwardly, respectively. The body of the hitch system 10 may also comprise first and second lower attachment slots 26, 36. Each of the attachment slots 24, 26, 34, 36 may be configured for engagement with a variety of vehicle accessories.
Figure 30:
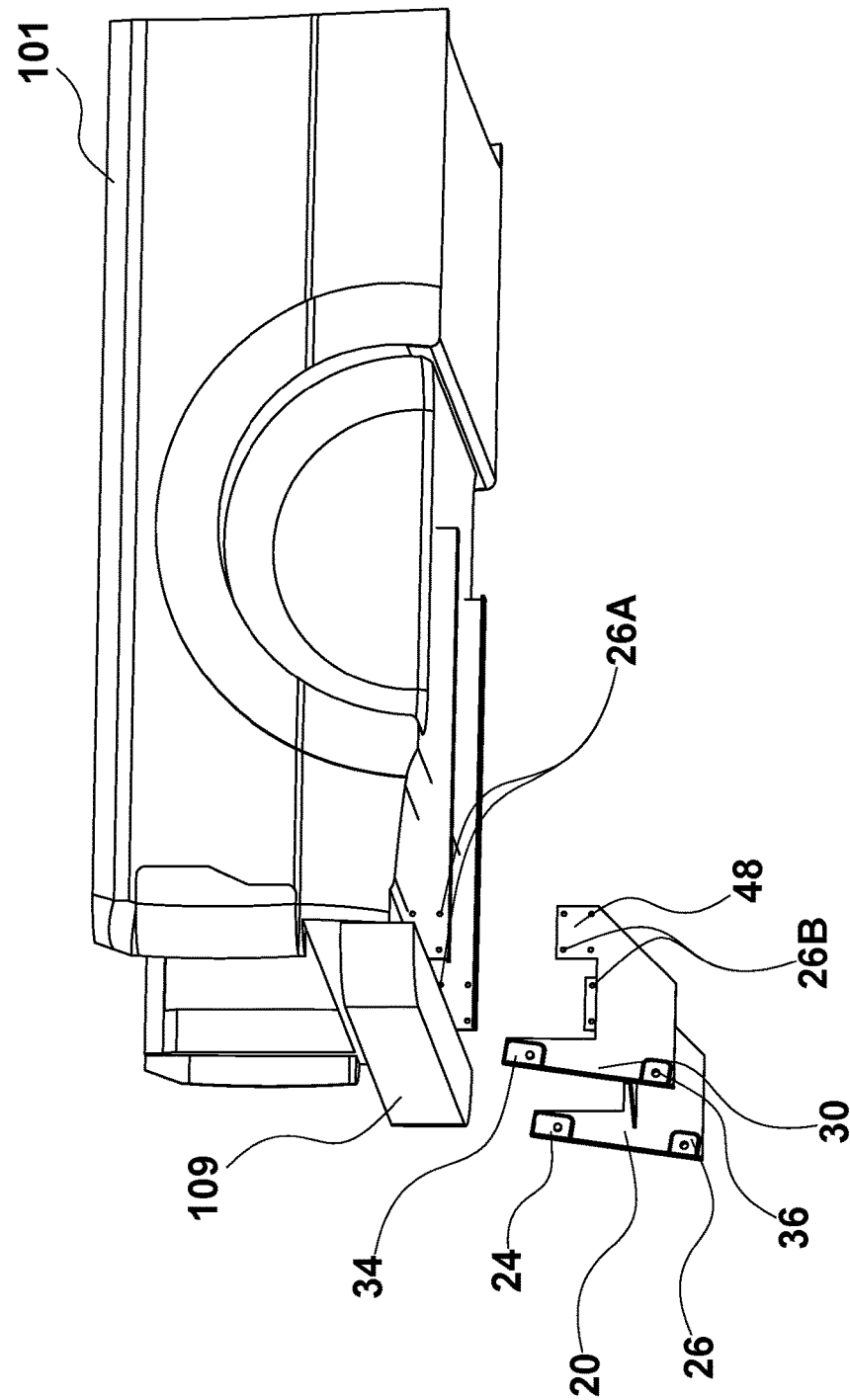
FIG. 30 is a side, perspective view of the hitch system 10 in an alternative preferred embodiment. Here, it may be seen how the hitch system 10 may be mounted directly to the frame of the truck or vehicle. The hitch system 10 may comprise mounting brackets 48. The mounting brackets 48 may include bumper mounting holes 26B which may correspond to truck frame mounting holes 26A on the frame of the truck 100. A plurality of bolts or other fastening mechanisms may be used to secure the mounting brackets 48 to the truck frame when the bumper mounting holes 26B and the truck frame mounting holes 26A may be aligned. The mounting brackets 48 may extend underneath and around the bumper 109.
Figure 31:
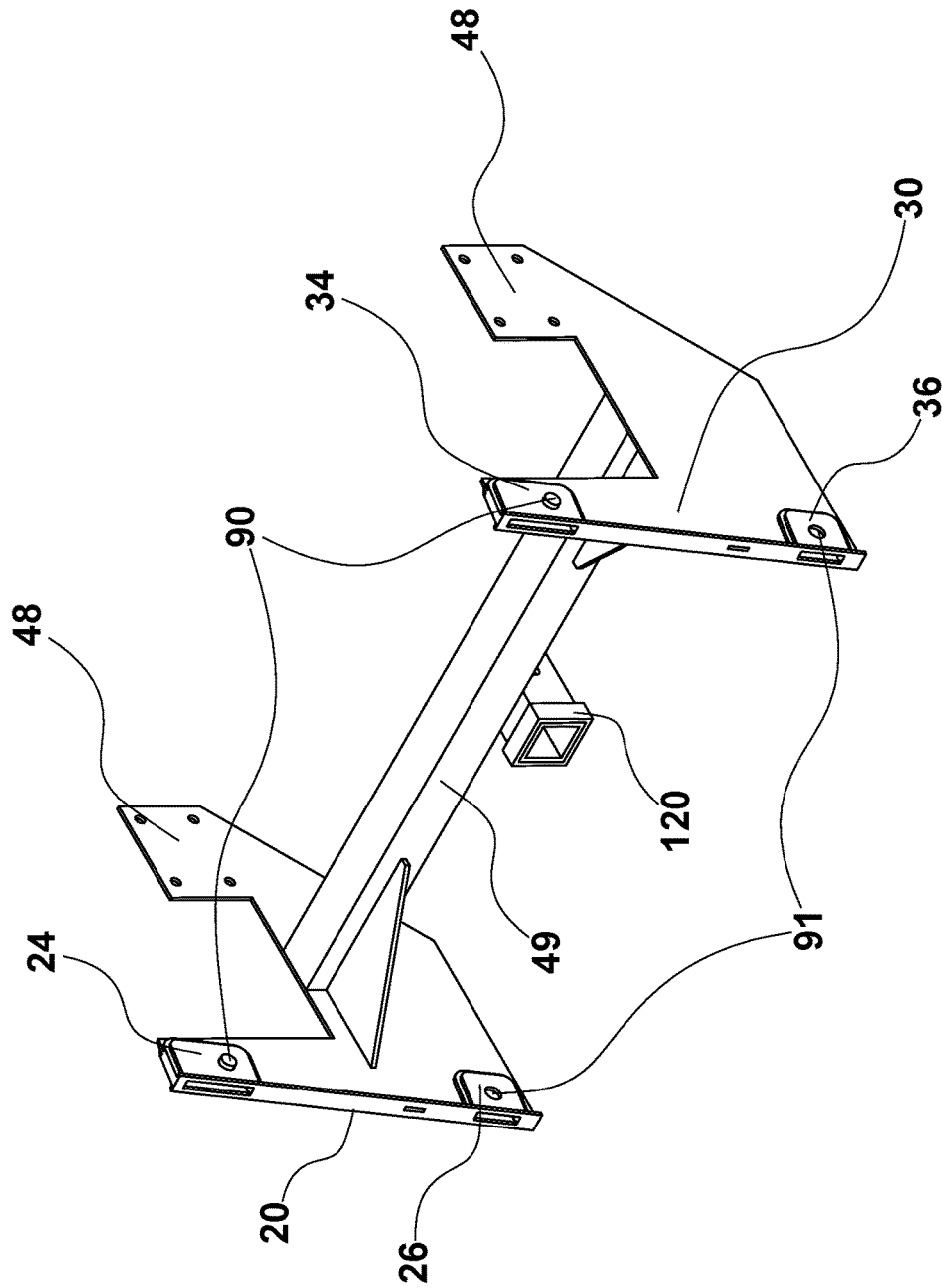
FIG. 31 is a top, front perspective view of the hitch system 10 in an alternative preferred embodiment. Here, the hitch system 10 may be seen comprising a crossbar 49. The crossbar 49 may connect, at one end, the first arm 20 and one of the mounting brackets 48 to, at the other end, the second arm 30 and another one of the mounting brackets 48. The crossbar 49 may also comprise a truck hitch 120 extending perpendicularly from a midpoint along an underside of the crossbar 49.

Referring specifically to FIGS. 29-31, the hitch system 10 may include a truck hitch 120 thereon. The truck hitch 120 may be connected to a bottom side of the crossbar 49. The truck hitch 120 may extend perpendicular to the crossbar 49. The truck hitch 120 may be configured to accommodate any standard draw bars from any standard hitch accessories. In this way, the hitch system 10 may be able to retroactively add a truck hitch 120 to any vehicle that does not already have a standard vehicle hitch. The hitch system 10, may include a hitch extender, tensioned draw bar, or tensioned draw bar or the like without departing from the present invention. The hitch system 10 of FIG. 31 may omit all hitch related components without departing from the scope of the present invention. It is preferred, but not necessary, that some of the connections between the hitch system 10 and the vehicle are to the frame of the vehicle. By way of non-limiting example, the connections can be to the bottom of the vehicle frame.

Figure 31A:
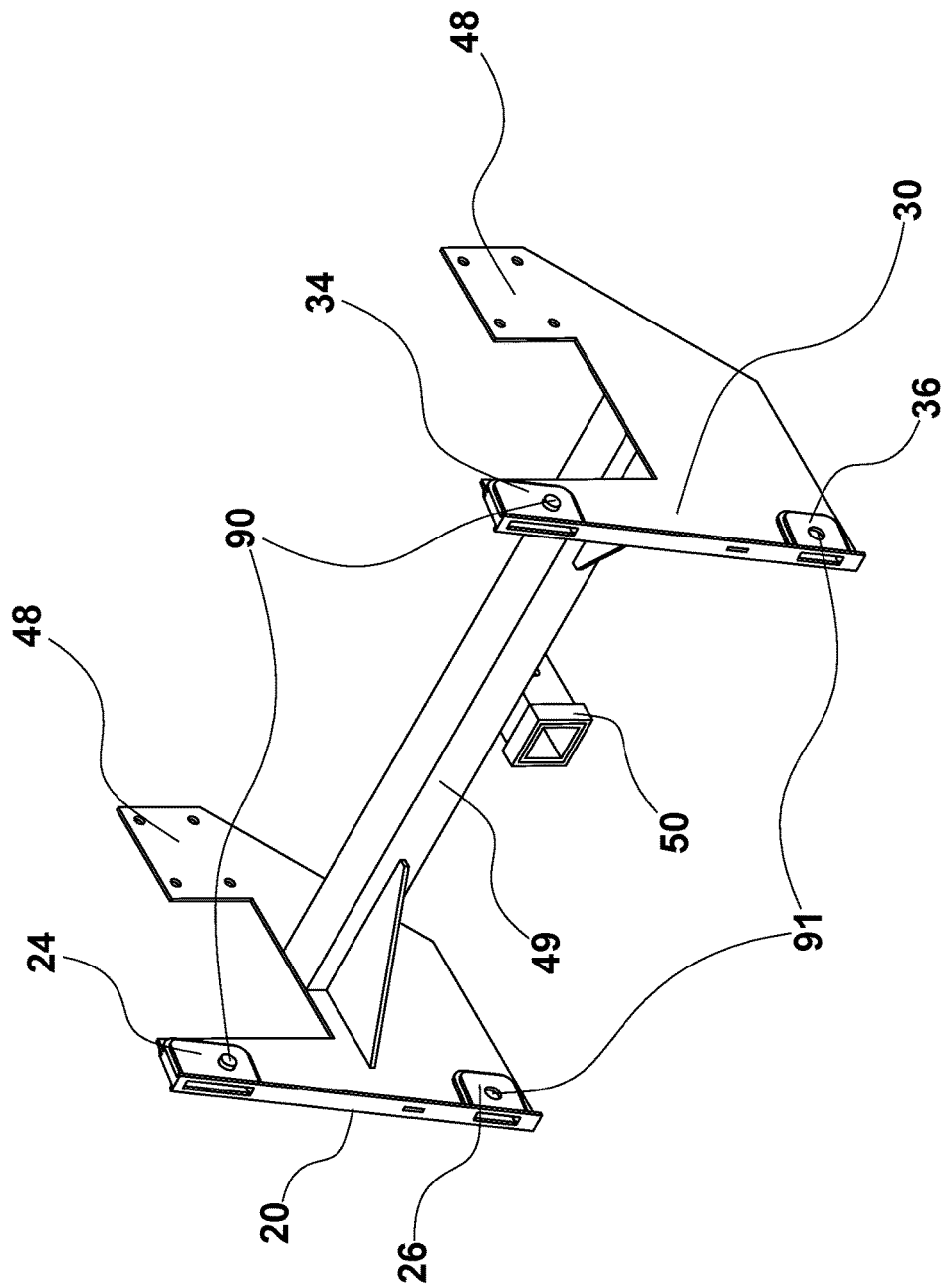
FIG. 31A is a top, front perspective view of the hitch system 10 in an alternative preferred embodiment. Here, the hitch system 10 may be seen comprising a crossbar 49. The crossbar 49 may connect, at one end, the first arm 20 and one of the mounting brackets 48 to, at the other end, the second arm 30 and another one of the mounting brackets 48. The crossbar 49 may also comprise a hitch extender 50 extending perpendicularly from a midpoint along an underside of the crossbar 49. The hitch extender 50 may be similar to those described previously above in connection to earlier disclosed embodiments.

Referring specifically to FIG. 31A, the hitch system 10 may include a hitch extender 50 thereon. The hitch extender 50 may be connected to a bottom side of the crossbar 49. The hitch extender 50 may extend perpendicular to the crossbar 49. The hitch extender 50 may be configured to accommodate any standard draw bars from any standard vehicle hitch accessories. The hitch extender 50 may be connected to a truck hitch 120 of the vehicle that they had system 10 may be engaged with.

Figure 32:
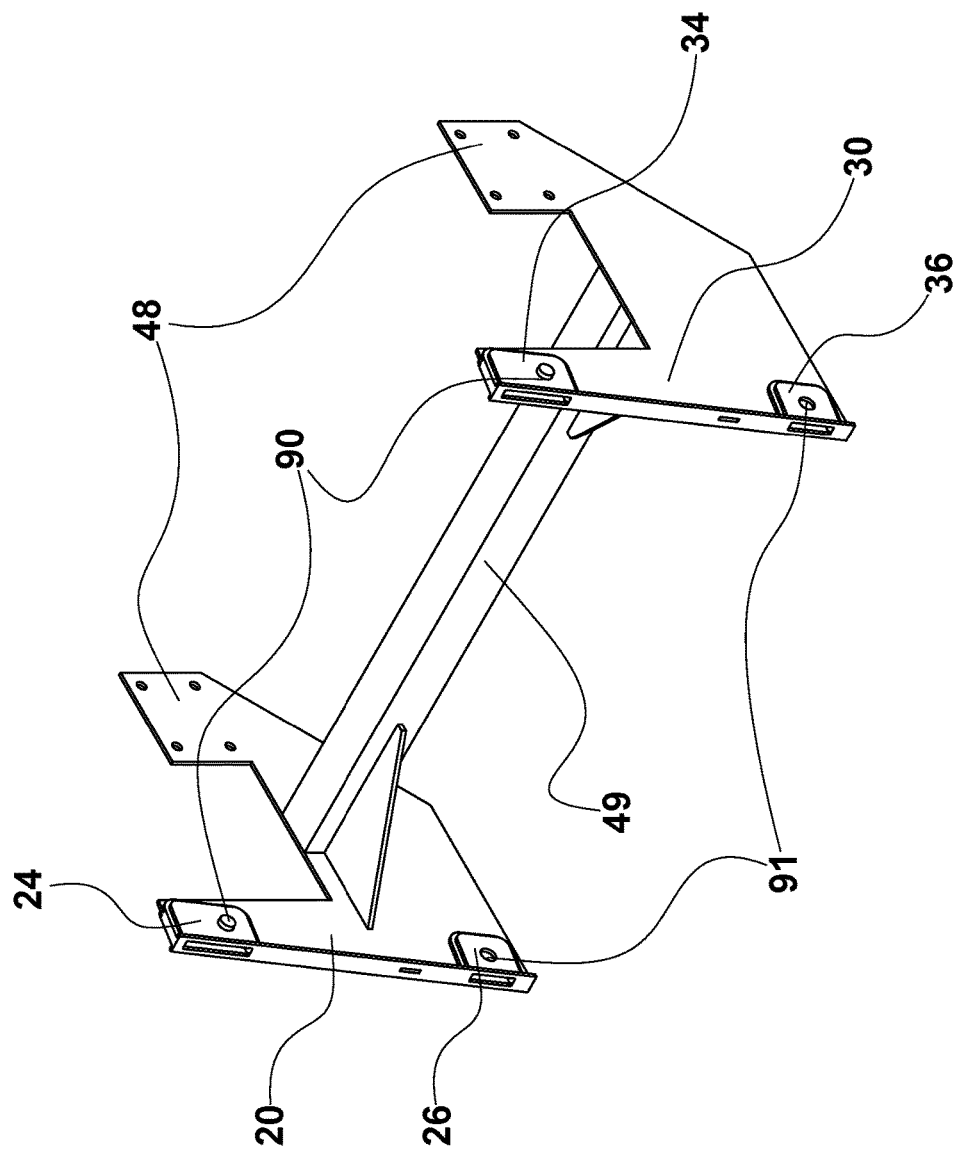
FIG. 32 is a top, front perspective view of the hitch system 10 in an alternative preferred embodiment. Here, the hitch system 10 may be seen comprising a crossbar 49. This alternative embodiment may show that the truck hitch 120 may be omitted, as opposed to the embodiment disclosed in FIG. 31, without departing from the scope of the present invention.
Figure 33:
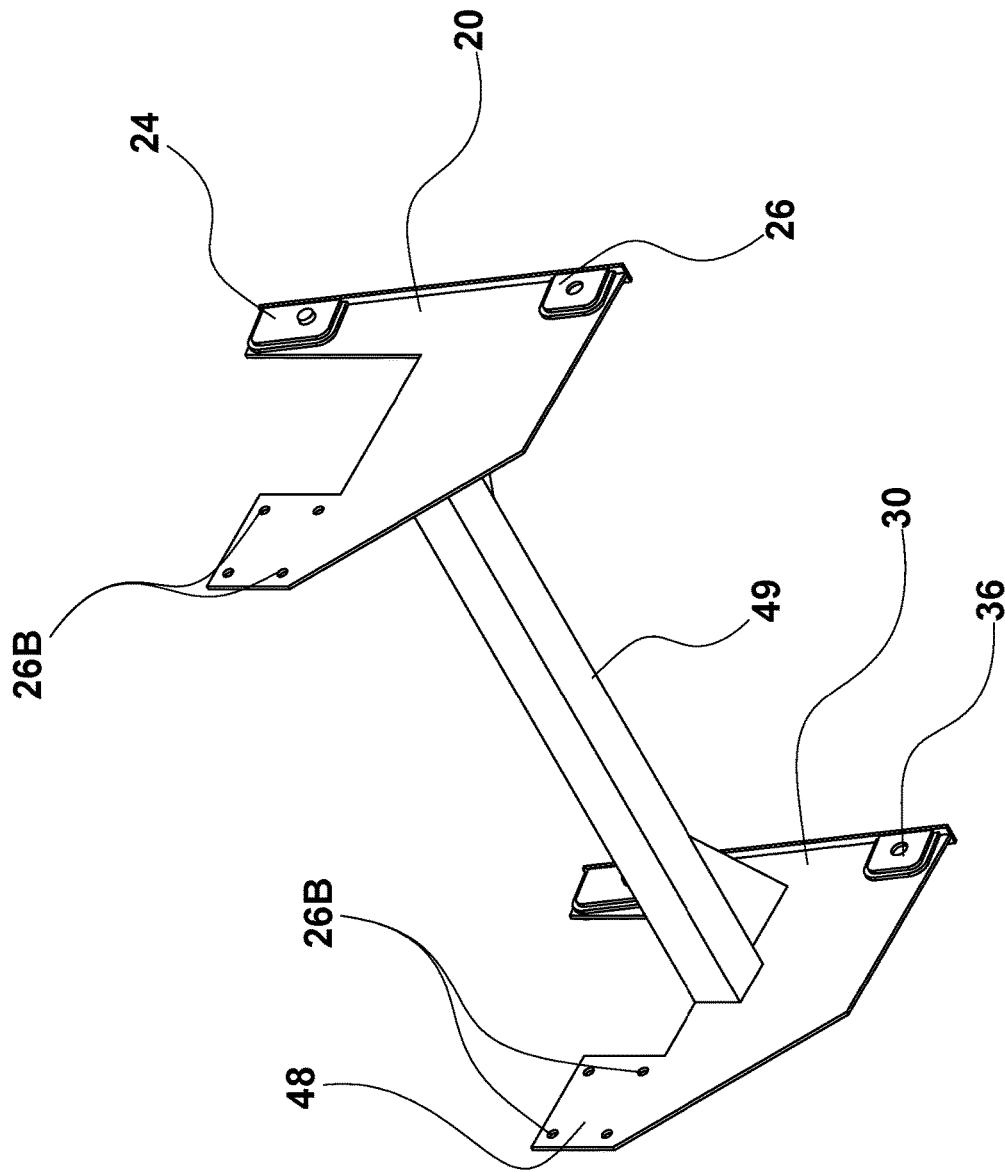
FIG. 33 is a bottom, rear perspective view of the hitch system 10 in an alternative preferred embodiment. Here, the hitch system 10 may be seen comprising a crossbar 49. This figure may also illustrate how the crossbar 49 may be rectangular in shape. However, one of ordinary skill in the art will appreciate from this disclosure that the crossbar 49 may be round, triangular, flat, X-shaped, or any other desired polyhedral shape with departing from the scope of the present invention.

Referring specifically to FIGS. 32 and 33, the hitch system 10 may be seen with a truck hitch 120 and/or a hitch extender 50 omitted. This may be advantageous in certain configurations where a truck hitch 120 and/or hitch extender 50 may not be desired by a user.

Figure 34:
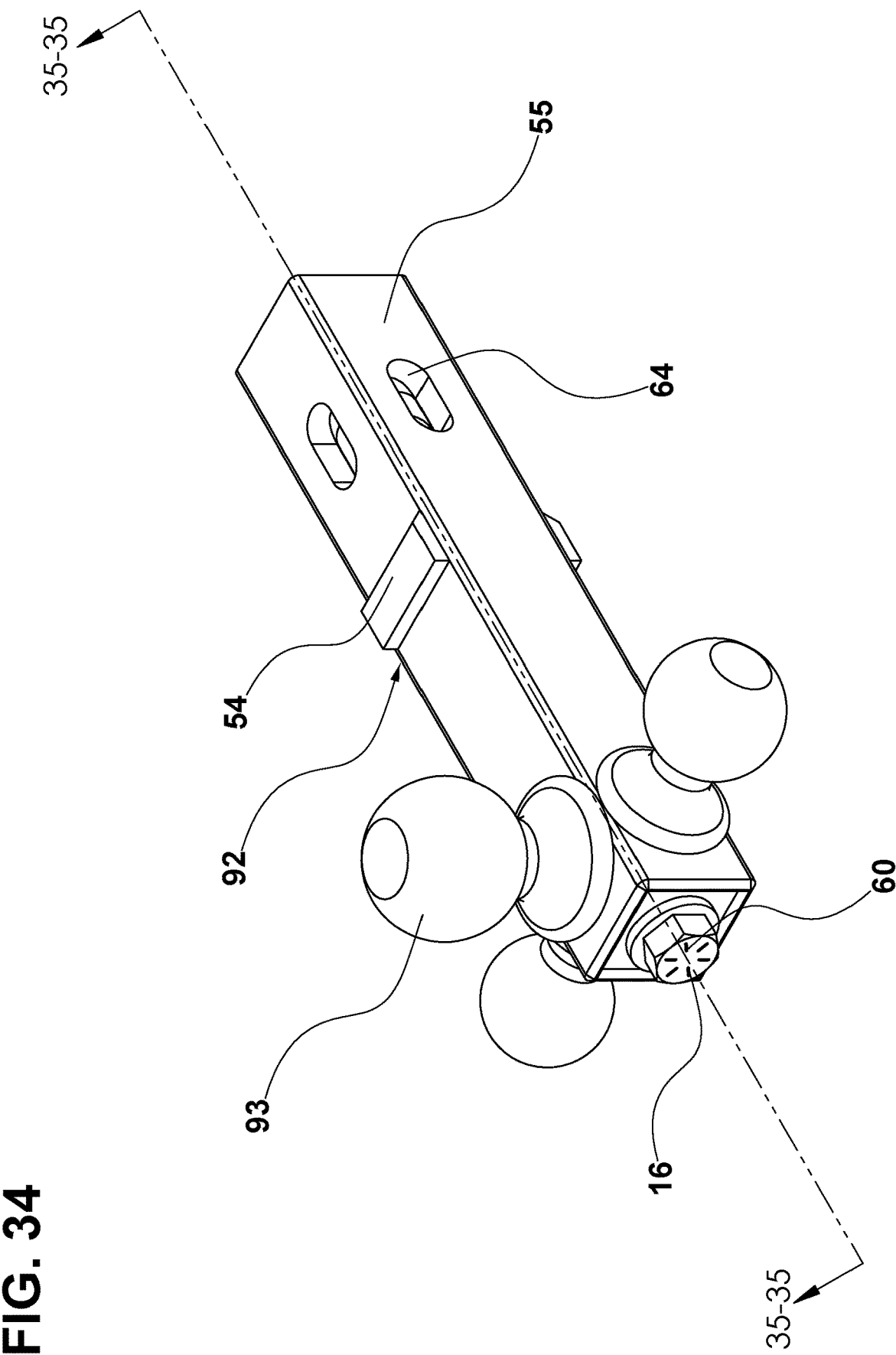
FIG. 34 is a top, front perspective view of a draw bar 92 in the preferred embodiment. The draw bar 92 may comprise a first end, or male end, 55 configured for insertion into a vehicle hitch 120. The draw bar 92 may also include a tensioning mechanism 16 for securing the draw bar 92 to the vehicle hitch 120. The tensioning mechanism 16 may include a tension bolt 60 configured for engagement within the draw bar 92. The draw bar 92 may also include at least one hitch ball 93 configured to engage with standard hitch ball receivers of trailers and other accessories.
Figure 35:
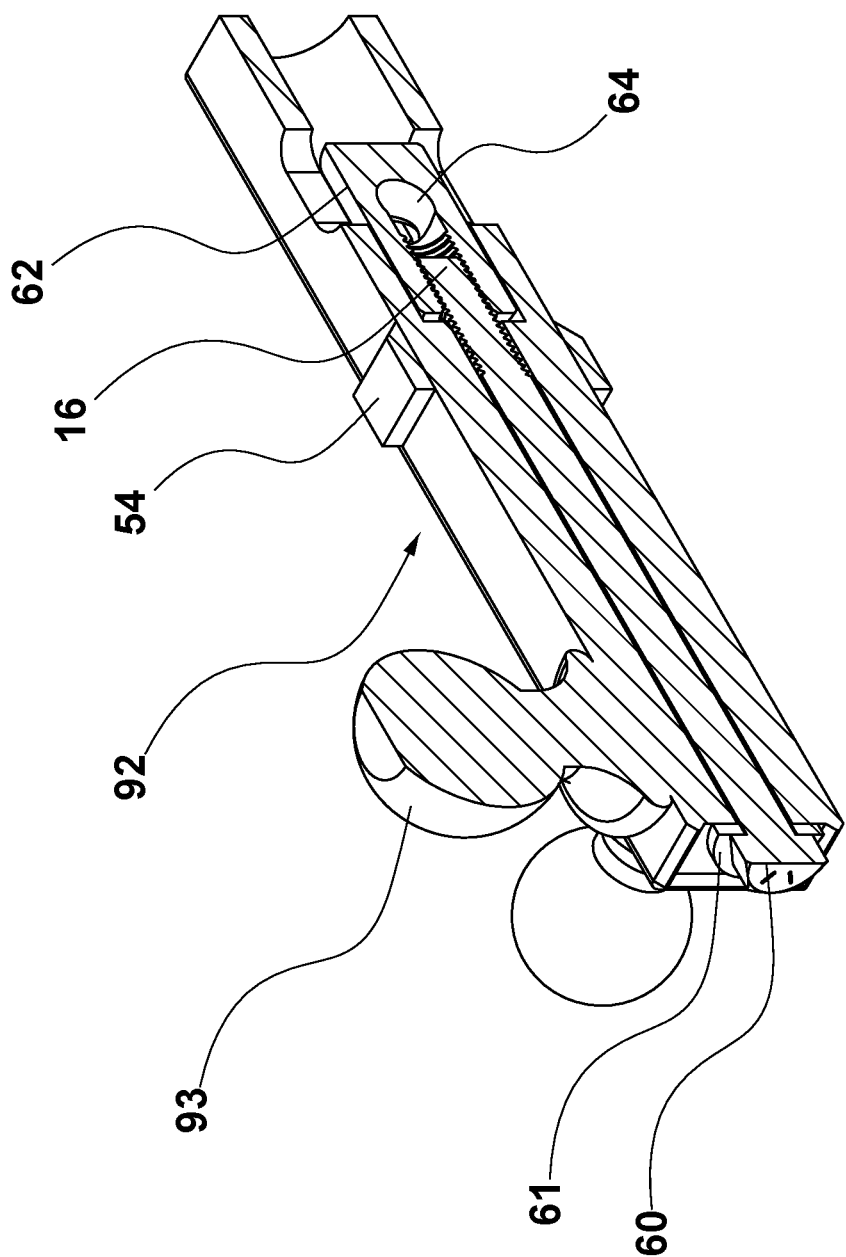
FIG. 35 is a cross-sectional view of a draw bar 92 in the preferred embodiment taken along the line 35-35 of FIG. 34. Here, the tensioning mechanism 16 of the draw bar 92 may be seen in greater detail. The tensioning mechanism 16 may comprise a tensioner bolt 60 extending into the draw bar 92. The tensioner bolt 60 may have a washer 61 therearound configured to separate the head of the tensioner bolt 60 from the draw bar 92. The tensioner bolt 60 may be configured to be threadably engaged with a tensioner nut 62 contained within the draw bar 92. The draw bar 92 may also comprise a flared portion 54 located on the first end 55. The flared portion 54 may increase the pressure fit of the draw bar 92 against the vehicle hitch 120.

Referring now to generally to FIGS. 34-39, a draw bar 92 may be seen in its preferred embodiments. The draw bar 92 may be configured to engage with a standard two (2) inch vehicle hitch receiver. The draw bar 92 may be configured as a singular piece, as can be seen in FIGS. 34 and 35. The draw bar 92 may include at least one hitch ball 93 located thereon. The hitch ball 93 may be configured to receive standard tow ball hitch accessories and trailers. The draw bar 92 may also comprise a tensioning mechanism 16. The tensioning mechanism 16 may comprise a tensioner bolt 60 extending into the body of the draw bar 92. The tensioner bolt 60 may be configured to engage with a tensioner nut 62 located within the draw bar 92.

Referring specifically to FIGS. 34 and 35, the tensioner bolt 60 may extend through the one-piece body of the draw bar 92. The tensioner bolt 60 may be located within a portion of the draw bar 92 that may be connected to the at least one ball hitch 93.

Figure 36:
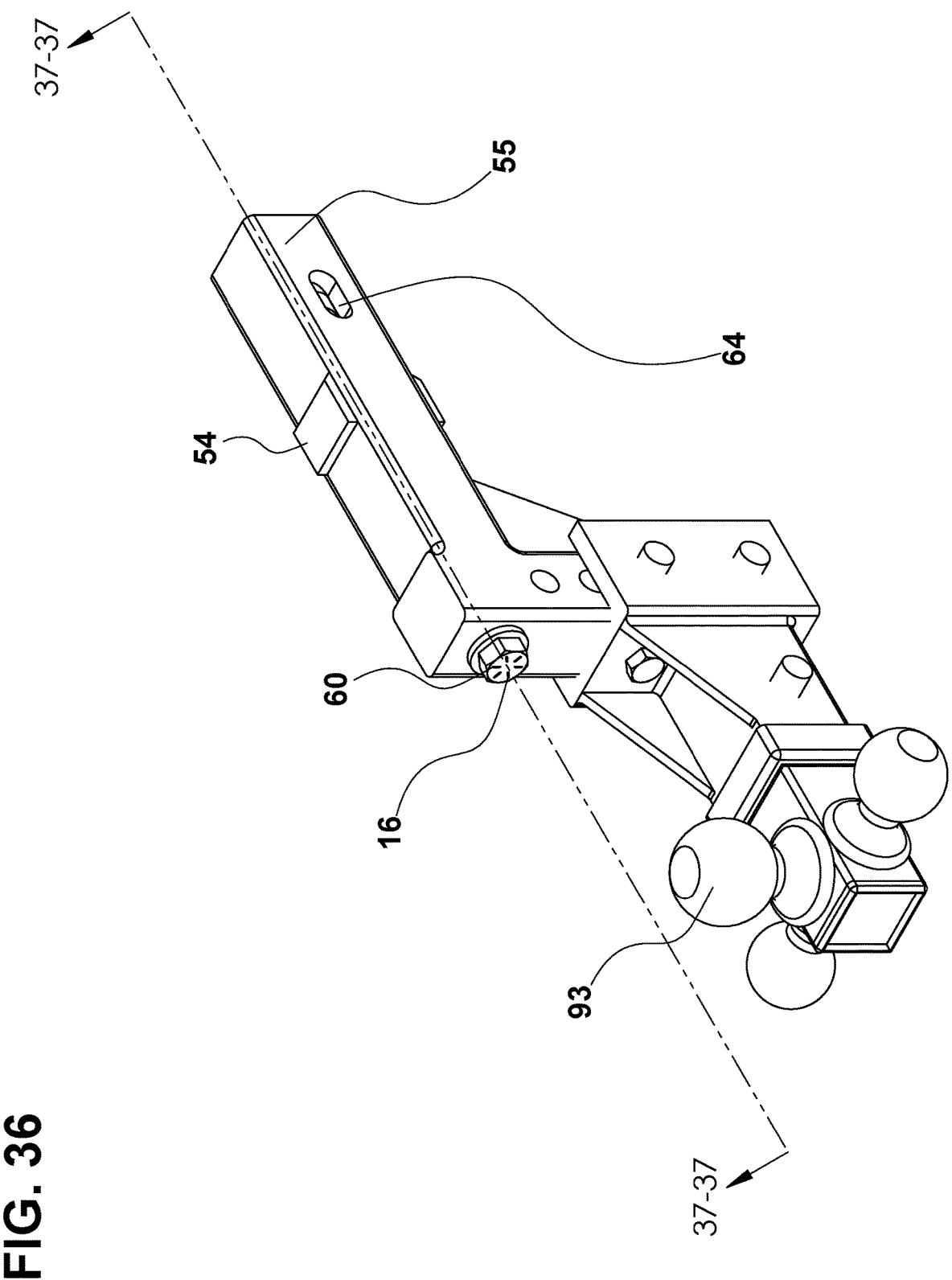
FIG. 36 is a top, front perspective view of a draw bar 92 in an alternative preferred embodiment. The draw bar 92 may comprise a first end, or male end, 55 configured for insertion into a vehicle hitch 120. The draw bar 92 may also include a tensioning mechanism 16 for securing the draw bar 92 to the vehicle hitch 120. The tensioning mechanism 16 may include a tension bolt 60 configured for engagement within the draw bar 92. The draw bar 92 may also include at least one hitch ball 93 configured to engage with standard hitch ball receivers of trailers and other accessories. In this embodiment, the draw bar 92 may be formed of multiple sections joined by an angular joint. The first end 55 of the draw bar 92 may be located on a different section than the hitch ball 93. This embodiment may have the tensioning mechanism 16 located above the hitch ball 93 when engaged with the truck hitch 120.
Figure 37:
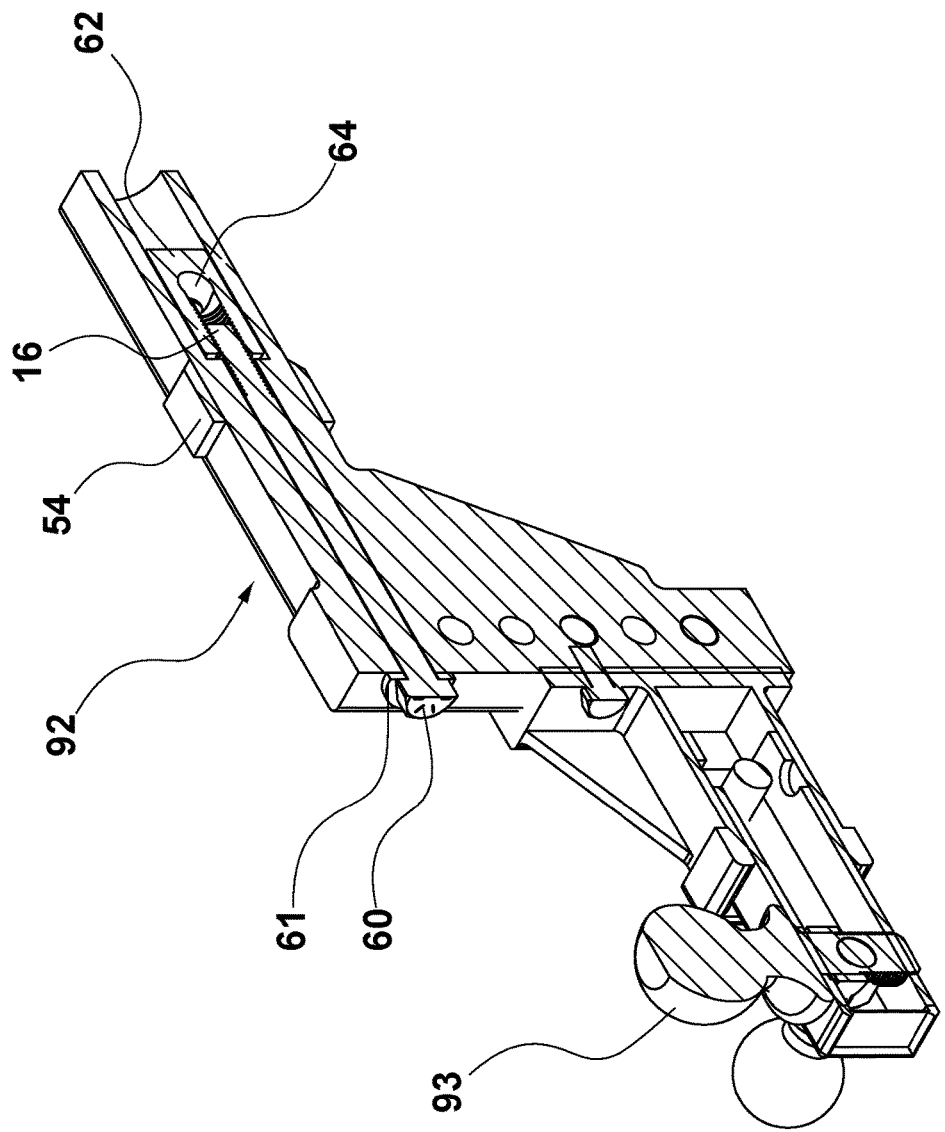
FIG. 37 is a cross-sectional view of a draw bar 92 in an alternative preferred embodiment taken along the line 37-37 of FIG. 36. The tensioning mechanism 16 may comprise a tensioner bolt 60 extending into the draw bar 92. The tensioner bolt 60 may have a washer 61 therearound configured to separate the head of the tensioner bolt 60 from the draw bar 92. The tensioner bolt 60 may be configured to be threadably engaged with a tensioner nut 62 contained within a first portion of the draw bar 92. The at least one hitch ball 93 may be located on a second portion of the draw bar 92. The first and second portions of the draw bar 93 may be connected at an angular joint therebetween.

Referring specifically to FIGS. 36 and 37, the draw bar 92 may be seen in an alternative preferred embodiment. The draw bar 92 may comprise a first section and a second section. The first section may have the first end 55 configured to be inserted into a vehicle hitch. The first section may also house the tensioning mechanism 16. The second section may have the at least one ball hitch 93 attached thereto. The first section in the second section may be attached by an angular joint therebetween.

Figure 38:
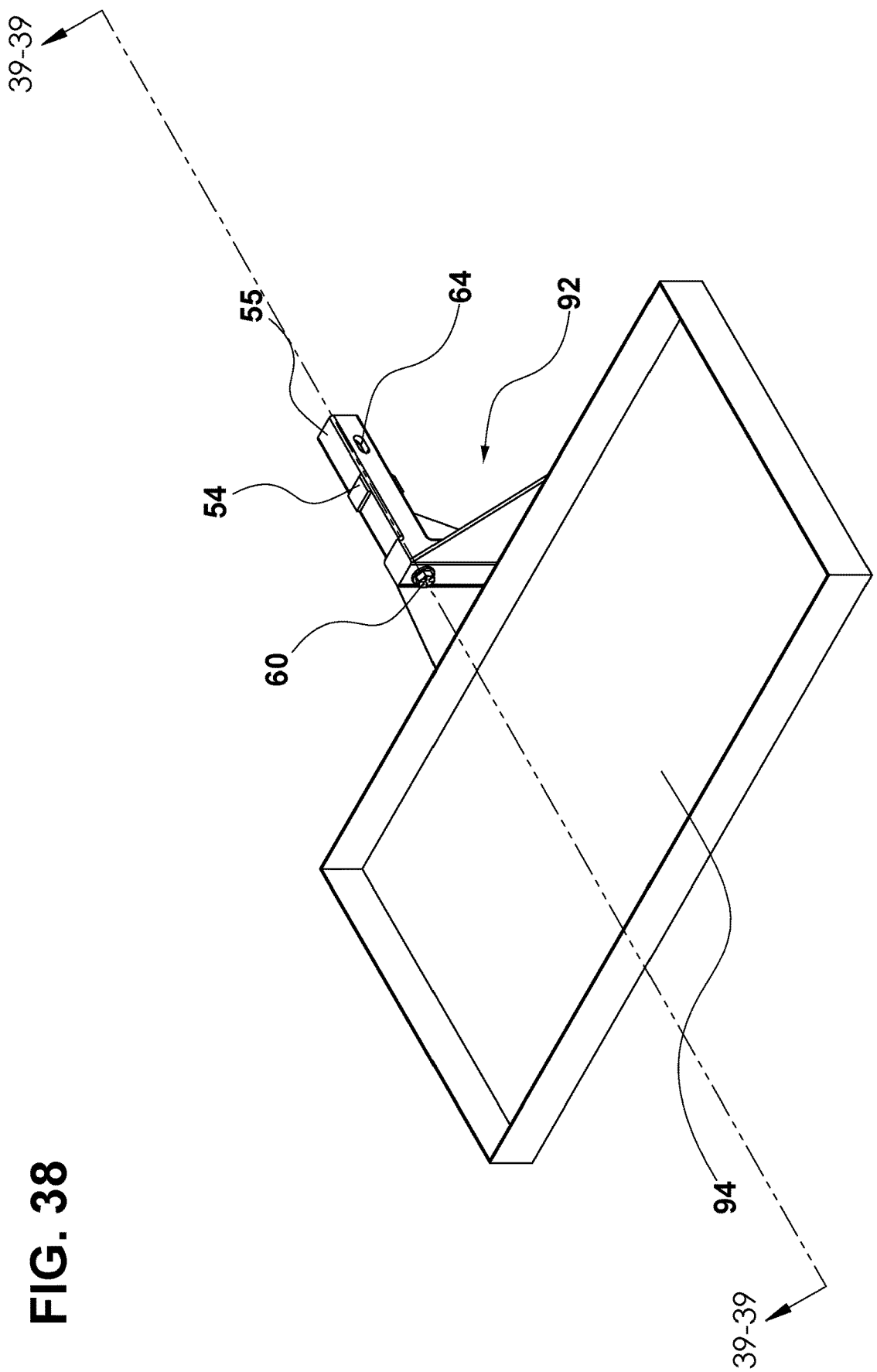
FIG. 38 is a top, front perspective view of a draw bar 92 in an alternative preferred embodiment. Here, the draw bar 92 may comprise a cargo carrier 94. The cargo carrier 94 may be configured to carry cargo or other loads. The draw bar 92 may comprise a first end, or male end, 55 configured for insertion into a vehicle hitch 120. The draw bar 92 may also include a tensioning mechanism 16 for securing the draw bar 92 to the vehicle hitch 120. The tensioning mechanism 16 may include a tension bolt 60 configured for engagement within the draw bar 92. The draw bar 92 may have a tensioner pinhole 64 extending therethrough. The tensioner pin hole 64 may be configured to receive a tensioner pin 65.
Figure 39:
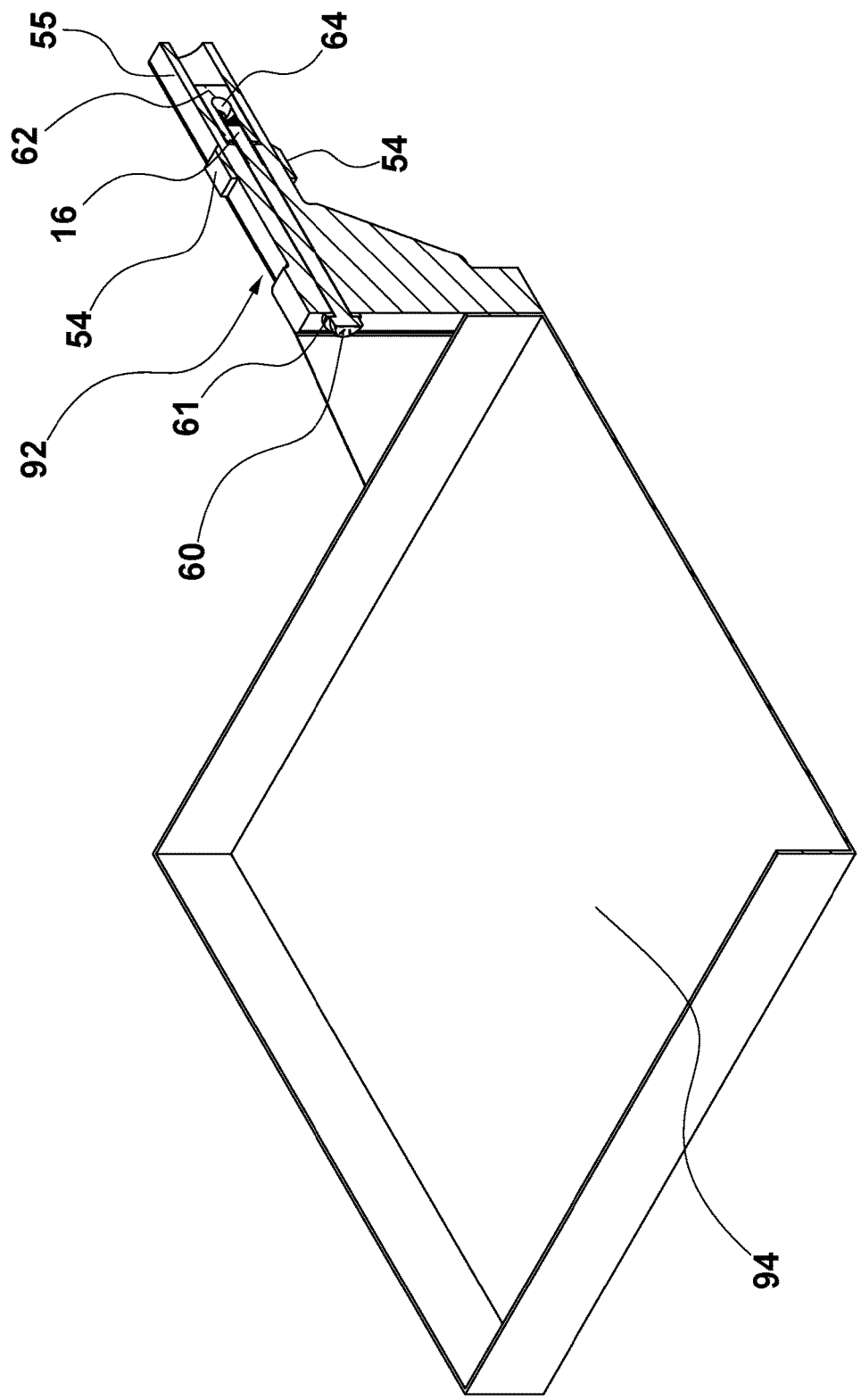
FIG. 39 is a cross-sectional view of a draw bar 92 in an alternative preferred embodiment taken along the line 39-39 of FIG. 38. Here, the draw bar 92 may comprise a cargo carrier 94. The cargo carrier 94 may be configured to carry cargo or other loads. The cargo carrier 94 may have a flat base and sides there around to prevent cargo from falling out while the draw bar 92 is engaged with the vehicle in motion. The tensioning mechanism 16 may comprise a tensioner bolt 60 extending into the draw bar 92. The tensioner bolt 60 may have a washer 61 therearound configured to separate the head of the tensioner bolt 60 from the draw bar 92. The tensioner bolt 60 may be configured to be threadably engaged with a tensioner nut 62 contained within a first portion of the draw bar 92.

Referring specifically to FIGS. 38 and 39, the draw bar 92 may be seen in a second alternative preferred embodiment. The draw bar 92 may comprise a cargo carrier 94. The cargo carrier 94 may be configured for carrying loads. One of ordinary skill in the art will appreciate from this disclosure that the cargo carrier 94 and the ball hitch 93 may be substituted for any other tools, accessories, and/or components as desired without departing from the scope of the present invention.

One advantage of the draw bar 92 may be to allow firmer and stronger connections between vehicle hitches and accessories to be engaged with the vehicle hitches. Another advantage of the draw bar 92 may be that it can be used with a variety of vehicle accessories without adjusting the overall structure of those vehicle accessories.

One of ordinary skill in the art will appreciate from this disclosure that the hitch system 10 and the hitch extender 50 may be entirely manually powered or spring powered, and free of all motors and electrical components, may be operated by a powered device, may include a motor, or may be operated manually with a powered assist without departing from the scope of the present invention.

One of ordinary skill in the art will appreciate from this disclosure that the hitch assembly 10 can be used with any suitable accessory without departing from the scope of the present invention. For example, the hitch assembly 10 can be used with a conveyor belt, a leaf blower, a ramp, a salt spreader, a mulcher, or the like without departing from the scope of the present invention.

One of ordinary skill in the art will appreciate from this disclosure that the various components and elements of the present invention may be constructed of any suitably strong, wear-resistant, flexible (where desired), and inexpensive metals, polymers, alloys, plastics, fabrics, and other materials without departing from the scope of the present invention.

One of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

What is claimed is:

1. A hitch system configured to engage accessories to a truck, the truck having a hitch receiver and a truck bed, the truck bed being defined in part by a tailgate and first and second bedrails, the hitch system comprising:
    a hitch body configured to detachably connect to the hitch receiver and to the first and second bedrails to provide at least three connections to the truck;
    the hitch body having a connector mechanism thereon which is configured to allow a truck accessory to be secured thereto;
    a lateral support bar extending along a bumper of the truck;
    a first arm extending from a first end of the lateral support bar configured to connect to the first bedrail;
    a second arm extending from a second end of the lateral support bar configured to connect to the second bedrail;
    a hitch extender extending from a midpoint of the lateral support bar configured to engage the hitch receiver;
    wherein the connector mechanism is configured to detachably engage the vehicle accessory in a non flexible manner such that the vehicle accessory is supportable off the ground during normal driving of the vehicle; and
    wherein the lateral support bar comprises a grooved step portion, the grooved step portion being configured to allow a user to stand on the lateral support bar with increased grip and reduced slippage.

2. The hitch system of claim 1, wherein the hitch body is configured such that when attached to the truck without the truck accessory attached thereto that the tailgate can move between a first, closed position and a second, fully open position without being blocked by the hitch body, the hitch body being further configured such that rear lights and a license plate of the truck are unobstructed by the hitch body.

3. The hitch system of claim 1, the connector mechanism further comprising:
    a plurality of upper slots each containing a fixed pin, and
    a plurality of lower slots each configured to receive a removable pin,
    wherein the truck accessory has a plurality of upper hooks configured to engage the fixed pins of the plurality of upper slots and a plurality of lower holes configured to be engaged concurrently with the plurality of lower slots by the removable pins.

4. The hitch system of claim 1, wherein the first arm comprises a first attachment plate and the second arm comprises a second attachment plate, the first attachment plate being configured to be detachably affixed to a first truck stake pocket located on the first bedrail, the second attachment plate being configured to be detachably affixed to a second truck stake pocket located on the second bedrail.

5. The hitch system of claim 3, further comprising a liftgate accessory, the liftgate accessory being attached to the hitch system via the connector mechanism, the liftgate accessory being configured to assist a user in moving a load from a ground level to a bed level.

6. The hitch system of claim 3, further comprising an attachment accessory, the attachment accessory being attached to the hitch system via the connector mechanism, the attachment accessory being configured to engage with and protect a top edge of the tailgate.

7. The hitch system of claim 6, wherein the attachment accessory is configured for at least one ramp to be attached, the at least one ramp bridging a distance between a ground level and a bed level.

8. A hitch system configured to engage accessories to a truck, the truck having a hitch receiver and a truck bed, the truck bed being defined in part by a tailgate and first and second bedrails, the hitch system comprising:
- a hitch body configured to detachably connect to the hitch receiver and to the first and second bedrails to provide at least three connections to the truck;
- the hitch body having a connector mechanism thereon which is configured to allow a truck accessory to be secured thereto;
- an extender body having a wider end and a tapered end, the tapered end being configured for insertion into the hitch receiver, the wider end being configured for receiving standard hitch accessories, and
- an adjustable tensioning mechanism for securing the extender body to the hitch receiver, the adjustable tensioning mechanism comprising:
- a tension bolt extending axially through the extender body and having a threaded end,
- a tension nut configured to engage with the threaded end of the tension bolt, and
- a flared portion extending outwardly from a portion of the tapered end of the extender body, wherein
- when the tension bolt is engaged with the tension nut, the tapered end is pulled into the hitch receiver and the flared portion provides a pressure fit against an inside of the hitch receiver.

9. A hitch system configured to engage accessories to a truck, the truck having a hitch receiver and a truck bed, the truck bed being defined in part by a tailgate and first and second bedrails, the hitch system comprising:
- a hitch body configured to detachably connect to the hitch receiver and to the first and second bedrails to provide at least three connections to the truck; and
- the hitch body having a connector mechanism thereon which is configured to allow a truck accessory to be secured thereto;
- wherein the first arm comprises a first arm extension and the second arm comprises a second arm extension, the first arm extension having a first attachment plate and the second arm extension having a second attachment plate, wherein
- the first attachment plate and the second attachment plate are configured to engage with a truck stake pocket on each of the first and second bedrails of the truck, respectively; and
- wherein the lateral support bar comprises a grooved step portion, the grooved step portion being configured to allow a user to stand on the lateral support bar with increased grip and reduced slippage, wherein the connector mechanism is configured to detachably engage the vehicle accessory in a non flexible manner such that the vehicle accessory is supportable off the ground during normal driving of the vehicle.

10. The retrofit device of claim 9, wherein the first arm comprises a first attachment plate and the second arm comprises a second attachment plate, the first attachment plate being configured to be detachably affixed to a first truck stake pocket located on the first bedrail, the second attachment plate being configured to be detachably affixed to a second truck stake pocket located on the second bedrail.

11. The retrofit device of claim 9, further comprising a liftgate accessory, the liftgate accessory being attached to the retrofit device via the connecting pins, the liftgate accessory being configured to assist a user in moving a load from a ground level to a bed level.

12. The retrofit device of claim 9, further comprising an attachment accessory, the attachment being attached to the retrofit device via the connecting pins, the attachment accessory being configured to engage with and protect a top edge of the tailgate,
- wherein the attachment accessory is also configured for at least one ramp to be attached, the at least one ramp bridging a distance between a ground level and a bed level.

* * * * *